United States Patent
Voorhies et al.

(10) Patent No.: US 7,023,437 B1
(45) Date of Patent: Apr. 4, 2006

(54) SYSTEM AND METHOD FOR ACCELERATING GRAPHICS PROCESSING USING A POST-GEOMETRY DATA STREAM DURING MULTIPLE-PASS RENDERING

(75) Inventors: Douglas A. Voorhies, Menlo Park, CA (US); Edward C. Greene, Portola Valley, CA (US); Emmett M. Kilgariff, San Jose, CA (US); Svetoslav Tzvetkov, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 491 days.

(21) Appl. No.: 10/230,124

(22) Filed: Aug. 27, 2002

Related U.S. Application Data

(63) Continuation-in-part of application No. 09/885,665, filed on Jun. 19, 2001, now Pat. No. 6,646,639, which is a continuation-in-part of application No. 09/121,317, filed on Jul. 22, 1998, now Pat. No. 6,480,205, and a continuation-in-part of application No. 09/585,810, filed on May 31, 2000.

(51) Int. Cl.
*G06T 15/00* (2006.01)
(52) U.S. Cl. .................. 345/420; 345/419
(58) Field of Classification Search ........... 345/419, 345/421, 422, 423
See application file for complete search history.

(56) References Cited

U.S. PATENT DOCUMENTS

| | | | |
|---|---|---|---|
| 4,996,666 A | 2/1991 | Duluk, Jr. ............. | 365/49 |
| 5,509,110 A | 4/1996 | Latham .............. | 395/121 |
| 5,535,288 A | 7/1996 | Chen et al. .......... | 382/236 |
| 5,572,634 A | 11/1996 | Duluk, Jr. ........... | 395/119 |
| 5,574,835 A | 11/1996 | Duluk, Jr. et al. .... | 395/121 |
| 5,579,455 A * | 11/1996 | Greene et al. ......... | 345/422 |
| 5,596,686 A | 1/1997 | Duluk, Jr. ........... | 395/122 |
| 5,613,050 A | 3/1997 | Hochmuth et al. ..... | 395/122 |
| 5,669,010 A | 9/1997 | Duluk, Jr. ........... | 395/800.22 |

(Continued)

FOREIGN PATENT DOCUMENTS

WO    93/23816    11/1993

(Continued)

OTHER PUBLICATIONS

Bartz, Dirk et al.; "Extending Graphics Hardware for Occlusion Queries in OpenGL"; Computer Graphics Lab, University of Tübingen, ACM, Aug. 1998, p.p. 97-104.

(Continued)

*Primary Examiner*—Phu K. Nguyen
(74) *Attorney, Agent, or Firm*—Zilka-Kotab, PC

(57) ABSTRACT

A system and method are provided for accelerating graphics processing utilizing multiple-pass rendering. Initially, geometry operations are performed on graphics data, and the graphics data is stored in memory. During a first rendering pass, various operations take place. For example, the graphics data is read from the memory, and the graphics data is rasterized. Moreover, first z-culling operations are performed utilizing the graphics data. Such first z-culling operations maintain a first occlusion image. During a second rendering pass, the graphics data is read from memory. Still yet, the graphics data is rasterized and second z-culling operations are performed utilizing the graphics data and the first occlusion image. Moreover, visibility operations are performed utilizing the graphics data and a second occlusion image. Raster-processor operations are also performed utilizing the graphics data, during the second rendering pass.

36 Claims, 34 Drawing Sheets

U.S. PATENT DOCUMENTS

| | | | |
|---|---|---|---|
| 5,977,987 A | 11/1999 | Duluk, Jr. | 345/441 |
| 6,229,553 B1 | 5/2001 | Duluk, Jr. et al. | 345/506 |
| 6,259,452 B1 * | 7/2001 | Coorg et al. | 345/421 |
| 6,268,875 B1 | 7/2001 | Duluk, Jr. et al. | 345/506 |
| 6,285,378 B1 | 9/2001 | Duluk, Jr. | 345/441 |
| 6,288,730 B1 | 9/2001 | Duluk, Jr. et al. | 345/552 |
| 6,456,285 B1 * | 9/2002 | Hayhurst | 345/422 |
| 6,480,205 B1 | 11/2002 | Greene et al. | 345/631 |
| 6,525,726 B1 * | 2/2003 | Xie et al. | 345/421 |
| 6,583,787 B1 * | 6/2003 | Pfister et al. | 345/441 |
| 6,697,063 B1 * | 2/2004 | Zhu | 345/421 |

FOREIGN PATENT DOCUMENTS

| | | |
|---|---|---|
| WO | 97/05575 | 2/1997 |
| WO | 97/05576 | 2/1997 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

OTHER PUBLICATIONS

Greene, Ned; "Hierarchical Polygon Tiling with Coverage Masks"; Apple Computer, p.p. 1-12, Jun. 1997.

Greene, Ned; "Hierarchical Z-Buffer Visibility"; Apple Computer, p.p. 1-7, Apr. 1996.

Xie, Feng et al; "Adaptive Hierarchical Visibility in a Tiled Architecture"; Intel Corporation, p.p. 75-142, Aug. 1999.

* cited by examiner

Stencil Information stencil0 = 8-bit value    stencil_valid_flag_0 stencil1 = 8-bit value    stencil_valid_flag_1

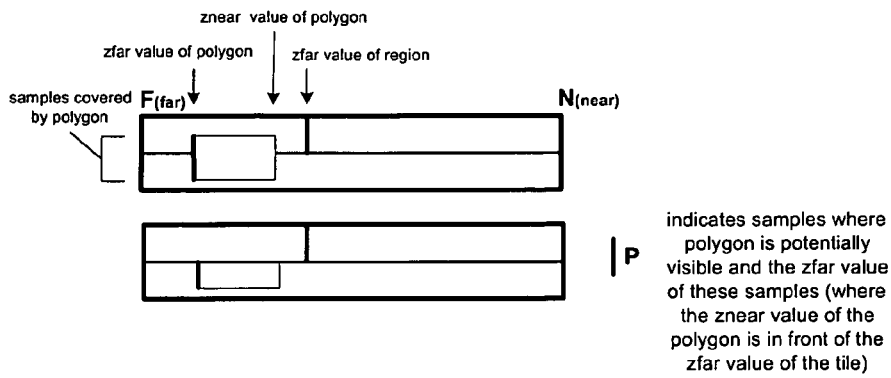
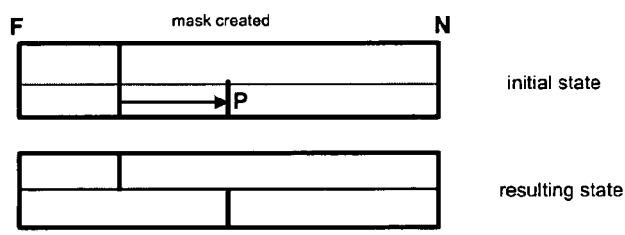
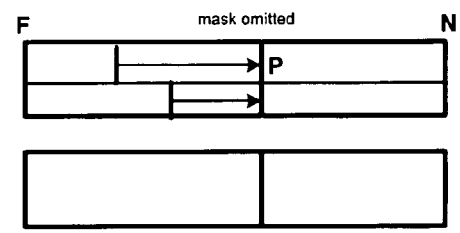
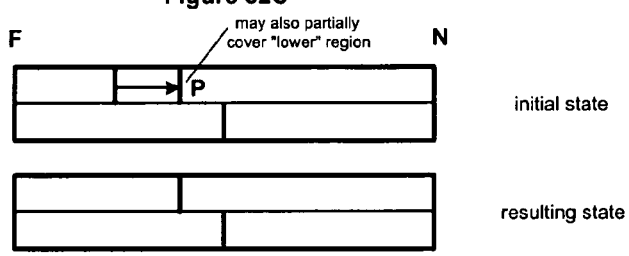
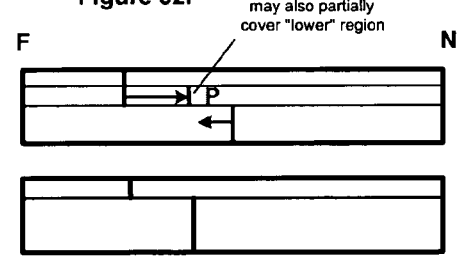
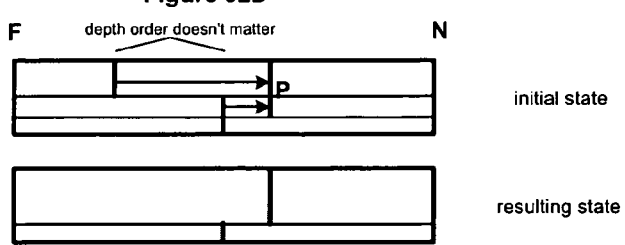
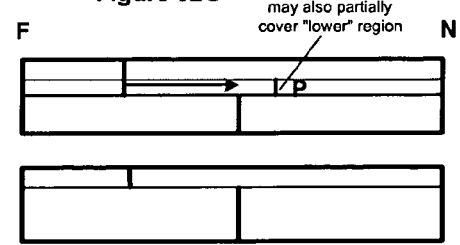

SYSTEM AND METHOD FOR ACCELERATING GRAPHICS PROCESSING USING A POST-GEOMETRY DATA STREAM DURING MULTIPLE-PASS RENDERING

RELATED APPLICATION(S)

The present application is a continuation-in-part of an application entitled "MODIFIED METHOD AND APPARATUS FOR IMPROVED OCCLUSION CULLING IN GRAPHICS SYSTEMS" filed Jun. 19, 2001 under Ser. No. 09/885,665, now U.S. Pat. No. 6,646,639 which is in turn a continuation-in-part of parent applications entitled "METHOD AND APPARATUS FOR OCCLUSION CULLING IN GRAPHICS SYSTEMS" filed Jul. 22, 1998 under Ser. No. 09/121,317, now U.S. Pat. No. 6,480,205 and "SYSTEM, METHOD AND ARTICLE OF MANUFACTURE FOR Z-VALUE AND STENCIL CULLING PRIOR TO RENDERING IN A COMPUTER GRAPHICS PROCESSING PIPELINE" filed May 31, 2000 under Ser. No. 09/585,810.

FIELD OF THE INVENTION

The present invention relates to computer graphics, and more particularly to rendering images of three-dimensional scenes using z-buffering.

BACKGROUND OF THE INVENTION

Rendering is the process of making a perspective image of a scene from a stored geometric model. The rendered image is a two-dimensional array of pixels, suitable for display.

The model is a description of the objects to be rendered in the descriptions of polygons together with other information related to the properties of the polygons. Part of the rendering process is the determination of occlusion, whereby the objects and portions of objects occluded from view by other objects in the scene are eliminated.

As the performance of polygon rendering systems advances, the range of practical applications grows, fueling demand for ever more powerful systems capable of rendering ever more complex scenes. There is a compelling need for low-cost high-performance systems capable of handling scenes with high depth complexity, i.e., densely occluded scenes (for example, a scene in which ten polygons overlap on the screen at each pixel, on average).

There is presently an obstacle to achieving high performance in processing densely occluded scenes. In typical computer graphics systems, the model is stored on a host computer which sends scene polygons to a hardware rasterizer which renders them into the rasterizer's dedicated image memory. When rendering densely occluded scenes with such systems, the bandwidth of the rasterizer's image memory is often a performance bottleneck.

Traffic between the rasterizer and its image memory increases in approximate proportion to the depth complexity of the scene. Consequently, frame rate decreases in approximate proportion to depth complexity, resulting in poor performance for densely occluded scenes.

A second potential bottleneck is the bandwidth of the bus connecting the host and the rasterizer, since the description of the scene may be very complex and needs to be sent on this bus to the rasterizer every frame. Although memory bus bandwidth has been increasing steadily, processor speed has been increasing faster than associated memory and bus speeds.

Consequently, bandwidth limitations can become relatively more acute over time. In the prior art, designers of hardware rasterizers have addressed the bottleneck between the rasterizer and bandwidth through interleaving and reducing bandwidth requirements by using smart memory.

Interleaving is commonly employed in high-performance graphics work stations. For example, the SGI Reality Engine achieves a pixel fill rate of roughly 80 megapixels per second using 80 banks of memory.

An alternative approach to solving the bandwidth problem is called the smart memory technique. One example of this technique is the Pixel-Planes architecture. The memory system in this architecture takes as input a polygon defined by its edge equations and writes all of the pixels inside the polygon, so the effective bandwidth is very high for large polygons.

Another smart-memory approach is "FBRAM," a memory-chip architecture with on-chip support for z-buffering and compositing. With such a chip, the read-modify-write cycle needed for z-buffering can be replaced with only writes, and as a result, the effective drawing bandwidth is higher than standard memory. All of these methods improve performance, but they involve additional expense, and they have other limitations. Considering cost first, these methods are relatively expensive which precludes their use in low-end PC and consumer systems that are very price sensitive.

A typical low-cost three-dimensional rasterization system consists of a single rasterizer chip connected to a dedicated frame-buffer memory system, which in turn consists of a single bank of memory. Such a system cannot be highly interleaved because a full-screen image requires only a few memory chips (one 16 megabyte memory chip can store a 1024 by 1024 by 16 bit image), and including additional memory chips is too expensive.

Providing smart memory, such as FBRAM, is an option, but the chips usually used here are produced in much lower volumes than standard memory chips and are often considerably more expensive. Even when the cost of this option is justified, its performance can be inadequate when processing very densely occluded scenes.

Moreover, neither interleaving nor smart memory addresses the root cause of inefficiency in processing densely occluded scenes, which is that most work is expended processing occluded geometry. Conventional rasterization needs to traverse every pixel on every polygon, even if a polygon is entirely occluded.

Hence, there is a need to incorporate occlusion culling into hardware renderers, by which is meant culling of occluded geometry before rasterization, so that memory traffic during rasterization is devoted to processing only visible and nearly visible polygons. Interleaving, smart memory, and occlusion culling all improve performance in processing densely occluded scenes, and they can be used together or separately.

DISCLOSURE OF THE INVENTION

A system and method are provided for accelerating graphics processing utilizing multiple-pass rendering. Initially, geometry operations are performed on graphics data, and the graphics data is stored in memory. During a first rendering pass, various operations take place. For example, the graphics data is read from the memory, and the graphics data is rasterized. Moreover, first z-culling operations are performed utilizing the graphics data. Such first z-culling operations maintain a first occlusion image. During a second rendering pass, the graphics data is read from memory. Still yet, the graphics data is rasterized and second z-culling operations are performed utilizing the graphics data and the first occlusion image. Moreover, visibility operations are performed utilizing the graphics data and a second occlusion image. Raster-processor operations are also performed utilizing the graphics data, during the second rendering pass.

In one embodiment, the visibility operations may be done on a finer spatial resolution than the first z-culling operations. Moreover, the visibility operations may be done on a finer spatial resolution than the second z-culling operations. Still yet, the first pass may take more time than the second pass. Thus, the first z-culling operations are low-bandwidth z-culling operations by virtue of the fact that the first occlusion image requires less storage than the second occlusion image.

In another embodiment, the graphics data may include a first portion and a second portion. Such first portion of the graphics data is read from the memory during the first pass, and the first portion and the second portion of the graphics data are read from the memory during the second pass.

As an option, the first portion of the graphics data includes position information, bounding box information, and/or position-related state information. Such bounding box information may be supplied by a graphics application program. With respect to the second portion, such graphics data may include color information, texture coordinates, and/or color-related state information.

In another embodiment, at least a portion of processing in the first pass is capable of being avoided based on the position-related state information and/or the bounding box information. In a similar manner, at least a portion of processing in the second pass is capable of being avoided based on the position-related state information, the color-related state information, and/or the bounding box information.

Still yet, at least a portion of processing in either the first pass or the second pass is capable of being avoided based on automatic clustering of the graphics data, branching among addresses in an associated graphics application program, and/or discarding a portion of the graphics data.

In still another embodiment, the memory may include a first-in-twice-out buffer. Such memory may be controlled by a memory controller. With this structure, the first portion of the graphics data may be read from the memory during the first pass, and the first portion and the second portion of the graphics data may be read from the memory during the second pass. Optionally, the second portion of the graphics data may also be read from the memory during the first pass.

As another option, a performance of the first z-culling operations may be monitored utilizing counters. Thus, the first pass may be conditionally avoided based on the monitored performance of the first z-culling operations. Still yet, the graphics data may be conditionally stored in the memory based on a state vector. Moreover, the first pass may be terminated after the first z-culling operations.

In still yet another embodiment, the geometry operations may include back-face culling, clipping and/or lighting.

In a system embodiment for accelerating graphics processing utilizing multiple-pass rendering, various components may be provided. Included is a geometry module for performing geometry operations on the graphics data. A memory controller is coupled to the geometry module for storing the graphics data in memory. Logic is provided for controlling the memory controller, a rasterizer, a z-culling module, and a raster-processor module coupled in a graphics pipeline configuration for executing processing including the various functionality set forth hereinabove.

These and other advantages of the present invention will become apparent upon reading the following detailed description and studying the various figures of the drawings.

BRIEF DESCRIPTION OF THE DRAWINGS

FIG. 22b is an illustration of the coverage mask of triangle Q in FIG. 22a.

FIG. 22c is an illustration of the coverage mask of triangle R in FIG. 22a.

FIGS. 32A–32H illustrate the manner in which the zfar value(s) and mask are updated in various cases.

DESCRIPTION OF THE PREFERRED EMBODIMENTS

Figure 1:
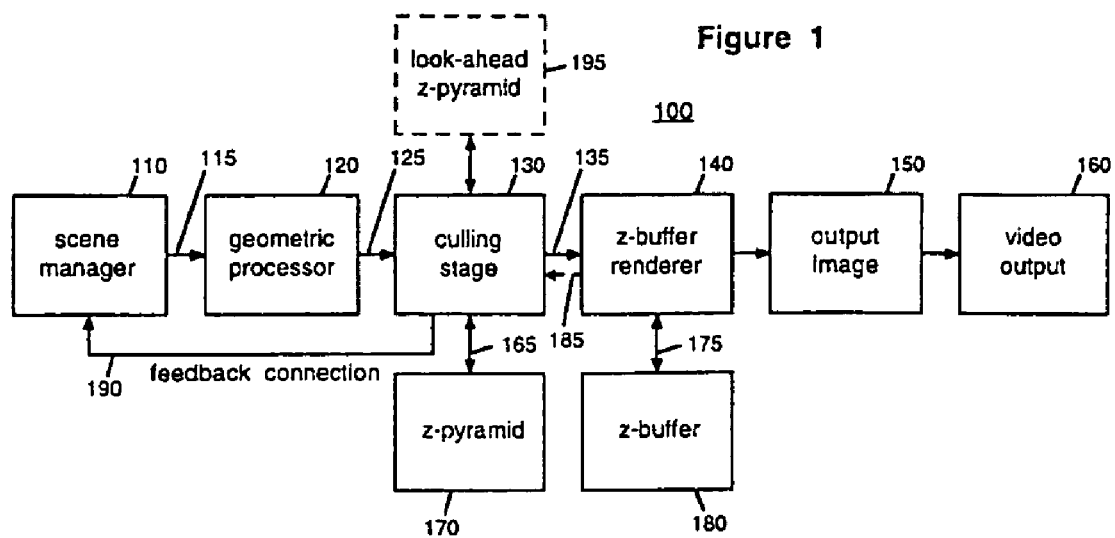
FIG. 1 is a block diagram of the preferred embodiment of the invention.

One of the key features in the preferred embodiment is to separate culling of occluded geometry from rendering of visible geometry, so that culling operations are optimized independently. According to this feature, a separate culling stage in the graphics pipeline culls occluded geometry and passes visible geometry on to a rendering stage.

The culling stage maintains its own z-pyramid in which z-values are stored at low precision in order to reduce storage requirements and memory traffic. For example, z-values may be stored as 8-bit values instead of the customary 24-bit or 32-bit values.

Alternatively, occlusion information can be stored in novel data structures which require less storage than a z-pyramid consisting of arrays of z-values.

A second, independent method for reducing storage requirements and memory traffic is to use a low-resolution z-pyramid where each z-value in the finest level is a conservative zfar value for a group of image samples.

The novel algorithm presented herein involving hierarchical z-buffering is more efficient and more suitable for hardware implementation than algorithms that have been used previously. The algorithm performs z-buffer tiling hierarchically on N×N regions of image space using a z-pyramid having N×N decimation from level to level to store the depths of previously rendered polygons.

At each cell encountered during hierarchical tiling of a polygon, conservative culling is performed very efficiently by comparing the z-pyramid value to the depth of the plane of the polygon. This routine hierarchically evaluates the line and plane equations describing a polygon using a novel algorithm that does not require general-purpose multiplication (except for set-up computations).

This evaluation method can also be applied to shading and interpolation computations that require evaluation of polynomial equations at samples within a spatial hierarchy. The framework just described is particularly attractive for hardware implementation because of its simplicity and computational efficiency and the fact that image memory is accessed in N×N tiles during the read-compare-write cycle for depth values.

Definitions.

Culling procedures that may fail to cull occluded geometry but never cull visible geometry are defined as conservative.

Z-buffering determines which scene primitive is visible at each sample point on an image raster.

Each sample point on the image raster is defined as an image sample, and the depth at an image sample is called a depth sample. A z-buffer maintains one depth sample for each point in the image raster. If individual points in the image raster correspond to individual pixels, it is referred to as point sampling.

An alternative is to maintain multiple depth samples within each pixel to permit antialiasing by oversampling and filtering.

A cell in the z-pyramid is the region of the screen corresponding to a value in the z-pyramid. Preferably, at the finest level of the z-pyramid, cells correspond to depth samples—depths at pixels when point sampling and depths at subpixel samples when oversampling. At coarser levels of the z-pyramid, cells correspond to square regions of the screen, as with image pyramids in general.

N×N decimation from level to level of the z-pyramid is used. N×N blocks of cells that are implicit in the structure of the z-pyramid are identified as tiles or N×N tiles.

A z-pyramid will sometimes be referred to simply as a pyramid. The term bounding box, sometimes shortened to box, is applied to bounding volumes of any shape, including the degenerate case of a single polygon (thus, the term includes polygonal "portals" employed by some culling methods).

Although the tiling algorithm described herein is adapted for z-buffering of polygons, z-buffering can also be applied to other types of geometric primitives, for example, quadric surfaces.

The term primitive applies to all types of geometric primitives including polygons.

As used herein, the term "object" (or "geometric object") is more general than the term "primitive" (or "geometric primitive"), since it may refer to a primitive, a bounding box, a face of a bounding box, and so forth.

A primitive, bounding box, or other geometric object is occluded if it is known to be occluded at all image samples that it covers, it is visible if it is known to be visible at one or more image samples, and otherwise, it is potentially visible.

For convenience, in some cases, visible and potentially visible objects are collectively referred to as visible.

Apparatus.

FIG. 1 illustrates a preferred embodiment of the present invention in which the numeral 100 identifies a graphics system for rendering geometric models represented by polygons. The graphics system includes a scene manager 110 which sends scene geometry to a geometric processor 120.

The geometric processor 120, in turn, transforms the geometry to perspective space and sends it on to a culling stage 130, which culls occluded geometry and passes visible polygons to a z-buffer rendering stage 140 which generates the output image 150 which is converted to video format in a video output stage 160.

Both the culling stage 130 and the z-buffer renderer 140 have their own dedicated depth buffers, a z-pyramid 170 in the case of the culling stage 130 and a conventional z-buffer 180 in the case of the z-buffer renderer 140. Preferably, the z-buffer 180 and the finest level of the z-pyramid 170 have the same resolution and the same arrangement of image samples.

A "feedback connection" 190 enables the culling stage 130 to report the visibility status of bounding boxes to the scene manager 110 and, also, to send z-pyramid z-values to the scene manager 110.

The culling stage 130 is optimized for very high-performance culling by performing hierarchical z-buffering using a dedicated z-pyramid 170 in which z-values are stored at low precision (for example, 8 bits per z-value) in order to conserve storage and memory bandwidth.

In addition to storing z-values at low precision, the culling stage 130 may also compute z-values at low precision to accelerate computation and simplify computational logic.

Since z-values in the z-pyramid 170 are stored at low precision, each value represents a small range of depths. Therefore, visibility at image samples is not always established definitively by the culling stage 130.

However, computations within the culling stage 130 are structured so that culling is conservative, meaning that some occluded geometry can fail to be culled but visible geometry is never culled. Visibility at image samples is established definitively by the z-buffer renderer 140, since z-values within its z-buffer 180 are stored at full precision (e.g. 32 bits per z-value).

Because of the difference in depth-buffer precision between the z-buffer 180 and the z-pyramid 170, some potentially visible polygons sent from the culling stage 130 on to the z-buffer renderer 140 may not contribute visible samples to the output image 150.

The total amount of storage required by the low-precision z-pyramid in the culling stage is less than the total amount of storage required by the z-buffer in the rendering stage. For example, if each z-value in a z-pyramid having 4×4 decimation is stored in 8 bits and each z-value in a z-buffer having the same resolution is stored in 32 bits, the number of bits in each z-value in the z-buffer is four times the number of bits in each z-value in the z-pyramid, and the total bits of storage in the z-buffer is approximately 3.75 times the total bits of storage in the z-pyramid.

If instead, each z-value in the z-pyramid is stored in 4 bits, the number of bits in each z-value in the z-buffer is eight times the number of bits in each z-value in the z-pyramid, and the total bits of storage in the z-buffer is approximately 7.5 times the total bits of storage in the z-pyramid.

Within the culling stage 130, hierarchical z-buffering is performed using a hierarchical tiling algorithm which includes a hierarchical method for evaluating the linear equations describing polygons according to the invention.

The advantage of this hierarchical evaluation method is that it does not require general-purpose multiplication, enabling implementation with faster and more compact logic. These aspects of the invention will be described in more detail hereinafter.

Figure 2:
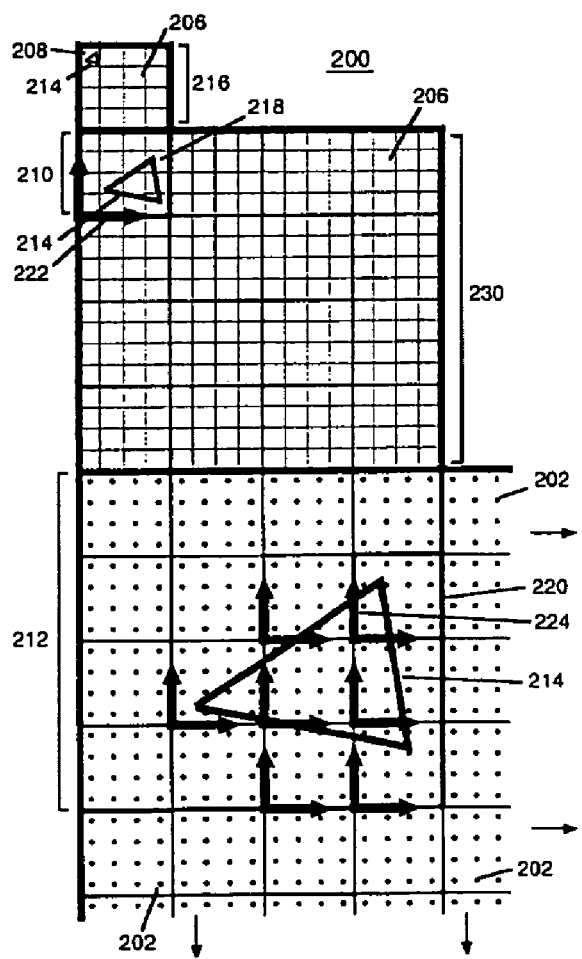
FIG. 2 is an illustration of a z-pyramid organized in 4×4 tiles.

To facilitate reading and writing in blocks, the z-pyramid is organized preferably in N×N tiles, as illustrated in FIG. 2 for a three-level pyramid 200 organized in 4×4 tiles. Each tile is a 4×4 array of "cells," which are samples 202 at the finest level of the pyramid and square regions of the screen 206 at the other levels.

4×4 tiles are preferred over other alternatives, such as 2×2 or 8×8 tiles, because with 16 z-values, 4×4 tiles are large enough for efficient memory access and small enough that the utilization of fetched values is reasonably high.

Within the z-pyramid, tiles are "nested:" an N×N tile at the finest level corresponds to a cell inside its "parent tile" at the next-to-finest level, this parent tile corresponds to a cell inside a "grandparent tile" at the adjacent coarser level, and so forth for all "ancestors" of a given tile.

For example, 4×4 tile 220 corresponds to cell 218 inside parent tile 210, and tile 210 corresponds to cell 208 inside grandparent tile 216. In this example, tile 220 "corresponds to" cell 218 in the sense that tile 220 and cell 218 cover the same square region of the screen.

In FIG. 2, the image raster is a 64×64 array of depth samples 202 arranged in a uniform grid, only part of which is shown to conserve space.

When point sampling, these depth samples correspond to a 64×64 array of pixels. Alternatively, when oversampling with a 4×4 array of depth samples within each pixel, this image raster corresponds to a 16×16 array of pixels. Of course, z-pyramids normally have much higher resolution than illustrated in this example.

Herein, as applied to a z-pyramid, the term resolution means the resolution of the z-pyramid's finest level.

The z-value associated with each cell of a z-pyramid is the farthest depth sample in the corresponding region of the screen. For example, in FIG. 2 the z-value associated with cell 208 is the farthest of the 16 corresponding z-values in tile 210 in the adjacent finer level and, also, is the farthest of the 256 depth samples in the corresponding region of the finest level 212 (this region is a 4×4 array of 4×4 tiles).

Thus, the finest level of the z-pyramid 200 is a z-buffer containing the depth of the nearest primitive encountered so far at each image sample, and the other levels contain zfar values, indicating the depths of the farthest depth samples in the z-buffer within the corresponding square regions of the screen.

Since a z-pyramid has a plurality of levels which are each a depth buffer, it can also be described as a hierarchical depth buffer.

Although the z-pyramid of FIG. 2 is organized in N×N tiles, in general, z-pyramid tiles are not necessarily square and need not have the same number of rows and columns. The illustrated structure of nested squares can be modified to accommodate non-square images of arbitrary resolution by storing values for only cells within a rectangular region of each pyramid level. In FIG. 2 of the drawings, image samples are arranged on a regular grid. Alternatively, samples can be "jittered" to reduce aliasing.

The Scene Manager.

The scene manager 110 is implemented in software running on a host processor.

It reads the scene model from memory, maintains geometric data structures for the scene model, and initiates the flow of geometry through the graphics system 100. It also initiates commands, such as those that initialize the output image and depth buffers prior to rendering a frame (all values in the z-buffer 180 and z-pyramid 170 are initialized to the depth of the far clipping plane).

The system is structured to operate with or without "box culling" (culling of parts of the scene that are inside occluded bounding boxes). Preferably, densely occluded scenes are rendered with box culling, since this accelerates frame generation.

Rendering a Scene without Box Culling.

Figure 3:
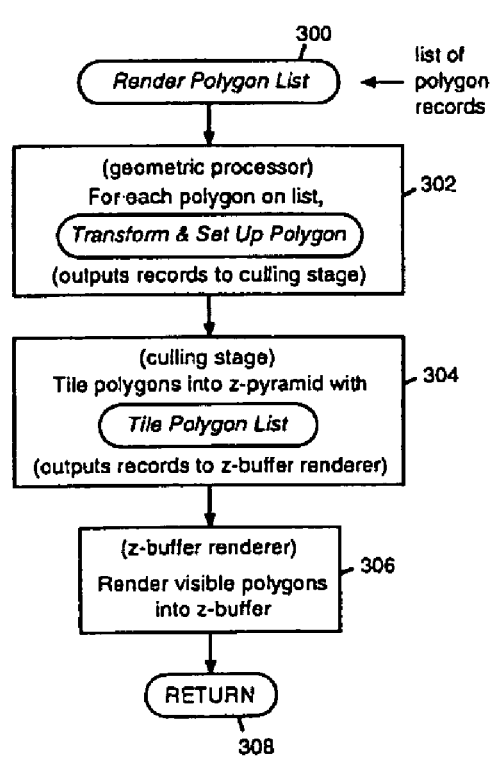
FIG. 3 is a flowchart of the method for rendering a list of polygons.

In this mode of operation, the scene manager 110 can send all polygons in the scene through the system in a single stream. Each polygon in the stream is transformed to perspective space by the geometric processor 120, tiled into the z-pyramid 170 by the culling stage 130 and, if not culled by the culling stage 130, z-buffered into the output image 150 by the z-buffer renderer 140. This sequence of operations is summarized in procedure Render Polygon List 300, shown in the flowchart of FIG. 3. According to the procedure 300, the geometric processor 120 receives records for polygons from the scene manager 110 and processes them using procedure Transform & Set Up Polygon 900 (step 302), which transforms each polygon to perspective space and performs "set-up" computations.

Transform & Set Up Polygon 900 also creates two records for each polygon, a tiling record containing geometric information that the culling stage 130 needs to perform hierarchical tiling, and a rendering record containing the information needed by the z-buffer renderer 140 to render the polygon. The geometric processor 120 outputs these records to the culling stage 130.

In step 304 of Render Polygon List 300, the culling stage 130 processes these records using procedure Tile Polygon List 800, which tiles each polygon into the z-pyramid 170 and determines whether it is visible. For each visible polygon, the culling stage 130 sends the corresponding rendering record on to the z-buffer renderer 140, which renders the polygon into the output image 150 using conventional z-buffering (step 306). When all polygons have been processed, the output image is complete.

Procedures Transform & Set Up Polygon 900 and Tile Polygon List 800 will be described in more detail later.

Rendering a Scene with Box Culling.

To render a scene with box culling, the scene is organized in bounding boxes having polygonal faces. Before processing the geometry inside a box, the box is tested for occlusion, and if it is occluded, the geometry contained in the box is culled. Box culling can accelerate rendering a great deal.

Processing the boxes in a scene in near-to-far order maximizes culling efficiency and minimizes computation and memory traffic. One way to facilitate near-to-far traversal is to organize polygons into a spatial hierarchy such as an octree. However, building and maintaining a spatial hierarchy complicates the software interface and requires additional storage.

Another way to achieve favorable traversal order is to sort boxes into strict near-to-far order at the beginning of a frame. However, this method requires considerable computation when there are numerous boxes. The preferred embodiment employs a unique ordering system that quickly sorts the boxes into approximate near-to-far order.

Figure 4:
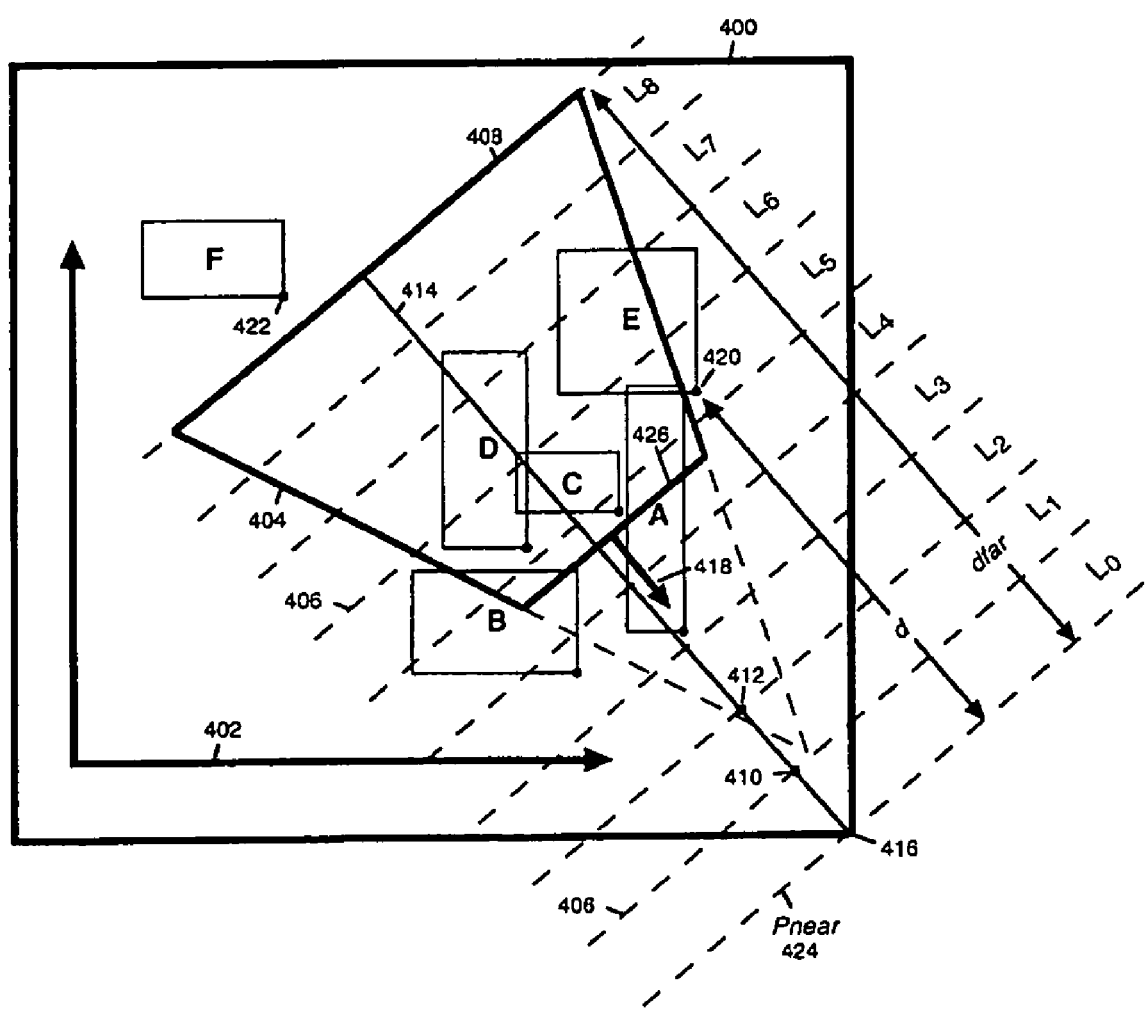
FIG. 4 is an illustration showing the relationship of bounding boxes to the view frustum in model space.

The unique ordering system of the invention is illustrated in FIG. 4, which shows the bounding box 400 of all scene geometry within the model-space coordinate frame 402, the view frustum 404 (which is oriented so that four of its faces are perpendicular to the page, for ease of illustration), six bounding boxes labeled A–F, and nine "layers" L0, L1 . . . , L8 defined by planes 406 that are parallel to the far clipping plane 408.

The planes 406 appear as lines in the illustration because they are perpendicular to the page. The planes 406 pass through equally spaced points (e.g. 410, 412) on the line 414 that is perpendicular to the far clipping plane 408 and passes through the corner of model space 416 that is farthest in the "near direction," where the near direction is the direction of the outward-pointing normal 418 to the "near" face 426 of the view frustum 404. The plane through the nearest corner 416 of model space is called Pnear 424, where the "nearest corner" of a box is the corner which lies farthest in the near direction.

Figure 5:
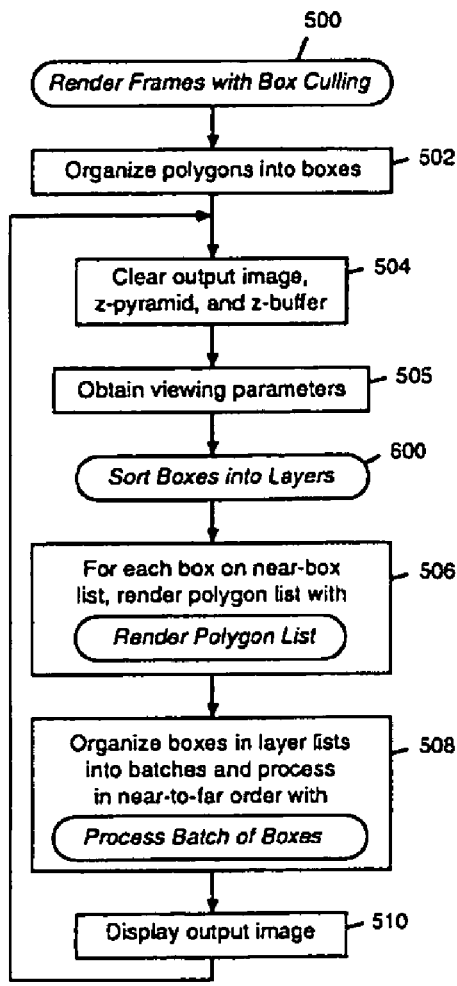
FIG. 5 is a flowchart of the method for rendering frames with box culling.

Procedure Render Frames with Box Culling 500, illustrated in FIG. 5 of the drawings, is used to render a sequence of frames with box culling. In step 502, scene polygons are organized into bounding boxes, each containing some manageable number of polygons (e.g., between 50 and 100).

The record for each box includes a polygon list, which may be a list of pointers to polygons rather than polygon records. If a particular polygon does not fit conveniently in a single box, the polygon's pointer can be stored with more than one box. Alternatively, the polygon can be clipped to the bounds of each of the boxes that it intersects.

Next, step 504 begins the processing of a frame by clearing the output image 150, the z-pyramid 170, and the z-buffer 180 (z-values are initialized to the depth of the far clipping plane).

Next, at step 505, viewing parameters for the next frame to be rendered are obtained.

Then, procedure Sort Boxes into Layers 600 organizes the bounding boxes into "layers," the record for each layer including the boxes whose "nearest corner" lies within that layer. Sort Boxes into Layers 600 also makes a list of boxes that intersect the near face of the view frustum. Boxes on this "near-box list" are known to be visible.

Next, step 506 loops over all boxes on the near-box list and renders the polygon list of each box with Render Polygon List 300. Next, step 508 processes layers in near-to-far order, processing the boxes on each layer's list as a "batch" with Process Batch of Boxes 700, which tests boxes for visibility and renders the polygons in visible boxes.

The advantage of processing boxes in batches rather than one at a time is that visibility tests on boxes take time, and the more boxes that are tested at a time, the less the latency per box. Actually, it is not necessary to process each layer as a single batch, but when organizing boxes into batches, layer lists should be utilized to achieve approximate near-to-far traversal.

When all boxes have been processed, the output image is complete so the image is displayed at step 510 and control returns to step 504 to process the next frame.

Figure 6:
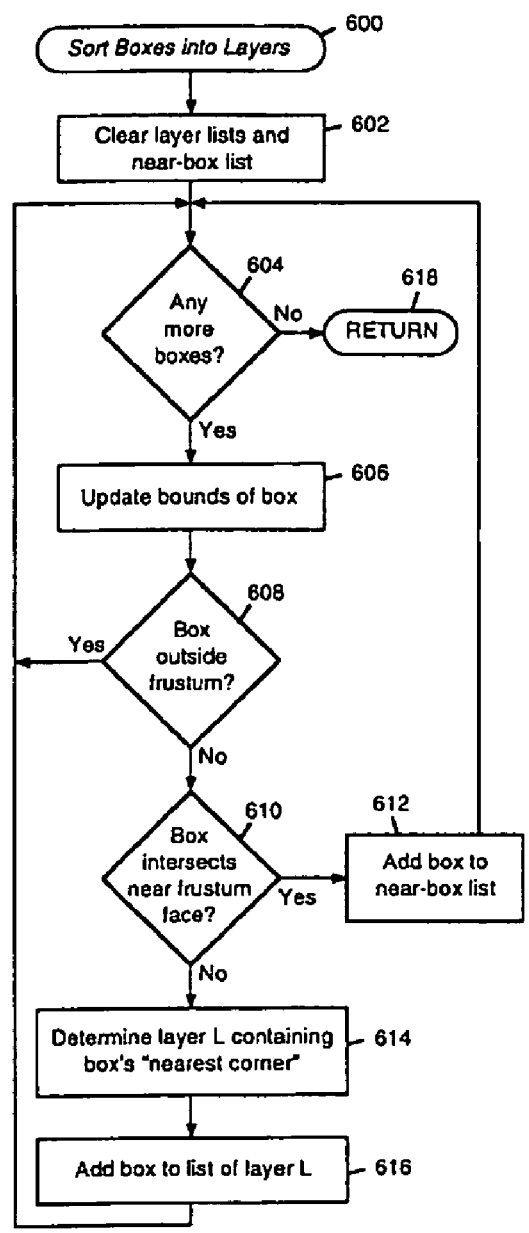
FIG. 6 is a flowchart of the method for sorting bounding boxes into layers.

Procedure Sort Boxes into Layers 600, illustrated in FIG. 6 of the drawings, maintains a list of boxes for each layer. First, step 602 clears the near-box list and the list for each layer to the null list. While boxes remain to be processed (step 604), step 606 determines the bounds of polygons within the box in the current frame.

Actually, this is only necessary when the box contains "moving" polygons, since the bounds of boxes containing only static polygons can be computed before processing the first frame.

Next, step 608 determines whether the box lies outside the view frustum. One fast way to show that a box lies outside the view frustum is to show that it lies entirely outside a face of the frustum. This can be done by substituting one corner of the box into the face's plane equation.

In FIG. 4, for example, the fact that box F's "nearest corner" 422 lies outside the frustum's "far" face 408 establishes that the box lies outside the frustum. The nearest corners of the boxes are marked with a dot in FIG. 4.

If the box is determined to lie outside the frustum at step 608, control returns to step 604. Otherwise, step 610 determines whether the box intersects the "near" face of the view frustum. If so, the box is added to the near-box list at step 612 and control returns to step 604.

If the box does not intersect the near face of the view frustum, control proceeds to step 614. Step 614 determines the index L of the layer containing the box's nearest corner C using the following formula: L=floor(K*d/dfar), where K is the number of layers, d is the distance from point C to plane Pnear 424, dfar is the distance from plane Pnear 424 to the far clipping plane 408, and floor rounds a number to the nearest smaller integer.

For example, in FIG. 4 zfar is labeled, as is depth d for the nearest corner 420 of box E. In this case, the above formula would compute a value of 5 for L, corresponding to layer L5.

Next, in step 616, the box is added to the list for layer L and control returns to step 604. When step 604 determines that all boxes have been processed, the procedure terminates at step 618.

In FIG. 4, Sort Boxes into Layers 600 places boxes A and B in the near-box list, places box C into the list for layer L4, places boxes D and E into the list for layer L5, and culls box F.

In practice, complex scenes contain numerous boxes and layers typically contain many more boxes than in this example, particularly toward the back of the frustum, which is wider. Also, many more layers should be used than shown in this example to improve the accuracy of depth sorting.

Although the boxes in this example are rectangular solids, a box can be defined by any collection of convex polygons.

In summary, procedure Render Frames with Box Culling 500 is an efficient way to achieve approximately near-to-far traversal of boxes without sorting boxes into strict occlusion order or maintaining a spatial hierarchy.

Processing a Batch of Boxes.

Figure 7:
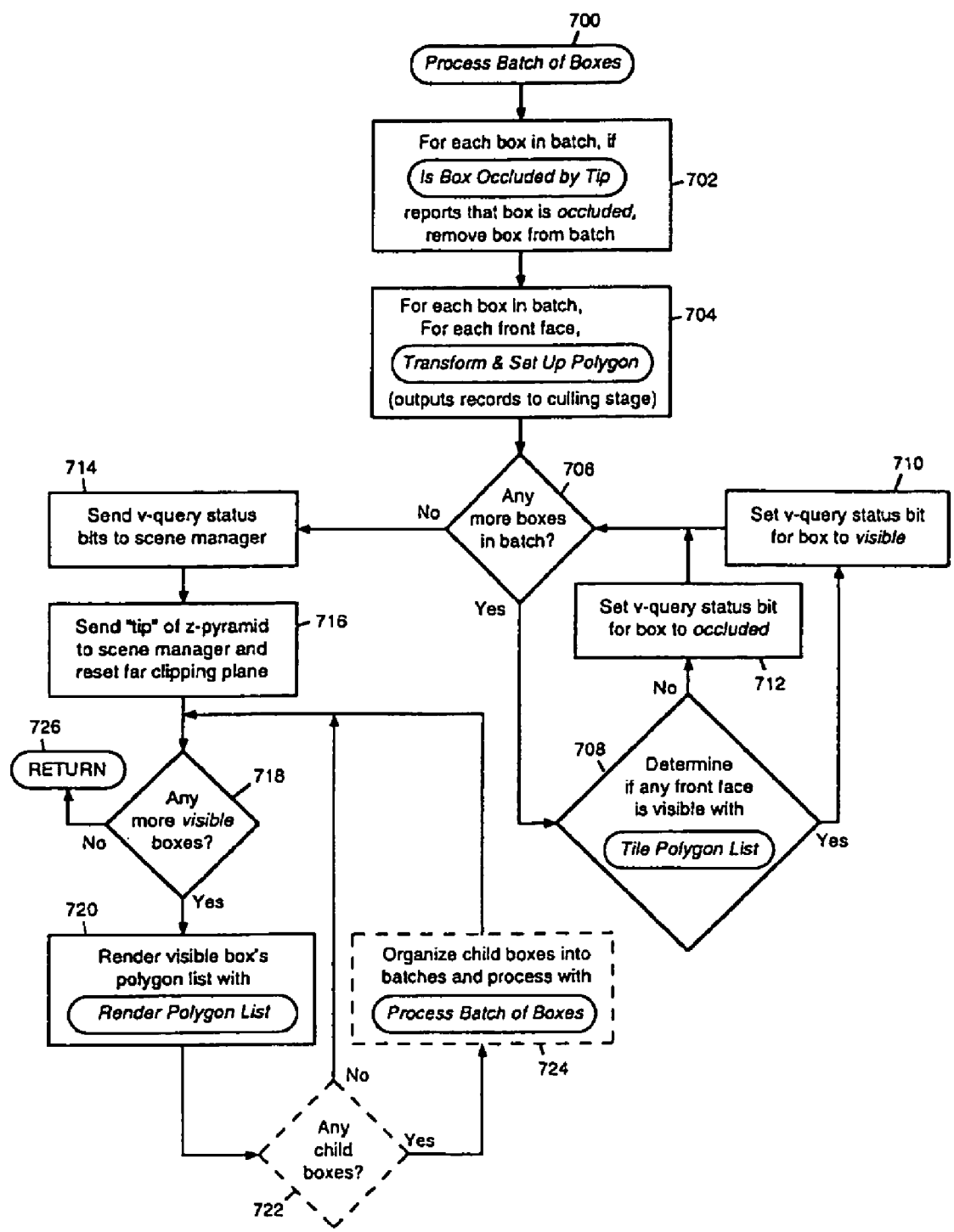
FIG. 7 is a flowchart of the method for processing a batch of bounding boxes.

At step 508 of Render Frames with Box Culling 500, the scene manager 110 organizes boxes into batches and calls procedure Process Batch of Boxes 700 (FIG. 7) to process each batch. Within Process Batch of Boxes 700, the scene manager 110 culls boxes which are occluded by the "tip" of the z-pyramid and sends the remaining boxes to the geometric processor 120, which transforms the boxes and sends them to the culling stage 130, which determines the visibility of each box and reports its status to the scene manager 110 on the feedback connection 190. When this visibility information is sent, the "tip" of the z-pyramid is also sent to the scene manager 110 on the feedback connection 190.

Then, for each visible box, the scene manager 110 sends the box's list of polygons out to be rendered, and if boxes are nested, processes the "child" boxes that are inside each visible box using this same procedure. This cycle of operations, which alternates between processing in v-query mode when testing boxes for visibility and processing in rendering mode when rendering scene polygons, continues until the whole scene has been rendered.

Considering now the steps of procedure Process Batch of Boxes 700 (FIG. 7), in step 702, the scene manager 110 tests each box in the batch to see if it is occluded by the tip of the z-pyramid using procedure Is Box Occluded by Tip 1900, which will be discussed later. Occluded boxes are removed from the batch. Next, the scene manager 110 sends records for the front faces of each box in the batch to the geometric processor 120.

Using procedure Transform & Set Up Polygon 900, the geometric processor 120 transforms each face to perspective space and performs the other geometric computations required to create the tiling record for the face, which is then output to the culling stage 130 (step 704). While boxes remain to be processed (step 706), the visibility of each box is established by the culling stage 130, which determines whether its front faces contain at least one visible sample using procedure Tile Polygon List 800 operating in v-query mode (step 708).

If step 708 establishes that the box is visible, the corresponding "v-query status bit" is set to visible in step 710; otherwise, it is set to occluded in step 712. As indicated by step 706, this sequence of steps for processing boxes continues until all boxes in the batch have been processed.

Then, step 714 sends the v-query status bits for the batch of boxes from the culling stage 130 to the scene manager 110 on the feedback connection 190. Next, step 716 copies the tip of the z-pyramid to the scene manager 110 on the feedback connection 190. The "tip" includes the farthest z-value in the pyramid, the coarsest N×N tile in the pyramid, and perhaps some additional levels of the pyramid (but not the entire pyramid, since this would involve too much work).

If the farthest z-value in the z-pyramid is nearer than the depth of the far clipping plane maintained by the scene manager 110, step 716 resets the far clipping plane to this farthest z-value. Copying the tip of the pyramid enables the scene manager 110 to cull occluded boxes at step 702, as will be described later.

Next, the scene manager 110 checks the v-query status of each box in the batch and initiates processing of the geometry inside each visible box (step 718). In step 720, the list of polygons associated with a visible box is rendered with procedure Render Polygon List 300.

According to procedure Render Frames with Box Culling 500, bounding boxes are not nested, but nested bounding boxes can be handled with recursive calls to Process Batch of Boxes 700, as indicated by optional steps 722 and 724. If there are "child" boxes inside the current box (step 722), in step 724 the scene manager 110 organizes these boxes into one or more batches and processes each batch with this same procedure 700.

Preferably, batches are processed in near-to-far order, since this improves culling efficiency. When all child boxes have been processed (or if there are no child boxes), control returns to step 718, and when all visible boxes have been processed the procedure 700 terminates at step 726.

Culling with the Z-Pyramid.

Figure 8:
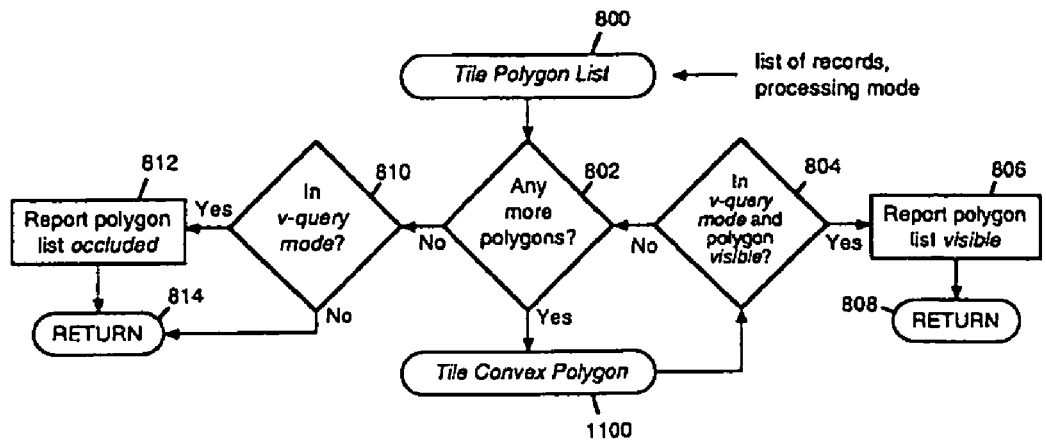
FIG. 8 is a flowchart of the method for tiling a list of polygons.

Tile Polygon List 800 (FIG. 8) is the procedure used by the culling stage 130 to tile a list of polygons. The procedure 800 receives as input from the geometric processor 120 the processing mode, either v-query or render, and a list of records for polygons.

When in render mode the geometric processor 120 outputs a tiling record for each polygon (geometric information that the culling stage 130 needs to perform hierarchical tiling) and a rendering record for each polygon (information needed by the z-buffer renderer 140 to render the polygon). When in v-query mode, the geometric processor 120 only outputs a tiling record for each polygon.

Tile Polygon List 800 operates in render mode at step 304 of procedure Render Polygon List 300, and it operates in v-query mode at step 708 of procedure Process Batch of Boxes 700.

While polygons remain to be processed (step 802), Tile Polygon List 800 passes the processing mode, a tiling record and, if in render mode, a rendering record to Tile Convex Polygon 1100, the hierarchical tiling procedure employed by the culling stage 130. When in v-query mode, this procedure 1100 just determines whether the polygon is visible with respect to the z-pyramid 170.

When in render mode, the procedure 1100 updates the z-pyramid 170 when visible samples are encountered, and if the polygon is visible, outputs its rendering record to the z-buffer renderer 140. At step 804, if in v-query mode and the polygon is visible, step 806 reports that the polygon list is visible and the procedure terminates at step 808.

Otherwise, the procedure returns to step 802 to process the next polygon. If the procedure 800 is still active after the last polygon in the list has been processed, if in v-query mode at step 810, step 812 reports that the polygon list is occluded and then the procedure terminates at step 814.

Instead, if in render mode at step 810, the procedure terminates immediately at step 814.

Tiling Records.

Figure 9:
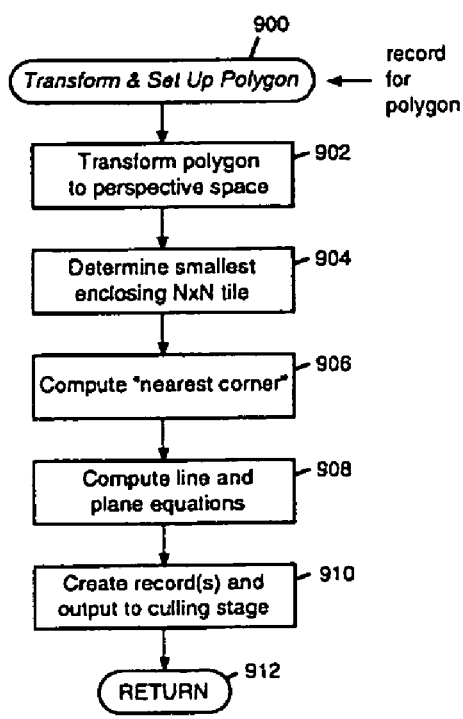
FIG. 9 is a flowchart of the method for geometric processing of a polygon.

Geometric computations are performed on polygons by the geometric processor 120 using procedure Transform & Set Up Polygon 900 (FIG. 9). This procedure 900 is employed in step 302 of procedure Render Polygon List 300 and also in step 704 of Process Batch of Boxes 700.

For each polygon, Transform & Set Up Polygon 900 receives input from the scene manager 110 in the form of a record for the polygon before it has been transformed to perspective space, and for each polygon received, the procedure 900 outputs a tiling record, and when in render mode, it also outputs a rendering record.

First, step 902 transforms the polygon's vertices to perspective space. Next, step 904 determines the smallest N×N tile in the pyramid that encloses the transformed polygon.

For example, in FIG. 2 tile 210 is the smallest enclosing 4×4 tile for triangle 214. (Triangle 214 is also enclosed by 4×4 tile 216, but this tile is considered "larger" than tile 210 because it is larger in screen area—it covers the whole screen, whereas tile 210 covers one-sixteenth of the screen.)

Next, step 906 establishes the corner of the screen where the plane of the polygon is nearest to the viewer (i.e., farthest in the "near" direction). The method for computing this "nearest corner" will be described later, in connection with step 1308 of procedure 1300.

Next, step 908 computes the equation of the plane of the polygon and the equation of each edge of the polygon. The coefficients in these equations are relative to the smallest enclosing N×N tile.

Next, step 910 creates a tiling record for the polygon from the geometric information computed in the preceding steps and outputs this record to the culling stage 130. If in render mode, step 910 also creates a rendering record for the polygon which contains the information needed by the z-buffer renderer 140 to render the polygon, and outputs this record to the culling stage 130. Following step 910, the procedure terminates at step 912.

Geometric information computed for a polygon by Transform & Set Up Polygon 900 is stored in a tiling record 5000 containing the following information.

Tiling Record.
1. level number and index of smallest enclosing tile ("level," "index");
2. screen corner where plane of polygon is nearest ("nearest_corner");
3. number of edges ("n");
4. coefficients (A1,B1,C1), (A2,B2,C2), . . . , (An,Bn,Cn) of edge equations (polygon has n edges); and
5. coefficients (Ap,Bp,Cp) of plane equation.

The level number and index specify the tile in the z-pyramid ("index" is an array index). The numerical values of the coefficients of the edge and plane equations depend on the coordinate frame in which they are computed, and FIG. 10 shows the "standard coordinate frame" that is used for an arbitrary 4×4 tile 1000.

The origin of the coordinate frame is located at the tile's lower-left corner 1002, and the x and y axes 1004 are scaled so that the centers 1006 of cells 1008 correspond to odd integer coordinates and cell borders correspond to even integer coordinates. Thus, if an N×N tile is at the finest level of the pyramid and image samples are arranged on a uniform grid, the coordinates of image samples are the odd integers 1, 3, 5, . . . , 2N−1. If an N×N tile is not at the finest level, its cells are squares whose borders lie on the even integers 0, 2, 4, . . . , 2N. The fact that cell coordinates are small integer values simplifies evaluation of line and plane equations.

Figure 10:
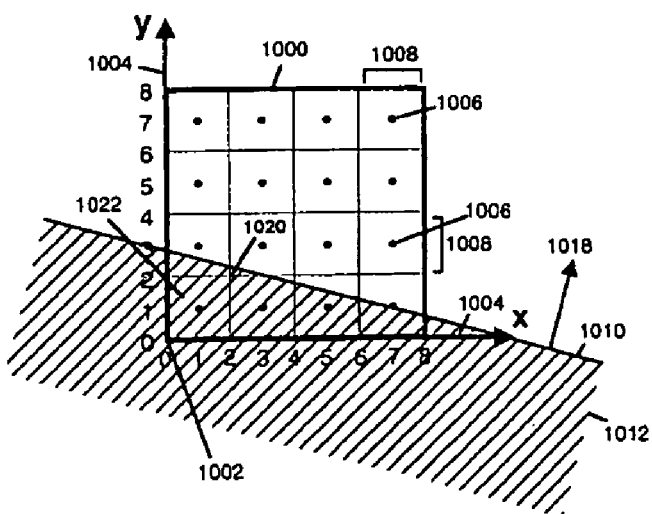
FIG. 10 is an illustration of a 4×4 tile showing its coordinate frame.

Each tile in the z-pyramid has an associated coordinate frame positioned and scaled relative to that tile as illustrated in FIG. 10. For example, FIG. 2 shows the coordinate frames (e.g. 222, 224) of the eight 4×4 tiles that would be traversed during hierarchical tiling of triangle 214.

The Algorithm for Hierarchical Z-buffering.

Figure 11:
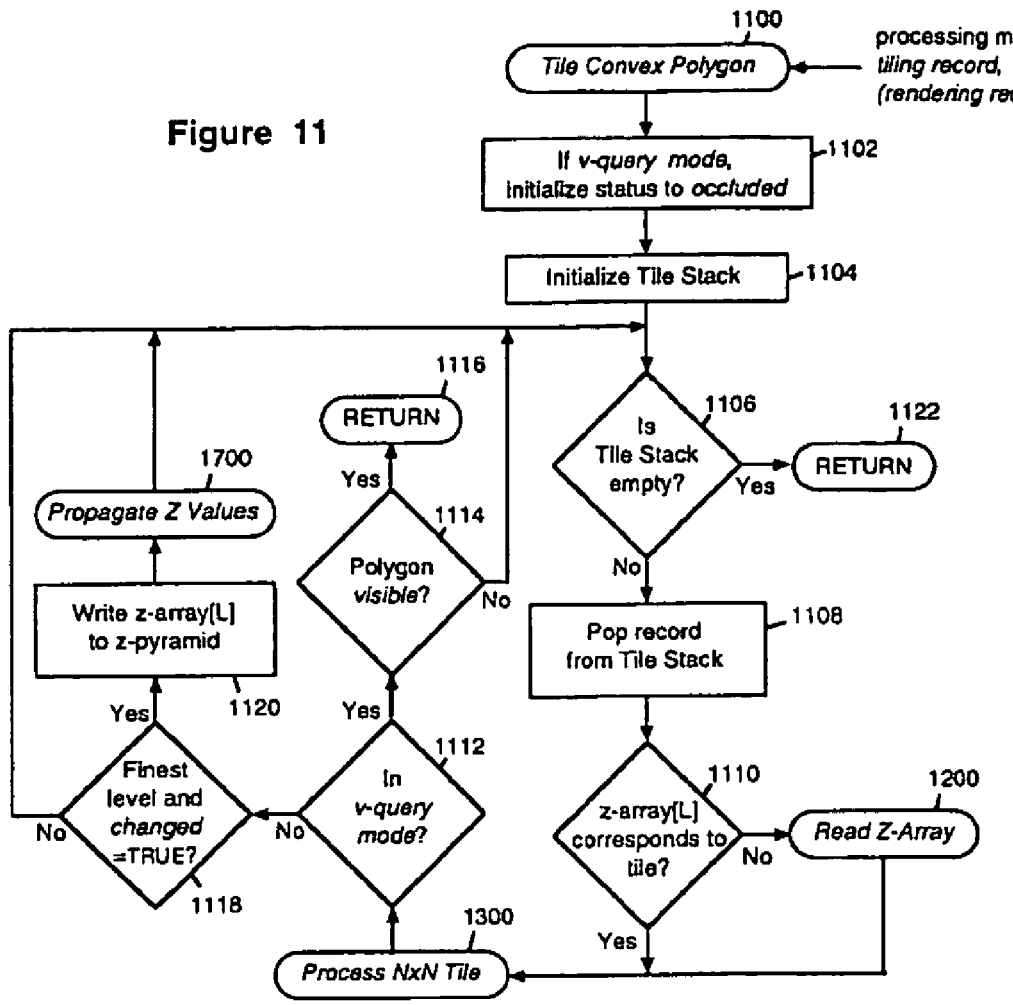
FIG. 11 is a flowchart of the method for tiling a convex polygon.

Within Tile Polygon List 800, the procedure that hierarchically z-buffers a convex polygon is Tile Convex Polygon 1100 (FIG. 11). The input to this procedure 1100 is the processing mode, either render or v-query, a tiling record, and if in render mode, a rendering record.

When in render mode, the procedure 1100 tiles the polygon into the z-pyramid 170, updates z-values when visible samples are encountered, and if the polygon is visible, outputs its rendering record to the z-buffer renderer 140.

When in v-query mode, the polygon is a face of a bounding box and the procedure 1100 determines whether that face contains at least one visible image sample. When in v-query mode, the z-pyramid 170 is never written, and processing stops if and when a visible sample is found.

Now, data structures maintained by Tile Convex Polygon 1100 are described. The procedure 1100 maintains a stack of temporary tile records called the "Tile Stack," which is a standard "last in, first out" stack, meaning that the last record pushed onto the stack is the first record popped off.

The temporary records in the Tile Stack contain the same information as the tiling records previously described, except that it is not necessary to include the polygon's "nearest corner," since this is the same for all tiles.

For each level in the pyramid, Tile Convex Polygon 1100 maintains information about the z-pyramid tile within that level that was accessed most recently. Some of this information is relative to the tile currently being processed, the "current tile." The level record 5100 for level J of the pyramid contains:

Level Record [J].
1. index of corresponding z-pyramid tile, call this tile "T" ("index[J]");
2. N×N array of z-values for tile T ("z-array[J]");
3. farthest z-value in z-array[J], excluding cell containing "current tile" ("zfarx[J]");
4. TRUE/FALSE flag: Is z-array[J] different than z-pyramid record? ("dirty_flag[J]"); and
5. TRUE/FALSE flag: Is tile T an ancestor of current tile? ("ancestor_flag[J]").

As listed above, the level_record[J] contains the index for the corresponding tile "T" in the z-pyramid ("index[J]"), the N×N array of z-values corresponding to tile T ("z-array[J]"), the farthest z-value in z-array[J], excluding the depth of the cell containing the current tile ("zfarx[J]," where subscript "x" alludes to this exclusion rule), a flag indicating whether the values in z-array[J] differ from the corresponding values in the z-pyramid ("dirty_flag[J]"), and a flag indicating whether tile T is an "ancestor" of the current tile ("ancestor flag[J]" is TRUE if the current tile lies inside tile T).

For example, assume that indexes 0, 1, . . . , F refer to the coarsest, next-to-coarsest, . . . , finest levels of the pyramid, respectively. In FIG. 2 of the drawings, while processing tile 220, level_record[0] would correspond to the root tile 216, level_record[1] would correspond to tile 210 (since this would be the most recently accessed tile at level 1), and level_record[2] would correspond to tile 220.

As for ancestor flags, ancestor_flag[0] would be TRUE, since tile 216 is the "grandparent" of tile 220 (in fact, ancestor flag[0] is always TRUE), ancestor_flag[1] is TRUE since tile 210 is the "parent" of tile 220, and ancestor_flag[2] is FALSE, because a tile is not considered to be an ancestor of itself.

According to the algorithm, which will be described later, while processing tile 220, zfarx values are computed for each pyramid level in order to facilitate propagation of z-values when visible samples are found. After processing tile 220, zfarx[0] would be the farthest z-value in tile 216 excluding cell 208 (the cell that contains tile 220), zfarx[1] would be the farthest z-value in tile 210 excluding cell 218 (the cell that contains tile 220), and zfarx[2] would be the farthest of all the z-values in tile 220. Given these zfarx values, at each level of the pyramid, propagation of z-values only requires comparing one or two z-values, as will be described later.

The Tiling Algorithm.

Tile Convex Polygon 1100 starts with step 1102. If in v-query mode, step 1102 initializes the visibility status of the polygon to occluded.

Next, step 1104 initializes the Tile Stack to the tiling record that was input. Ancestor_flags need to be computed when the tile stack is initialized at step 1104. While the Tile Stack is not empty (step 1106), step 1108 gets the record for the next tile to process (the "current tile") by popping it from the stack (initially, this is the tiling record that was input, which corresponds to the smallest enclosing tile).

The level in the pyramid of the current tile is called "L." Step 1110 checks to see if the z-values for the current tile are already in z-array[L] (this can be established by comparing the current tile's index to index[L]). If not, procedure Read Z-Array 1200 reads the z-values for the current tile from the z-pyramid 170 and puts them in z-array[L].

Next, Process N×N Tile 1300 processes each of the cells within the current tile, and if L is not the finest level, for each cell where the polygon is potentially visible, appends a new record to the Tile Stack, as will be described later.

At step 1112, if in v-query mode, control proceeds to step 1114, where if the polygon's status is visible (this is determined in Process N×N Tile 1300), the procedure terminates at step 1116, and otherwise, control returns to step 1106.

If in render mode at step 1112, if L is the finest level of the pyramid and the changed flag is TRUE at step 1118 (this flag is set in Process N×N Tile 1300), step 1120 writes z-array[L] to the z-pyramid 170, Propagate Z-Values 1700 "propagates" z-values through the pyramid (if necessary), and control returns to step 1106.

If L is not the finest level of the pyramid or the changed flag is FALSE at step 1118, control returns directly to step 1106. If the Tile Stack is empty at step 1106, hierarchical tiling of the polygon is complete and the procedure terminates at step 1122. If step 1122 is executed when in v-query mode, the polygon is occluded, but since the polygon's visibility status was initialized to occluded at step 1102, it is not necessary to set the status here.

When in render mode, prior to returning at step 1122 the procedure 1100 can output additional information about a visible polygon to the z-buffer renderer 140. For example, if a polygon is being rendered with texture mapping and texture coordinates are computed during tiling, the bounding box of texture coordinates for the polygon could be output to inform the z-buffer renderer 140 which regions of a texture map will need to be accessed.

Summarizing the role of the Tile Stack in Tile Convex Polygon 1100 when operating in render mode, the tile stack is initialized to a tiling record corresponding to the smallest tile in the z-pyramid that encloses the transformed polygon.

Next, a loop begins with the step of testing whether the Tile Stack is empty, and if so, halting processing of the polygon. Otherwise, a tiling record is popped from the Tile Stack, this tile becoming the "current tile."

If the current tile is not at the finest level of the pyramid, Process N×N Tile 1300 determines the cells within the current tile where the polygon is potentially visible, creates tiling records corresponding to the potentially visible cells and pushes them onto the Tile Stack, and then control returns to the beginning of the loop. If the current tile is at the finest level of the pyramid, Process N×N Tile 1300 determines any visible samples on the polygon, and if visible samples are found, the z-pyramid is updated. Then, control returns to the beginning of the loop.

The basic loop is the same when in v-query mode except that when a visible sample is encountered, the procedure reports that the polygon is visible and then terminates, or if an empty Tile Stack is encountered, the procedure reports that the polygon is occluded and then terminates.

Procedure Tile Convex Polygon 1100 performs hierarchical polygon tiling and hierarchical v-query of polygons by recursive subdivision. The Tile Stack is the key to implementing recursive subdivision with a simple, efficient algorithm that is well suited for implementation in hardware.

The procedure finishes processing one N×N tile before beginning another one, and reads and writes z-values in N×N blocks. These are not features of prior-art software implementations of hierarchical tiling, which use depth-first traversal of the pyramid, processing all "children" of one cell in a tile before processing other cells in the tile.

Thus, with prior-art software methods, the "traversal tree" describing the order in which z-pyramid tiles are traversed is topologically different than with the tiling algorithm presented herein, which is better suited to implementation in hardware.

The following describes the three procedures called by Tile Convex Polygon 1100: Read Z-Array 1200, Process N×N Tile 1300, and Propagate Z-Values 1700.

Figure 12:
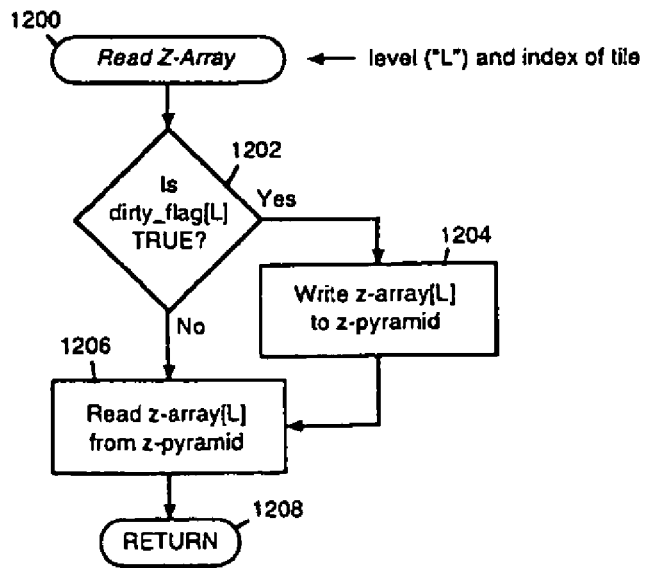
FIG. 12 is a flowchart of the method for reading an array of z-values.

Procedure Read Z-Array 1200 (FIG. 12) reads the N×N array of z-values corresponding to a tile specified by its level number ("L") and index ("I") from the z-pyramid 170 into z-array[L]. At step 1202, if dirty_flag/[L] is TRUE (meaning that the values in z-array[L] have been modified), step 1204 writes z-array[L] to the z-pyramid 170, writes I to index[L], sets dirty_flag/[L] to FALSE, and sets ancestor_flag/[L] to TRUE.

Next, whether or not step 1204 was executed, step 1206 reads z-values for the specified tile from the z-pyramid 170 into z-array[L], and the procedure terminates at step 1208.

Processing of Tiles.

Figure 13:
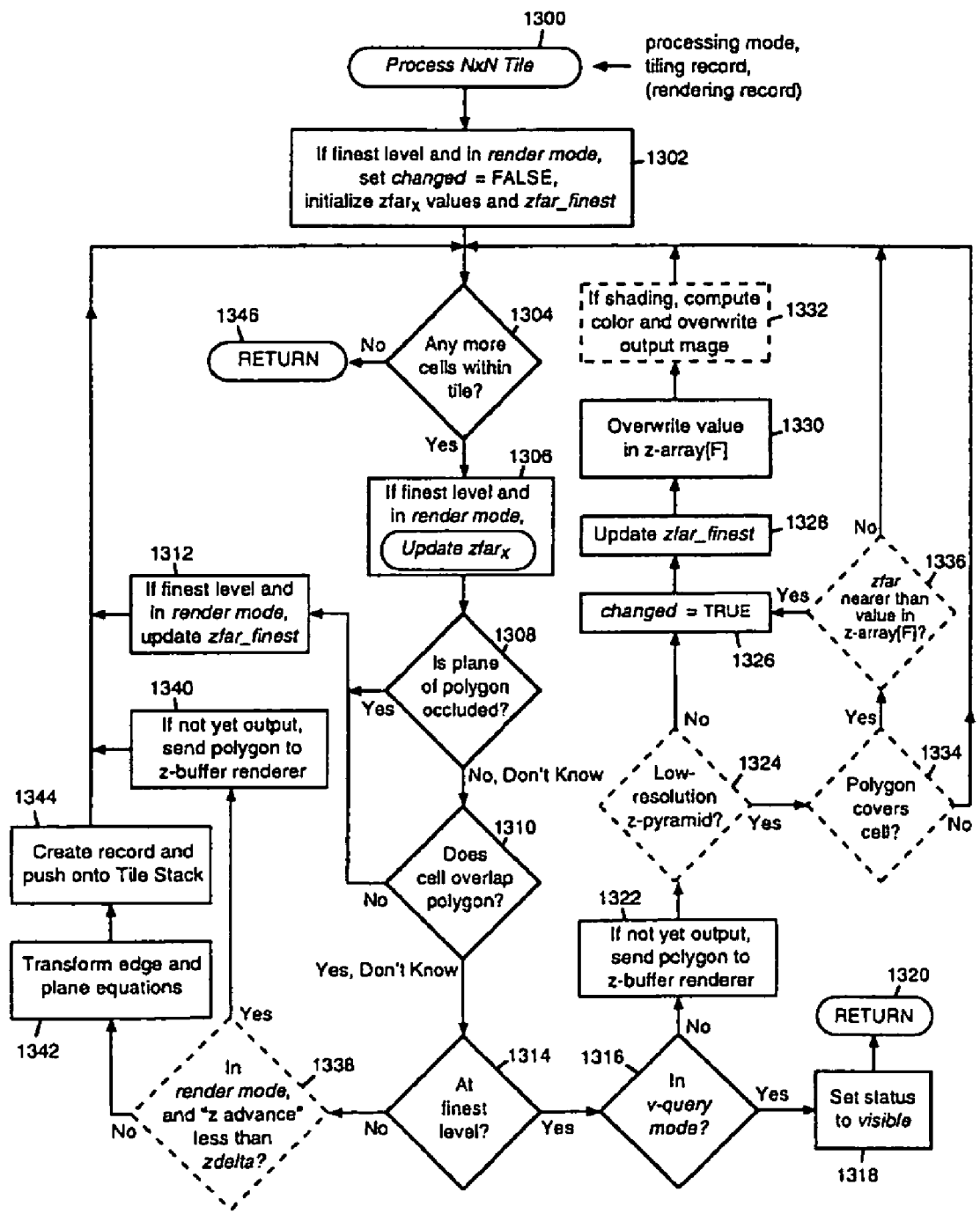
FIG. 13 is a flowchart of the method for processing an N×N tile.

Process N×N Tile 1300 (FIG. 13) loops over each of the N×N cells within a tile, processing them in sequence, for example by looping over the rows and columns of cells within the tile. The tile's level number in the pyramid is called "L" and the cell currently being processed will be called the "current cell."

If L is the finest level and in render mode, step 1302 sets a flag called changed to FALSE, sets a variable called zfar_finest to the depth of the near clipping plane, and sets all values in array zfarx to the depth of the near clipping plane. While cells remain to be processed (step 1304), if L is the finest level and in render mode, step 1306 updates array zfarx using procedure Update zfarx 1600.

Occlusion Test.

Next, step 1308 determines whether the plane of the polygon is occluded within the current cell. The polygon's plane equation, which is stored in the tiling record, has the form:

$$z=Ax+By+C.$$

If the current cell corresponds to an image sample, the depth of the polygon is computed at this sample by substituting the sample's x and y coordinates into the polygon's plane equation.

If the polygon's depth at this point is greater than the corresponding z-value stored in z-array[L] (which is maintained in Tile Convex Polygon 1100), this sample on the polygon is occluded, and control proceeds to step 1312. At step 1312, if at the finest level of the pyramid and in render mode, if the z-value in z-array[L] which corresponds to the current cell is farther than variable zfar_finest, variable zfar_finest is overwritten with that z-value. Following step 1312, control returns to step 1304.

At step 1308, if the current cell corresponds to a square region of the screen (rather than an image sample), the nearest point on the plane of the polygon within that square is determined. This is done by evaluating the plane equation at the corner of the cell where the plane is nearest to the viewer.

Figure 14:
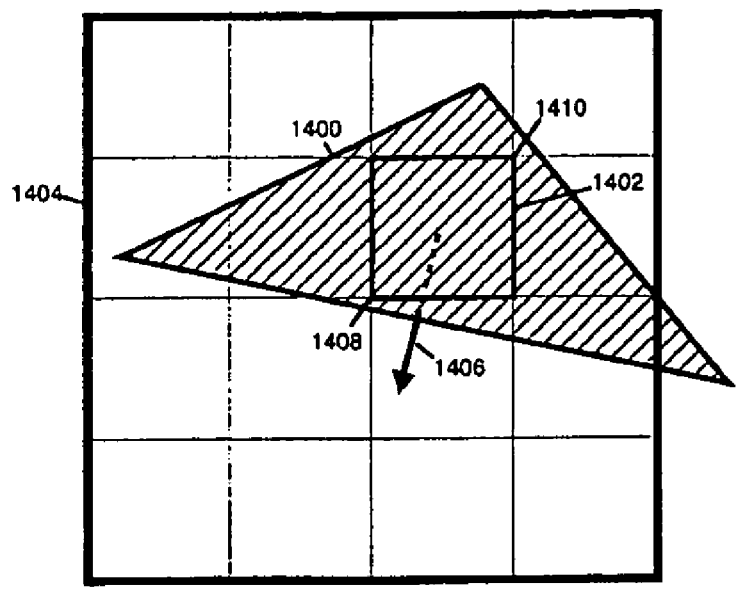
FIG. 14 is an illustration a 4×4 tile and a triangle.

This "nearest corner" can be determined easily from the plane's normal vector using the following method, which is illustrated in FIG. 14.

Suppose that triangle 1400 is being processed within cell 1402 of tile 1404, and vector 1406 is a backward-pointing normal vector (nx,ny,nz). Then the corner of the cell 1402 corresponding to the "quadrant" of vector (nx,ny) indicates the corner where the plane of the polygon is nearest to the viewer.

In this instance, the "nearest corner" is 1408, since nx and ny are both negative. (In general, the +x,+y quadrant is upper right, the +x,−y quadrant is lower right, the −x,−y quadrant is lower left, and the −x,+y quadrant is upper left.)

To help in visualizing this, the normal vector 1406 attaches to the center of the back of the triangle 1400, points into the page, and the dashed portion is occluded by the triangle 1400. Step 906 of Transform & Set Up Polygon 900 uses this method to compute the polygon's nearest corner, which is the same at all tiles.

In the case that the normal vector is forward-pointing instead of backward-pointing, a cell's nearest corner corresponds to the quadrant of vector (−nx,−ny) instead of vector (nx,ny).

The next step is to compute the depth of the plane of the polygon at the nearest corner of the current cell, called the plane's znear value within the cell, by substituting the corner's x and y coordinates into the polygon's plane equation, which has the form z=Ax+By +C, where x and y are even integers. Actually, this equation is evaluated hierarchically, as will be explained later.

Next, the plane's znear value is compared to the zfar value stored in z-array[L] that corresponds to the current cell, and if the znear value is farther than the zfar value, the plane of the polygon is occluded within the current cell and control proceeds to step 1312. Otherwise, control proceeds to step 1310.

The depth comparison described above is the only occlusion test performed on a polygon with respect to a given cell. This single occlusion test is not definitive when the nearest corner of the cell lies outside the polygon.

In this case, rather than perform further computations to establish visibility definitively, the occlusion testing of the polygon with respect to the cell is halted and visibility is resolved by subdivision. This culling method is preferred because of its speed and simplicity.

Figure 28:
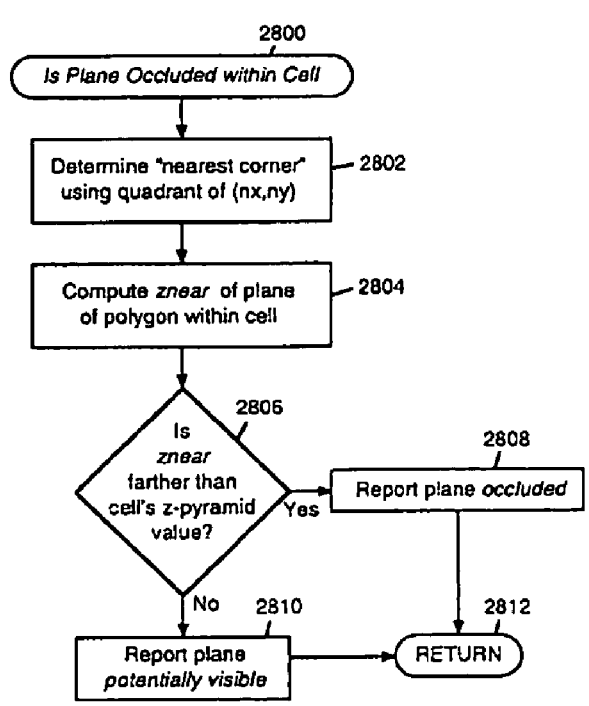
FIG. 28 is a flowchart of the method of determining whether the plane of a polygon is occluded within a cell.

The steps of the above method for testing a polygon for occlusion within a cell covering a square region of the screen are summarized in the flowchart of FIG. 28, which describes the steps performed at step 1308 when the current cell corresponds to a square region of the screen (rather than an image sample).

First, step 2802 determines the corner of the cell where the plane of the polygon is nearest using the quadrant of vector (nx,ny), where (nx,ny,nz) is a backward-pointing normal to the polygon (or if the normal is forward-pointing, the quadrant of vector (−nx,−ny) is used instead).

Next, step 2804 computes the depth of the plane at that "nearest corner," i.e., the plane's znear value. At step 2806, if the plane's znear value is farther than the z-value for the cell stored in the z-pyramid, step 2808 reports that the plane (and hence the polygon) is occluded and the procedure terminates at step 2812.

Otherwise, step 2810 reports that the plane (and hence the polygon) is potentially visible and no further occlusion testing is performed for the polygon with respect to the cell. Following step 2810, the procedure terminates at step 2812.

Figure 26:
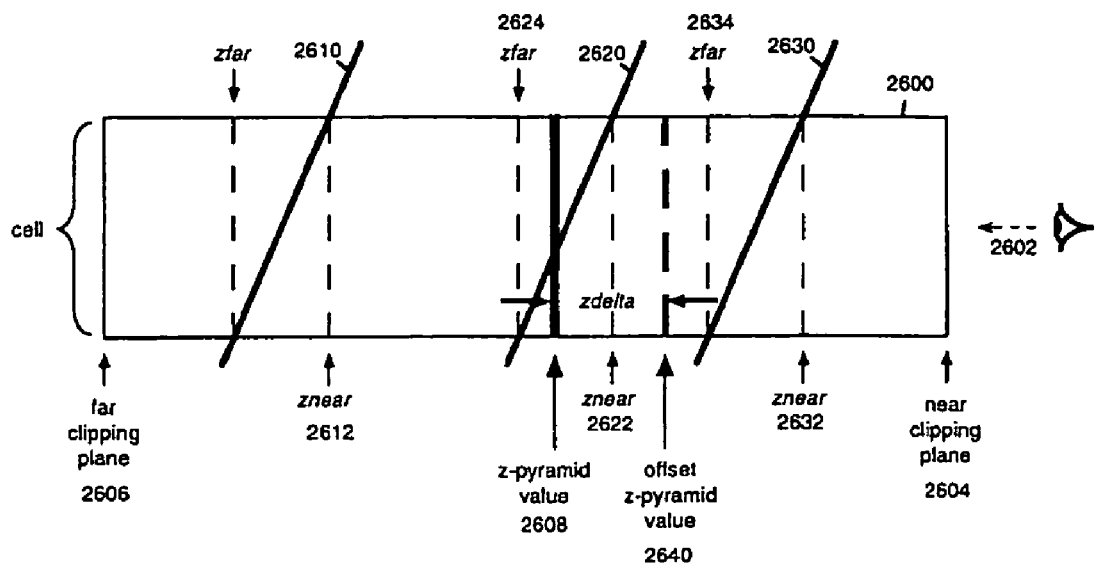
FIG. 26 is a side view of a cell in the z-pyramid which is covered by three polygons.

Examples of occlusion tests performed by procedure Is Plane Occluded within Cell 2800 are illustrated in FIG. 26, which shows a side view of a cell in a z-pyramid, which in three dimensions is a rectangular solid 2600 having a square cross-section. Given the indicated direction of view 2602, the right-hand end 2604 of the solid 2600 is the near clipping plane and the left-hand end 2606 of the solid 2600 is the far clipping plane.

The bold vertical line indicates the current z-value 2608 stored in the z-pyramid cell. The three inclined lines, 2610,

2620, and 2630, indicate the positions of three polygons, each covering the cell and each oriented perpendicular to the page to simplify illustration. For each polygon, the znear and zfar values of its plane within the cell are shown by dashed lines.

Procedure Is Plane Occluded within Cell 2800 would show that polygon 2610 is occluded at the illustrated cell because the znear value 2612 of the polygon's plane is farther than the cell's z-pyramid value 2608. Procedure Is Plane Occluded within Cell 2800 would show that polygon 2620 is potentially visible at the illustrated cell because the znear value 2622 of the polygon's plane is nearer than the cell's z-pyramid value 2608.

It is preferable that z-values within the z-pyramid 170 are stored at low-precision (e.g., in 8 bits), and this complicates depth comparisons slightly. A low-precision z-value can be thought of as representing a small range of z-values in the interval [near far].

If the plane's znear value computed at step 1308 is farther than far, the plane is occluded within the cell, and if znear is nearer than near, the plane is visible within the cell. But if znear is between near and far it cannot be determined whether the plane is visible within the cell.

In this last case, it is assumed that the polygon is visible so that culling will be conservative, never culling a polygon containing a visible image sample. This same analysis is applied in the other conservative culling procedures discussed herein when depth comparisons involving low-precision z-values are performed.

Overlap Tests.

At step 1310 of procedure 1300, the objective is to determine whether the current cell and the polygon overlap on the screen.

There can be no overlap where the current cell lies entirely outside an edge of the polygon. For each of the polygon's edges, it is determined whether the current cell lies outside that edge by substituting the appropriate point into its edge equation, which has the form:

$$Ax+By+C=0.$$

If the current cell corresponds to an image sample, the "appropriate point" is that image sample.

In FIG. 10, assume that tile 1000 is at the finest level of the pyramid and the half-plane 1012 lying outside edge 1010 is defined by the inequality $Ax+By+C<0$. Coefficients A, B, and C in this inequality (which were computed at step 908 of procedure 900) are computed relative to the tile's coordinate frame 1004, and image samples within the tile have odd integer coordinates.

To determine whether an image sample lies outside an edge, its x and y coordinates are substituted into the edge's equation and the sign of the result is checked. Step 1310 performs this test on each edge of the polygon (or until it is determined that the sample lies outside at least one edge). If the sample is outside any edge, control proceeds to step 1312. Otherwise, control proceeds to step 1314.

At step 1310, if the current cell corresponds to a square region of the screen (rather than an image sample), it must be determined whether that square lies entirely outside an edge of the polygon. For each edge, this can be done by substituting the coordinates of a single corner point of the current cell into the edge equation, using the corner that is farthest in the "inside direction" with respect to the edge.

In FIG. 10, the inside direction for edge 1010 is indicated by arrow 1018, the corner of cell 1022 that is farthest in the inside direction is corner 1020, and substituting the corner's x and y coordinates into the equation for edge 1010 shows that corner 1020 and cell 1022 lie outside of edge 1010. The corner points of cells have even integer coordinates, (2,2) in the case of point 1020.

Step 1310 determines whether the current cell lies outside any edge of a polygon by using this method to compare the cell to each edge.

This method is not a definitive cell-polygon intersection test, but it is simple and conservative, never culling a cell containing a visible image sample. If the current cell is outside any edge, control proceeds to step 1312. Otherwise, control proceeds to step 1314.

Step 1308 and each of the "outside-edge" tests of step 1310 can all be done in parallel.

At step 1314, if L is the finest level, a visible image sample has been found, and control proceeds to step 1316.

If in v-query mode at step 1316, step 1318 sets the polygon's visibility status to visible and the procedure terminates at step 1320. If not in v-query mode, if the polygon's rendering record has not yet been output to the z-buffer renderer 140, this is done at step 1322.

In the preferred embodiment of the invention, the resolution of the finest level of the z-pyramid 170 is the same as the resolution of the image raster. However, it is also possible to use a low-resolution z-pyramid. This option and associated steps 1334 and 1336 will be described in more detail later.

Assuming a full-resolution z-pyramid 170, following step 1322, step 1326 sets the changed flag to TRUE. Next, step 1328 updates zfar_finest, a variable that keeps track of the farthest z-value encountered thus far within the current tile. Accordingly, if the z-value computed for the current cell at step 1308 is farther than zfar_finest, zfar_finest is overwritten with that z-value.

Next, step 1330 writes the z-value computed for the polygon at step 1308 to the appropriate entry in z-array[F] (where F is the index of the finest pyramid level).

It is possible to update the z-pyramid 170 directly at this step, but to improve efficiency, preferably, the z-pyramid is read and written in records for N×N tiles.

According to the preferred embodiment of the present invention (FIG. 1), shading is not performed in the stage of the graphics system that is presently being described, but it is possible to do so. For example, it is possible to combine the culling stage 130 and its z-pyramid 170 with the z-buffer renderer 140 and its z-buffer 180 into a single stage: a hierarchical z-buffer renderer with a z-pyramid.

With this architecture, step 1332 would compute the color of the image sample and then overwrite the output image. Also, step 1322 would be omitted (as would step 1340), since there would no longer be a separate rendering stage. Step 1332 is shown in a dashed box to indicate that it is an option and not the preferred method.

Whether or not pixels are shaded in this procedure 1300, control returns to step 1304.

At step 1314, if L is not the finest level, control proceeds to step 1338, which is an optional step (as indicated by its depiction in dashed lines). If in render mode, step 1338 computes the maximum amount that continued tiling within the current cell can advance z-values in the pyramid, which is the difference between the znear value of the polygon's plane computed at step 1308 and the z-value stored for the current cell in z-array[L].

If the maximum "z advance" is less than some specified positive threshold value, call it zdelta, the current cell is not subdivided and the polygon is assumed to be visible. In this case, control proceeds to step 1340, which outputs the polygon's rendering record to the z-buffer renderer 140, if this has not already been done, after which control returns to step 1304.

In FIG. 26 the bold dashed line 2640 shows the z-pyramid value 2608 for a cell offset in the near direction by zdelta. Since the znear value 2622 for polygon 2620 is farther than this offset z-pyramid value 2640, tiling of polygon 2620 would stop within the illustrated cell, since the maximum amount that continued tiling could advance the z-pyramid value for the cell is less than zdelta. On the other hand, tiling of polygon 2630 would continue, since its znear value 2632 is nearer than the offset z-pyramid value 2640.

Although step 1338 can decrease the culling efficiency of the z-pyramid, it also reduces the amount of tiling the culling stage 130 needs to do, and in some cases, this is a good trade-off, improving the overall performance of the system.

If step 1338 is not employed or if its conditions are not satisfied, control proceeds to step 1342. Steps 1342 and 1344 create the tiling record for a new N×N tile corresponding to the current cell, this record including new coefficients for the polygon's edge and plane equations.

Step 1342 "transforms" the current tile's edge and plane equations so that their coefficients are relative to the coordinate frame of the new tile, using a method that will be described later. If tiling records also include the coefficients of shading equations, these equations are also transformed.

Step 1344 computes the level number and index of the new tile, creates a tiling record for the tile, and pushes this record onto the Tile Stack. Following step 1344, control returns to step 1304.

When all cells within the tile have been processed at step 1304, the procedure terminates at step 1346.

Although procedure Process N×N Tile 1300 processes cells one by one, it is also possible to process cells in parallel, for example, by processing one row of cells at a time.

Hierarchical Evaluation of Line and Plane Equations.

Before describing the hierarchical evaluation method employed by the invention, the underlying problem will be described. When z-buffering a polygon, it is necessary to evaluate the linear equations defining the polygon's edges and plane.

Edge equations have the form $Ax+By+C=0$ and plane equations are expressed in the form $z=Ax+By+C$. When performing hierarchical z-buffering, these equations must be evaluated at points on tiles in the image hierarchy.

Each of these equations includes two additions and two multiplications so direct evaluation is relatively slow, and if evaluation is performed with dedicated hardware, the circuitry required to perform the multiplications is relatively complex.

Efficient evaluation of these equations is the cornerstone of various prior-art algorithms for z-buffering polygons. However, prior-art methods are not particularly efficient when a polygon covers only a small number of samples, as is the case when tiling is performed on tiles of an image hierarchy, and they do not take advantage of coherence that is available in an image hierarchy.

Thus, there is a need for a more efficient method for evaluating the linear equations defining a polygon within tiles of an image hierarchy.

The novel method employed by the invention achieves efficiency by evaluating line and plane equations hierarchically, as will be described now.

Within Process N×N Tile 1300, at every cell it is necessary to evaluate a plane equation of the form $z=Ax+By+C$ at step 1308 and edge equations of the form $Ax+By+C=0$ at step 1310. Coefficients A, B, and C are computed relative to the standard coordinate frame of FIG. 10, and the advantage of this approach is that the values of x and y in the equations are small integers, which permits the equations to be evaluated with shifts and adds, rather than performing general-purpose multiplication.

For example, while looping over cells within a tile, equation $z=Ax+By+C$ can be computed incrementally as follows: at (0,0) $z=C$, at (2,0) $z=C+2A$, at (4,0) $z=C+4A$, and so forth. Even when incremental methods are not used, the equations can be evaluated efficiently with shifts and adds.

For example, if x is 5, the term Ax can be computed by adding A to 4A, where 4A is obtained by shifting.

At step 1342 of Process N×N Tile 1300, new coefficients of edge and plane equations are computed when cells are subdivided. The objective is to transform a linear equation of x and y from the coordinate frame of an N×N tile to the coordinate frame of cell (xt,yt) within it.

Figure 15:
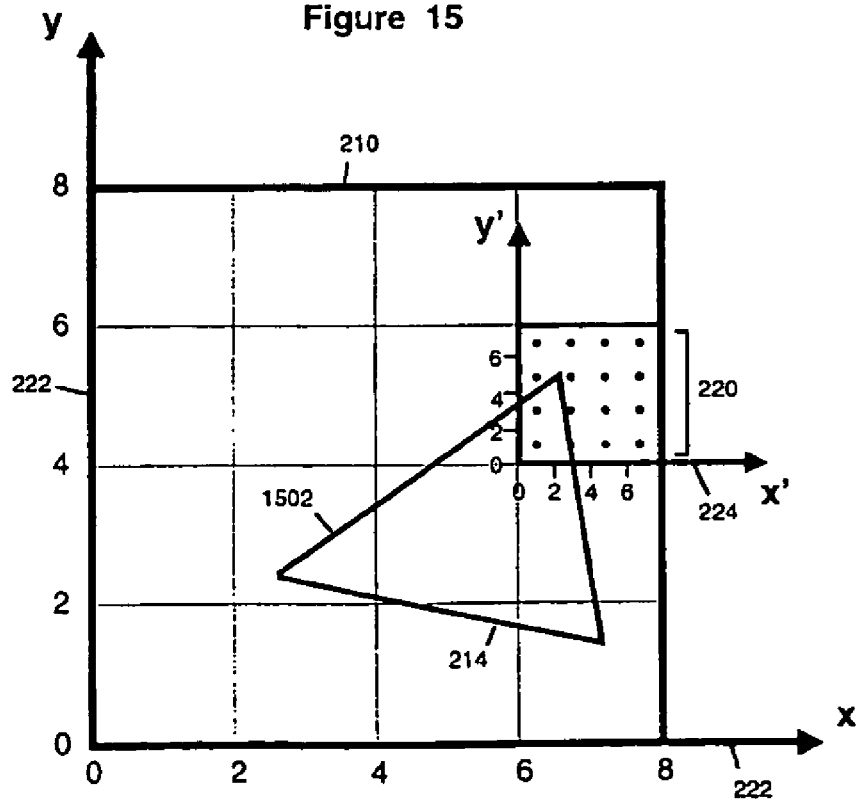
FIG. 15 is an illustration of nested coordinate frames.

More particularly, in FIG. 2 consider cell 218 within 4×4 tile 210, which corresponds to 4×4 tile 220 at the adjacent finer level of the pyramid. The relationship in screen space between the (x,y) coordinate frame 222 of cell 210 and the (x',y') coordinate frame 224 of cell 220 is shown in FIG. 15.

Relative to coordinate frame 222, coordinate frame 224 is translated by vector (xt,yt), in this case (6,4), and scaled by a factor of four (and in general for an N×N tile, a factor of N).

When the tiling record for triangle 214 is created by procedure Transform & Set Up Polygon 900, step 908 computes coefficients (A,B,C) in the edge equation $Ax+By+C=0$ for edge 1502 relative to coordinate frame (x,y) of tile 210 (this is the smallest enclosing tile). When tile 210 is subdivided and a record for tile 220 is created, this edge equation is transformed to edge equation $A'x'+B'y'+C'=0$, which is relative to coordinate frame (x',y') of tile 220.

New coefficients (A',B',C') are computed using the following transformation formulas 4000, which are applied to edge and plane equations at step 1342 of procedure 1300:

$$A'=A/N$$

$$B'=B/N$$

$$C'=Axt+Byt+C.$$

Assuming that N is a power of two, A' and B' can be obtained by shifting. Frequently, $Ax+By+C$ has already been evaluated at (xt,yt) at step 1308 or 1310 of procedure 1300, in which case C'=is already known. Whether or not this is exploited, C'=can be efficiently computed since xt and yt are small integers.

Thus, computing new coefficients for the line and plane equations is done very efficiently at step 1342 of procedure 1300, without performing general-purpose multiplication.

The same transformation formulas 4000 can be applied to any linear equation of the form $w=Ax+By+C$ including edge equations, plane equations, and equations used in shading.

If shading is performed during hierarchical tiling at step 1332 of procedure 1300, the method can be applied to interpolating vertex colors of triangles (i.e., performing Gouraud shading). In this case, the intensities of the red, green, and blue color components can each be expressed as a linear equation (e.g. $red=Ax+By+C$) and evaluated in the same way as z-values.

Since both sides of an equation can be multiplied by the same quantity, equation $w=Ax+By+C$ is equivalent to equation $Nw=N(Ax+By+C)$. Hence, using the following transformation formulas 4001 would result in computing $Nw$ rather than $w$:

$A==A$ $B==B$ $C==N(Axt+Byt+C)$.

In this case, coefficients A and B are unchanged but it is necessary to compute w from Nw by shifting (unless only the sign of the equation must be determined, as is the case when evaluating an edge equation).

Regardless of whether formulas 4000 or formulas 4001 are employed, transforming a linear equation from the coordinate frame of one tile to the coordinate frame of a "child" tile involves translation and scaling computations, where scaling is performed by shifting. With formulas 4000, scaling is performed by shifting coefficients A and B of the equation, and with formulas 4001, scaling is performed by shifting $Axt+Byt+C$, which is a linear expression of the coefficients of the equation.

This method for hierarchical evaluation of linear equations can also be applied in higher dimensions. For example, 3D tiling of a convex polyhedron into a voxel hierarchy having N×N×N decimation could be accelerated by hierarchical evaluation of the plane equations of the polyhedron's faces, which each have the form $Ax+By+Cz+D=0$. For cell (xt,yt,zt) within an N×N×N tile, the transformed coefficients of this equation are:

$A==A/N$ $B==B/N$ $C==C/N$ $D==Axt+Byt+Czt+D$, or equivalently, $A==A$ $B==B$ $C==C$ $D==N(Axt+Byt+Czt+D)$.

This method of hierarchical evaluation can be applied to evaluate higher-degree polynomial equations. For example, the general equation for a conic section (ellipse, parabola, or hyperbola) is $Ax2+Bxy+Cy2+Dx+Ey+F=0$. For cell (xt,yt) within an N×N tile, the transformed coefficients of this equation are:

$A==A/N2$ $B==B/N2$ $C==C/N2$ $D==(2Axt+Byt+D)/N$ $E==(2Cyt+Bxt+E)/N$ $F==Axt2+Bxtyt+Cyt2+Dxt+Eyt+F$, or equivalently, $A==A$ $B==B$ $C==C$ $D==N(2Axt+Byt+D)$ $E==N(2Cyt+Bxt+E)$ $F==N2(Axt2+Bxtyt+Cyt2+Dxt+Eyt+F)$.

Evaluation of these equations can be accelerated by computing some or all of the terms with shifting and addition, rather than multiplication. As with transforming linear equations, the above transformation formulas perform translation and scaling computations, and scaling is accomplished by shifting (shifting either a single coefficient or a polynomial expression of coefficients, such as expression $2Axt+Byt+D$ in the formula above).

The hierarchical evaluation methods described above can be applied when the image raster has jittered samples by scaling up the coordinate frame of the tiles. For example, if the coordinate frame of a 4×4 tile is scaled up by a factor of 4, there would be 32 integer values across the tile instead of 8, and the x and y coordinates of jittered image samples could have any of these values.

In summary, the hierarchical evaluation methods described above can be applied to accelerating processing of geometric objects described by polynomial equations within a spatial hierarchy (e.g., an image pyramid, octree, quadtree, etc.) that is organized in nested tiles that progress in scale by powers of two. The method transforms a polynomial equation (e.g., a linear or quadratic equation of x and y) from the coordinate frame of one tile to the coordinate frame of a "child" tile at the adjacent finer level of the hierarchy. This transformation is performed by translation and scaling computations, where scaling is performed by shifting the binary representation of the equation's coefficients or by shifting the binary representation of a polynomial expression of the equation's coefficients.

Shifting can be used to scale numbers represented in floating-point format, in addition to numbers represented in integer format. The advantage of this method of hierarchical evaluation is that evaluation can often be done without performing general-purpose multiplication, thereby accelerating computation and simplifying the required circuitry.

Hierarchical evaluation of equations can be applied to a variety of tiling, shading, and interpolation computations which require evaluation of polynomial equations at samples within a spatial hierarchy. The method is well suited to implementation in hardware and it works well in combination with incremental methods.

Propagation of Z-Values.

While looping over cells within a finest-level tile, Process N×N Tile 1300 determines zfarx[L] at each pyramid level L and the tile's zfar value (zfar_finest). Given this information, propagation can usually be performed with only one or two depth comparisons at each level of the pyramid (actually, this is only possible at levels where the ancestor_flag is TRUE, but this usually is the case).

The prior-art method of performing propagation during hierarchical z-buffering requires performing N2 depth comparisons for N×N tiles at each level of propagation. The method described herein accelerates propagation by reordering most of these depth comparisons, performing them during tiling.

Another advantage of maintaining zfarx values is that when propagation to an ancestor tile is not necessary, this can be determined without accessing z-values for the ancestor tile.

Suppose that ZFAR[F] is the farthest z-value within the current tile C in the finest level (where F is the index of the finest level), ZFAR[F-1] is the farthest z-value within the parent tile of the current tile, and so forth. Then the farthest z-values within ancestor tiles can be computed from zfar_finest and the values in array zfarx as follows:

ZFAR[F]=zfar_finest (zfar within C),

ZFAR[F-1]=farthest of (ZFAR[F],zfarx[F-1]) (zfar within parent of C),

ZFAR[F-2]=farthest of (ZFAR[F-1],zfarx[F-2]) (zfar within grandparent of C), and so forth.

Figure 16:
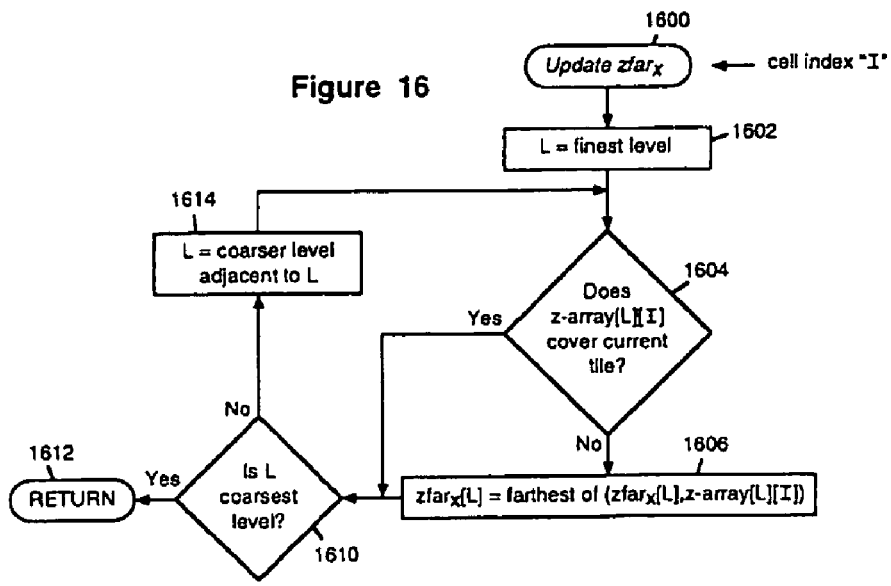
FIG. 16 is a flowchart of the method for updating array zfarx.

Propagation can stop whenever it fails to change the existing value in an ancestor tile. The actual algorithm used to perform propagation will be presented after discussing procedure Update zfarx 1600 (FIG. 16), which maintains array zfarx.

Procedure Update zfarx 1600 is called at step 1306 of Process N×N Tile 1300 to update zfarx values. The procedure receives as input the index "I" of the current cell within the current tile.

Step 1602 initializes variable "L" to the finest level of the pyramid.

Next, at step 1604, if the z-pyramid cell with index I in z-array[L] (i.e., z-array[L][I]) covers the current tile, control proceeds to step 1610. Otherwise, at step 1606, if z-array [L][I] is farther than the current value of zfarx[L], zfarx[L] is set equal to z-array[L][I], and then control proceeds to step 1610.

At step 1610, if L is the coarsest level, the procedure terminates at step 1612. Otherwise, step 1614 sets L to the index of the adjacent coarser level and control returns to step 1604.

At any level L where ancestor_flag/[L] is FALSE, zfarx [L] is not a valid value and it will need to be recomputed later, but this is a relatively rare event. Although the method just described computes zfarx values one by one, all values can be computed in parallel.

Figure 17:
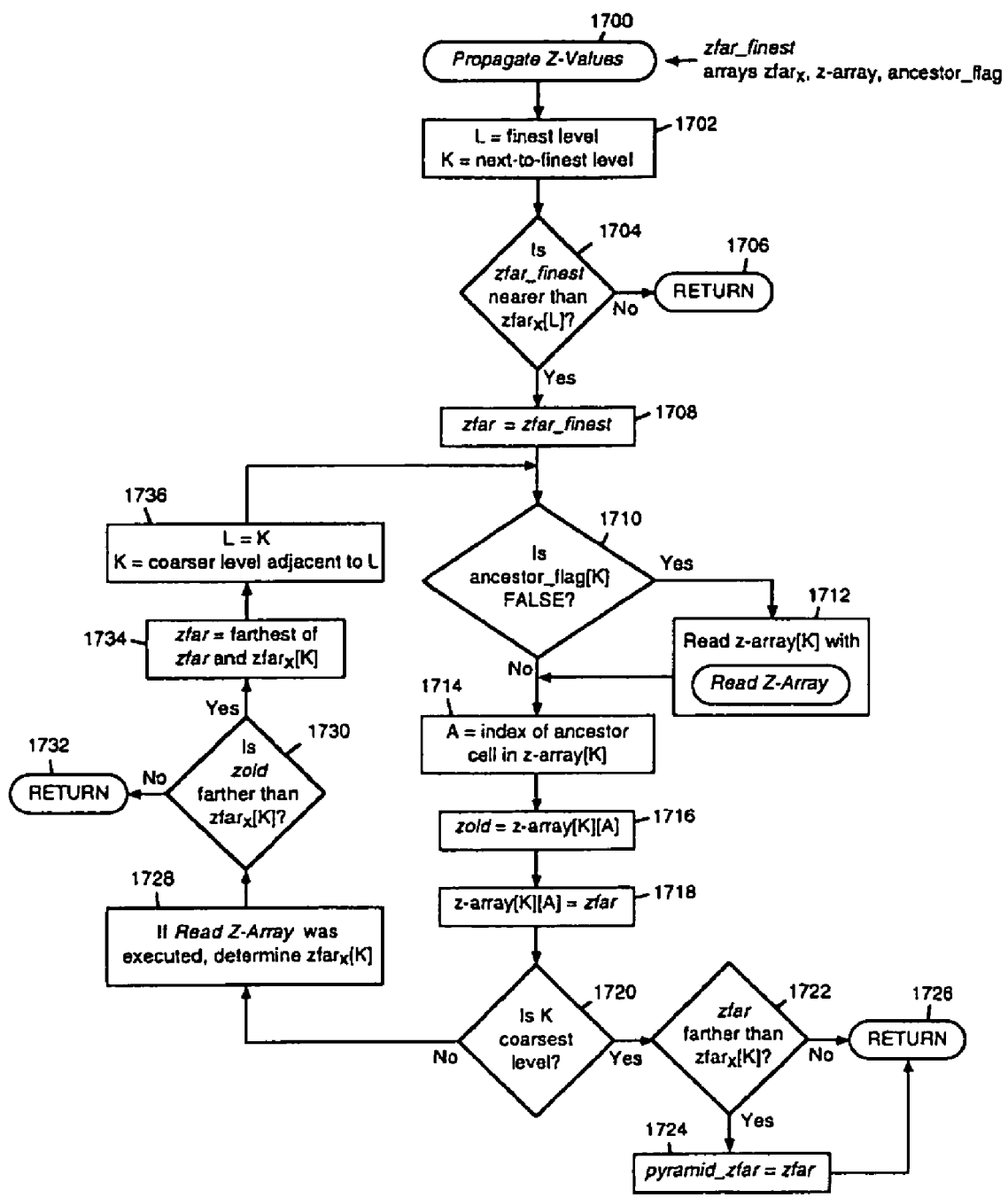
FIG. 17 is a flowchart of the method for propagating z-values.

The propagation procedure, Propagate Z-Values 1700 (FIG. 17), is called after step 1120 of Tile Convex Polygon 1100. Step 1702 initializes variable L to the finest level of the pyramid and variable K to the next-to-finest level.

Next, if variable zfar_finest (zfar of the most recently processed finest-level tile) is not nearer than zfarx[L], no propagation can be performed, so the procedure terminates at step 1706. Next, step 1708 sets variable zfar to variable zfar_finest.

Next, if ancestor_flag[K] is FALSE (step 1710), step 1712 reads the z-values corresponding to the level-K ancestor of the current cell from the z-pyramid into z-array[K] using procedure Read Z-Array 1200. If ancestor_flag[K] is TRUE at step 1710, control proceeds directly to step 1714.

Step 1714 determines the index "A" of the cell within array z-array[K] that is an ancestor of the z-value being propagated. Next, step 1716 sets variable zold to the depth value for cell A in z-array[K] (i.e., z-array[K] [A]).

Next, step 1718 overwrites z-array[K][A] with the value of variable zfar. Next, if K is the coarsest level (step 1720), step 1722 determines whether zfar is farther than zfarx[K]. If so, zfar is a new zfar value for the entire z-pyramid, and step 1724 sets variable pyramid_zfar to variable zfar.

Whether or not step 1722 is executed, the procedure terminates at step 1726.

If K is not the coarsest level at step 1720, control proceeds to step 1728, where if Read Z-Array 1200 was executed at step 1712, zfarx[K] is computed from the values in z-array [K] (this is a relatively slow procedure, but usually it is not required). Next, at step 1730, if zold is not farther than zfarx[K], the procedure terminates at step 1732.

Otherwise, step 1734 sets variable zfar equal to the farthest of variables zfar and zfarx[K]. Next, step 1736 sets L equal to K and sets K equal to the level that is adjacent to and coarser than L, and control returns to step 1710.

Although procedure Process N×N Tile 1300 updates array zfarx while looping over individual cells in an N×N tile, the same approach could also be applied if several cells were computed in parallel, for example, if tiles were processed row-by-row instead of cell-by-cell.

When a new value of variable pyramid_zfar is established at step 1724, the far clipping planes maintained by the scene manager 110 and the z-buffer 180 can be reset to this nearer value.

Variable pyramid_zfar is part of the tip of the z-pyramid which is copied to the scene manager 110 at step 716 of procedure 700. The scene manager 110 uses pyramid_zfar to reset the far clipping plane, and it uses pyramid_zfar and other copied depth values to cull occluded bounding boxes, as described below.

Culling with the Tip of the Z-Pyramid.

When culling boxes with a z-pyramid, occlusion can sometimes be detected with a single depth comparison. However, when culling is performed with procedure Process Batch of Boxes 700, culling an occluded box requires transforming the box's front faces to perspective space, processing them with the culling stage 130, and reporting results to the scene manager 110. To avoid the latency caused by these steps, an alternative is for the scene manager 110 to maintain some z-pyramid values and cull a box if it (or its bounding sphere) is occluded by a z-pyramid cell. Only if occlusion cannot be detected at this stage is a box sent through the rest of the system.

According to the method of the invention, after v-query results are reported to the scene manager 110 on the feedback connection 190 at step 714 of Process Batch of Boxes 700, step 716 copies the tip of the z-pyramid 170 to the scene manager 110. The "tip" includes the zfar value for the entire z-pyramid (i.e., pyramid_zfar), the coarsest N×N tile in the pyramid, and perhaps some additional levels of the pyramid (but not the entire pyramid, since this would involve too much work).

The amount of data that needs to be copied may be very modest. For example, if the copied tip includes pyramid_zfar, the coarsest 4×4 tile, and the 16 4×4 tiles at the adjacent finer level, a total of 273 z-values need to be copied. In some cases, the scene manager 110 can cull a substantial amount of occluded geometry using this relatively small amount of occlusion information.

Figure 18A:
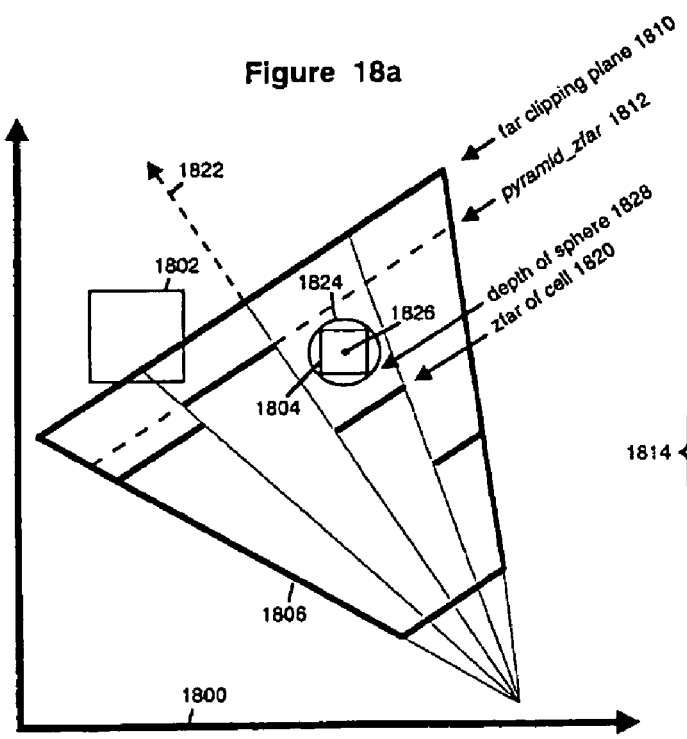
FIG. 18a is an illustration of a view frustum in model space.
Figure 18B:
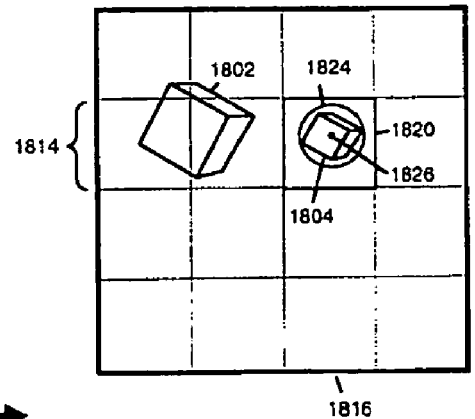
FIG. 18b is an illustration of the coarsest 4×4 tile in a z-pyramid.
Figure 19:
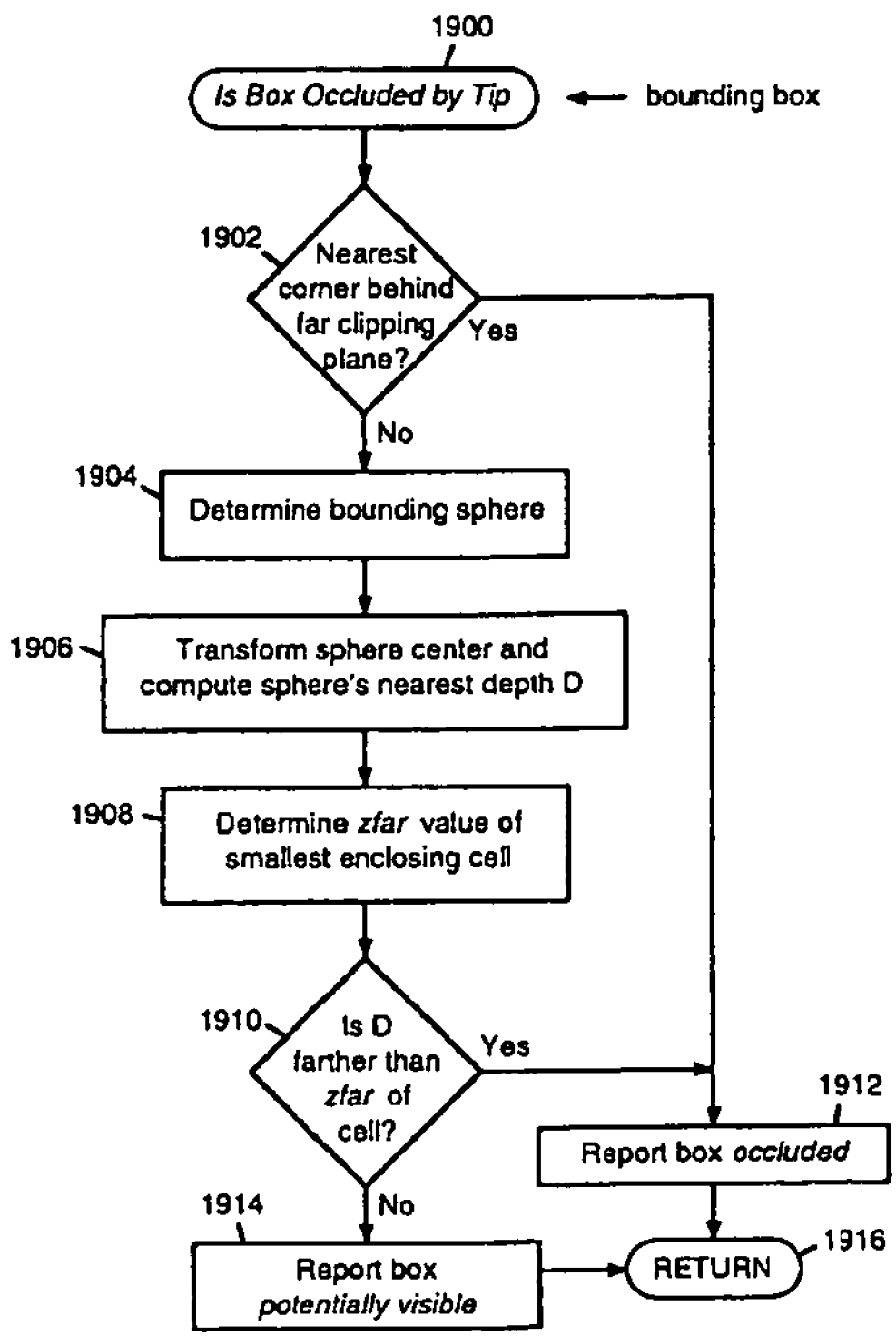
FIG. 19 is a flowchart of a method for determining whether a bounding box is occluded by the "tip" of the z-pyramid.

At step 702 of procedure Process Batch of Boxes 700, the scene manager 110 uses the tip of the pyramid to perform conservative culling on occluded bounding boxes using procedure Is Box Occluded by Tip 1900 (FIG. 19). This culling procedure 1900 is illustrated in FIGS. 18a and 18b, which show the coordinate frame of model space 1800 (the coordinate frame that the model is represented in), bounding boxes 1802 and 1804, the view frustum 1806 with its far clipping plane 1810, the current zfar value of the z-pyramid (i.e., pyramid_zfar) 1812, and the current zfar values for a row 1814 of cells within the coarsest N×N tile 1816 of the z-pyramid 170, including the zfar value of cell 1820.

To simplify illustration, the frustum is oriented so that the viewing axis 1822 is parallel to the page and four faces of the frustum are perpendicular to the page.

If pyramid_zfar 1812 is nearer than the depth of the far clipping plane 1810, this establishes a nearer value for the far clipping plane, so the far clipping plane is reset to this value. In FIG. 18a, resetting the far clipping plane to pyramid_zfar 1812 enables rapid culling of box 1802, since the depth of the nearest corner of box 1802 (which was computed at step 614 of procedure Sort Boxes into Layers 600) is farther than pyramid_zfar 1812.

Now the steps of procedure Is Box Occluded by Tip 1900 are described. The procedure is described infra as it applies to box 1804 in FIGS. 18a and 18b. Step 1902 determines whether the nearest corner of the box is farther than the far clipping plane.

If so, step 1912 reports that the box is occluded, and the procedure terminates at step 1916. If not, control proceeds to step 1904, which determines a bounding sphere 1824 for the box 1804, and step 1906 transforms the sphere's center 1826 to perspective space and determines the depth D 1828 of the sphere's nearest point.

Next, step 1908 determines the smallest z-pyramid cell 1820 that encloses the sphere 1824 and reads the cell's zfar value. If depth D 1828 is farther than zfar (step 1910), step 1912 reports that the box is occluded (this is the case with box 1804) and the procedure terminates at step 1916.

Otherwise, step 1914 reports that the box is potentially visible and the procedure terminates at step 1916.

Summarizing this culling method, the scene manager 110 receives the tip of the z-pyramid 170 along with v-query results on connection 190 and uses these z-values to reset the far clipping plane and perform conservative culling of bounding boxes. The method described supra for culling boxes with the tip of the z-pyramid is very efficient because processing a box only requires transforming a single point (or none) and making a single depth comparison.

The tip of the pyramid is in fact a low-resolution z-pyramid, that is, a z-pyramid with lower resolution than the z-pyramid 170 maintained by the culling stage 130, or if there is no separate culling stage, than the z-pyramid maintained by a hierarchical rendering stage.

Data Flow within the Culling Stage.

Figure 20:
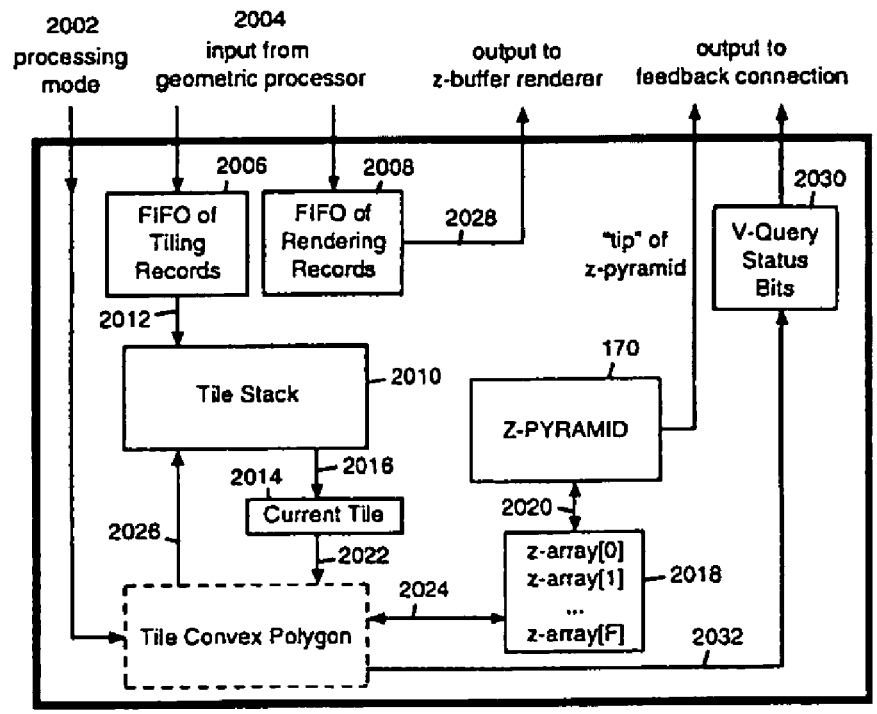
FIG. 20 is a block diagram of data flow within the culling stage.

FIG. 20 shows a block diagram of data flow within the culling stage 130. This is a high-level schematic diagram that does not include all data and signals that would be required in an implementation.

The input to the culling stage 130 is the processing mode 2002, either render of v-query, and a list of records for transformed polygons 2004 sent by the geometric processor 120. First, data flow is described when the culling stage 130 is operating in render mode and rendering a list of polygons with Tile Polygon List 800.

In this case, the geometric processor 120 outputs two records for each polygon, a tiling record and a rendering record, and these records are buffered in the FIFO of Tiling Records 2006 and the FIFO of Rendering Records 2008, respectively.

Tile Polygon List 800 processes polygons one by one until all polygons on the list have been tiled. For each polygon, the Tile Stack 2010 is initialized by copying the next tiling record in the FIFO of Tiling Records 2006 on connection 2012 (step 1104). The Current Tile register 2014 is loaded from the Tile Stack 2010 on connection 2016 (step 1108).

When Process N×N Tile 1300 performs occlusion and overlap tests (steps 1308 and 1310), edge and plane equations (which are part of tiling records) are read from the Current Tile register 2014 on connection 2022, and z-values are read from the list of z-arrays 2018 on connection 2024.

Whenever z-values are needed for a tile that is not stored in the list of z-arrays 2018, they are obtained from the z-pyramid 170, which involves writing an old tile record (if necessary) and reading a new tile record on connection 2020.

When visible samples are encountered, z-values are written to the list of z-arrays 2018 on connection 2024 (step 1330). When z-values are propagated, z-values are read from and written to the list of z-arrays 2018 on connection 2024.

When new tiles are created (at step 1344), they are written to the Tile Stack 2010 on connection 2026.

When it is established that a polygon is visible (at step 1322 or step 1340), the polygon's record in the FIFO of Rendering Records 2008 is output to the z-buffer renderer 140 on connection 2028. Records in the FIFO of Rendering Records 2008 that correspond to occluded polygons are discarded.

Now data flow is considered when the culling stage 130 is operating in v-query mode and determining the visibility of bounding boxes with Process Batch of Boxes 700. In this case, the geometric processor 120 outputs tiling records and markers indicating "end of box" and "end of batch." Tiling records are buffered in the FIFO of Tiling Records 2006. When in v-query mode, the geometric processor 120 does not output rendering records, so none are loaded into the FIFO of Rendering Records 2008.

Flow of tiling records on connections 2012, 2016, 2022, and 2026 is the same as when in rendering mode.

Z-values needed for depth comparisons at step 1308 are read from the list of z-arrays 2018 on connection 2024, but no z-values are written on this connection. If z-values are needed for a tile that is not stored in the list of z-arrays 2018, they are obtained from the z-pyramid 170, which involves writing an old tile record (if necessary) and reading a new tile record on connection 2020.

If a visible sample is discovered, the bit in V-Query Status Bits 2030 corresponding to the current box is set to visible on connection 2032 (step 710); otherwise the bit is set to occluded (step 712).

When the visibility of all boxes in the batch has been established, the V-Query Status Bits 2030 and the tip of the z-pyramid 170 are sent to the scene manager 110 on the feedback connection 190 (steps 714 and 716).

Other Ways of Reducing Image-Memory Traffic.

The culling stage preferably uses a low-precision z-pyramid 170 in order to reduce storage requirements and memory traffic. The most straightforward way to implement a low-precision z-pyramid is to store each z-value in fewer bits than the customary precision of between 24 and 32 bits. For instance, storing z-values in 8 bits reduces storage requirements by a factor of 4 as compared with storing z-values in 32 bits.

Even greater reductions in the storage requirements of a z-pyramid used for conservative culling can be achieved with the modifications described below.

Encoding of Depth Values.

Storage requirements of the z-pyramid 170 can be reduced by storing depth information for tiles in a more compact form than N×N arrays of z-values.

According to this method, a finest-level tile is stored as a znear value and an array of offsets from znear, where znear is the depth of the nearest sample within the tile. Preferably, offsets are stored at relatively low precision (e.g., in 4 bits each) and znear is stored at higher precision (e.g., in 12 bits).

The record for each finest-level tile consists of an N×N array of offsets, znear, and a scale factor S that is needed to compute depths from offsets. If znear is stored in 12 bits, S in 4 bits, and each offset value in 4 bits, the record for a 4×4 tile requires 80 bits, which is 5 bits per sample. Z-values in tiles that are not at the finest level of the pyramid are stored in arrays, as usual (for example, as arrays of 8-bit z-values).

Figure 21:
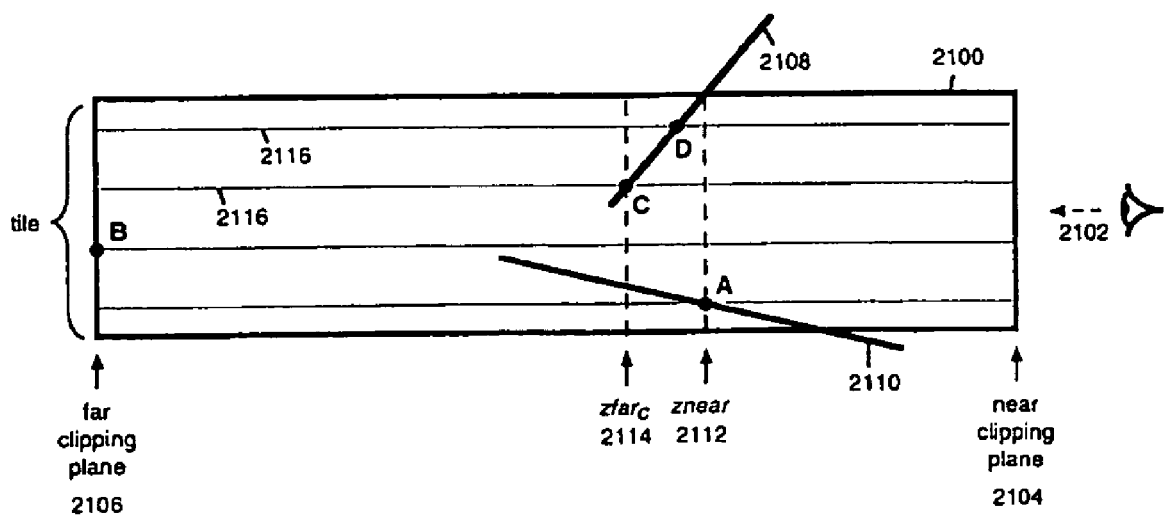
FIG. 21 is a side view of a 4×4 tile in the z-pyramid.

FIG. 21 shows a side view of a finest-level tile in the z-pyramid, which in three dimensions is a rectangular solid 2100 having a square cross-section. Given the indicated direction of view 2102, the right-hand end 2104 of the solid 2100 is the near clipping plane and the left-hand end 2106 of the solid 2100 is the far clipping plane.

The four thin horizontal lines 2116 indicate the positions of rows of samples within the tile. The two inclined lines, 2108 and 2110, indicate the positions of two polygons, which are oriented perpendicular to the page to simplify illustration.

In this instance, the depth of sample A on polygon 2110 is znear 2112, sample B is not "covered," so its depth is the depth of the far clipping plane 2106, and sample C on polygon 2108 is the deepest covered sample within the tile. The depth of the deepest covered sample within a tile is called zfarc (in this case, zfarc is the depth 2114 of sample C).

To improve effective depth resolution, one offset value is reserved to indicate samples that lie at the far clipping plane (that is, samples that have never been covered by a polygon).

For example, suppose that offset values are each 4-bit values corresponding to integers 0 through 15, and value 15 is reserved to mean "at the far clipping plane." Then, offset values 0 through 14 would be used to represent depths in the range znear to zfarc.

In general, this requires scaling by the scale factor S, computed with the following formula 6000: $S=(FAR-NEAR)/(zfarc-znear)$, where NEAR is the depth of the near clipping plane and FAR is the depth of the far clipping plane. Once S has been computed, the offset for a covered sample at depth z is computed with the following encoding formula 6001:

$$\text{offset}=(z-\text{znear})/S,$$

where offset is rounded to an integer. The inverse decoding formula 6002 for computing a z-value from an offset is:

$$z=\text{znear}+S*\text{offset}.$$

To simplify evaluation of the encoding and decoding formulas, scale factor S is rounded to a power of two, which enables both multiplication and division by S to be performed by shifting. As a result, computations of both offsets and z-values are only approximate, but computations are structured so that depth comparisons are always conservative, never causing a visible polygon to be culled.

Given the previous assumptions about using 4-bit offsets, in FIG. 21, the offset computed for sample A would be 0 (because its depth is znear), the offset computed for sample C would be 14 (because its depth is zfarc), the offset computed for sample D would lie somewhere between 0 and 14, and the offset for sample B would be 15, since this is the value reserved for "at the far clipping plane." znear and zfarc can be computed by procedure Process N×N Tile 1300 as it loops over the cells within a tile. For example, to compute znear, step 1302 would initialize variable znear to the depth of the far clipping plane and following step 1326, variable znear would be updated with the depth of the nearest visible sample encountered so far.

When finest-level tiles in the z-pyramid are encoded, changes must be made when reading or writing a finest-level tile in procedures Tile Convex Polygon 1100 and Read Z-Array 1200. When_Read Z-Array 1200 reads the encoded record of a finest-level tile at step 1206, the z-value of each sample is computed from znear, S, and the offset value using the decoding formula 6002 and written to z-array[L] (where L is the finest level).

When writing the record for a finest-level tile, instead of writing z-array[L] at step 1120 of Tile Convex Polygon 1100, an encoded tile record is created from z-array[L] and then written to the z-pyramid 170. The tile record is created as follows.

First, the exponent of scale factor S is computed by computing S with formula 6000, rounding S to a power of two, and then determining its exponent (since S is a power of 2, it can be stored very compactly as an exponent).

Then the offset value corresponding to each z-value is computed. If S for the tile has not changed since the tile was read, the old offset is used for any sample where the polygon was not visible. Otherwise, the offset is computed using the encoding formula 6001.

Now all of the information in a tile record is known, and the record is written to the z-pyramid 170. Following step 1120 in Tile Convex Polygon 1100, propagation of the tile's zfar value is performed in the usual way using z-values that are not encoded.

The method described above makes it possible to construct highly accurate z-values from low-precision offsets whenever the depths of covered image samples within a tile lie within a narrow range, which is often the case. In the worst case when z-values cover nearly the whole range between the near and far clipping planes, this method is equivalent to representing z-values solely with low-precision offset values, compromising z-resolution. In typical scenes, however, depth coherence within finest-level tiles is quite high on average, resulting in accurate z-values and efficient culling in most regions of the screen.

Even though the finest level of the z-pyramid is not a conventional z-buffer when depth values are encoded as described above, herein the terms "z-pyramid" and "hierarchical depth buffer" will still be applied to this data structure.

Reducing Storage Requirements with Coverage Masks.

Another novel way to reduce the storage requirements of a z-pyramid used for conservative culling is to maintain a coverage mask at each finest-level tile and the zfar value of the corresponding samples, which together will be called a mask-zfar pair. According to this method, the record for each finest-level tile in the z-pyramid consists of the following information, which will be called a mask-zfar record 7000 for a tile.

Mask-Zfar Tile Record.

1. zfar value for the whole tile (zfart)
2. mask indicating samples within a region of the tile (maskt)
3. zfar value for the region indicated by maskt (zfarm)

The terms zfart, maskt, and zfarm are defined above. Preferably, only tiles at the finest level of the z-pyramid are stored in mask-zfar records. At all other levels, tile records are arrays of z-values which are maintained by propagation.

Preferably, individual z-values within these arrays are stored at low precision (e.g., in 12 bits) in order to conserve storage.

The advantage of using mask-zfar records is that they require very little storage. For example, if zfart and zfarm are each stored in 12 bits, the record for a 4×4-sample tile would require only 40 bits, 24 bits for these z-values and 16 bits for maskt (one bit for each sample).

This is only 2.5 bits per sample, more than a three-fold reduction in storage compared with storing an 8-bit z-value for each sample, and more than a twelve-fold reduction in storage compared with storing a 32-bit z-value for each sample.

It is not essential to store zfart in mask-zfar records, because the identical z-value is also stored in the record for the parent tile. Eliminating zfart from mask-zfar records would reduce storage requirements to 1.75 bits per sample for a 4×4 tile, given the assumptions stated above. However, this approach requires that the parent tile's records be read more often when finest-level tiles are processed, which is a disadvantage.

Figure 22A:
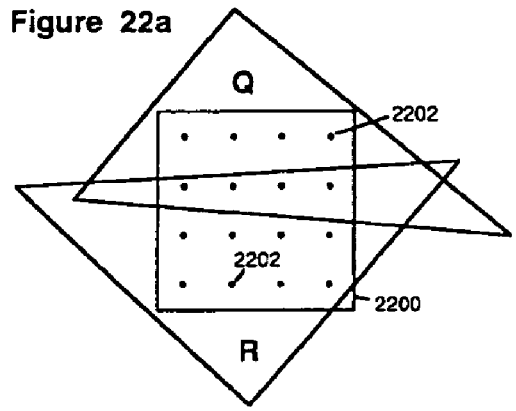
FIG. 22a is an illustration of a 4×4 tile covered by two triangles.
Figure 22B:
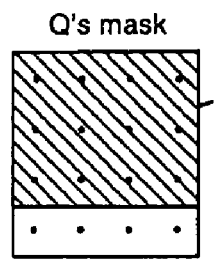
Figure 22C:
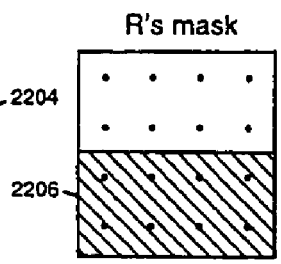
Figure 23:
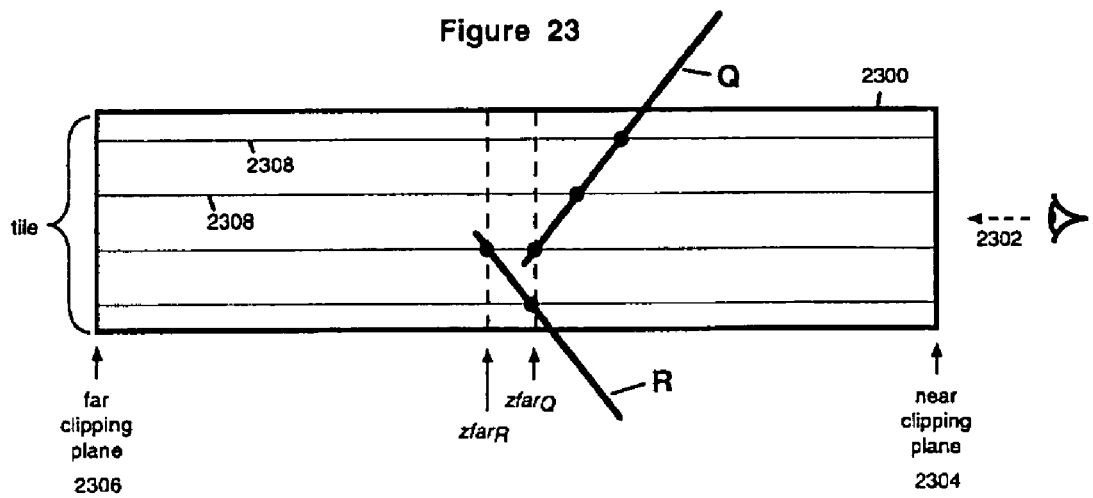
FIG. 23 is a side view of a 4×4 tile in the z-pyramid and two triangles that cover it.

FIG. 22 and FIG. 23 show an example illustrating how zfart advances when polygons that cover a tile are processed. FIG. 22 shows a 4×4 tile 2200 at the finest level of the z-pyramid having uniformly spaced samples 2202 that are covered by two triangles, labeled Q and R.

FIG. 23 shows a side view of the tile 2200, which in three dimensions is a rectangular solid 2300 having a square cross-section. Given the indicated direction of view 2302, the right-hand end 2304 of the solid 2300 is the near clipping plane and the left-hand end 2306 of the solid 2300 is the far clipping plane.

The four thin horizontal lines 2308 indicate the positions of rows of samples within the tile. The two inclined lines indicate the positions of triangles Q and R, which are oriented perpendicular to the page to simplify the illustration.

When the z-pyramid is initialized at the beginning of a frame, mask-zfar records in the z-pyramid are initialized as follows: zfart is set to the depth of the far clipping plane and maskt is cleared to all zeros, meaning that no samples are covered. Thus, before processing any polygons at tile 2200, zfart is the depth of the far clipping plane 2306 and maskt is all zeros.

Suppose that Q is the first polygon processed at tile 2200. When Q is processed, the bits in maskt are set that correspond to the samples covered by Q (these are the samples within the crosshatched region 2204 in FIG. 22b) and zfarm is set to the depth of the farthest sample covered by Q, labeled zfarQ in FIG. 23.

Later, when R is processed, its mask (indicated by the crosshatched region 2206 in FIG. 22c) and its zfar value within the tile (labeled zfarR in FIG. 23) are computed. Since R's mask 2206 and maskt (in this case, Q's mask 2202) collectively cover the tile 2200, a nearer value has been established for zfart, in this case zfarR, so zfart is set to zfarR.

This illustrates how zfart advances when one or more polygons covering a tile are processed, which enables conservative culling of occluded polygons that are encountered later.

Next, the general method is described for updating a mask-zfar record when a polygon is processed. Cases that need to be considered are schematically illustrated in FIG. 24.

Figure 24:
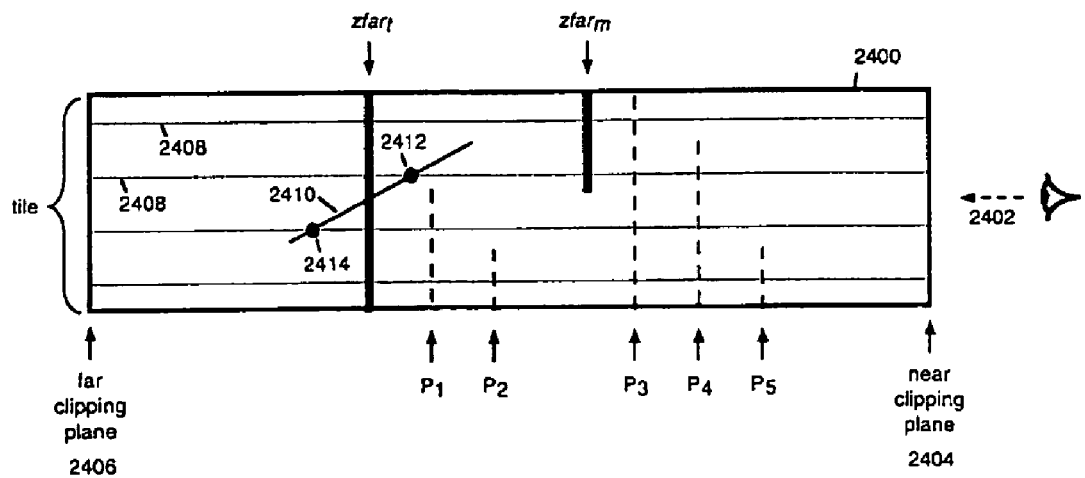
FIG. 24 is a schematic side view of a 4×4 tile in the z-pyramid.

FIG. 24 shows a side view of a 4×4 tile, which in three dimensions is a rectangular solid 2400 having a square cross-section. Given the indicated direction of view 2402, the right-hand end 2404 of the solid 2400 is the near clipping plane and the left-hand end 2406 of the solid 2400 is the far clipping plane.

The four thin horizontal lines 2408 indicate the positions of rows of samples within the tile. The bold vertical lines at depths zfart and zfarm represent the occlusion information stored in the tile's mask-zfar record. The bold line at depth zfart covers the whole tile and the bold line at depth zfarm indicates the samples covered by maskt.

The numeral 2410 identifies a polygon that is oriented perpendicular to the page.

The dashed vertical lines labeled P1, P2, P3, P4, and P5 represent possible positions of the next polygon to be processed, indicating the region of the tile covered by visible samples on the polygon and the polygon's zfar value in relation to zfarm and zfart. Here, the "polygon's zfar value" is the farthest z of its potentially visible samples, so this z-value must be nearer than zfart.

Although coverage is only depicted schematically, the basic cases are distinguished: the polygon covers the whole tile (case P3), the polygon covers the tile in combination with maskt (cases P1 and P4), and the polygon does not cover the tile in combination with maskt (cases P2 and P5).

If each sample on a polygon lies behind zfart or is covered by maskt and lies behind zfarm, the polygon is occluded within the tile. For example, polygon 2410 in FIG. 24 (oriented perpendicular to the page for convenience), is occluded because sample 2412 is inside maskt and behind zfarm and sample 2414 is behind zfart.

When using mask-zfar records in the z-pyramid, changes must be made when reading or writing a finest-level tile in procedures Tile Convex Polygon 1100 and Read Z-Array 1200. When step 1206 of Read Z-Array 1200 reads the mask-zfar record of a finest-level tile (which includes zfart, maskt, and zfarm), the z-value of each sample is written to z-array[L] (where L is the finest level). The z-value of each sample covered by maskt is zfarm and the z-value of all other samples is zfart.

When writing the record for a finest-level tile, instead of writing z-array[L] at step 1120 of Tile Convex Polygon 1100, a new mask-zfar record is created from z-array[L] with procedure Update Mask-Zfar Record 2500 and this record is written to the z-pyramid.

If all samples on the polygon are occluded (as with polygon 2410, for example), step 1120 is not executed, so neither is Update Mask-Zfar Record 2500.

Figure 25:
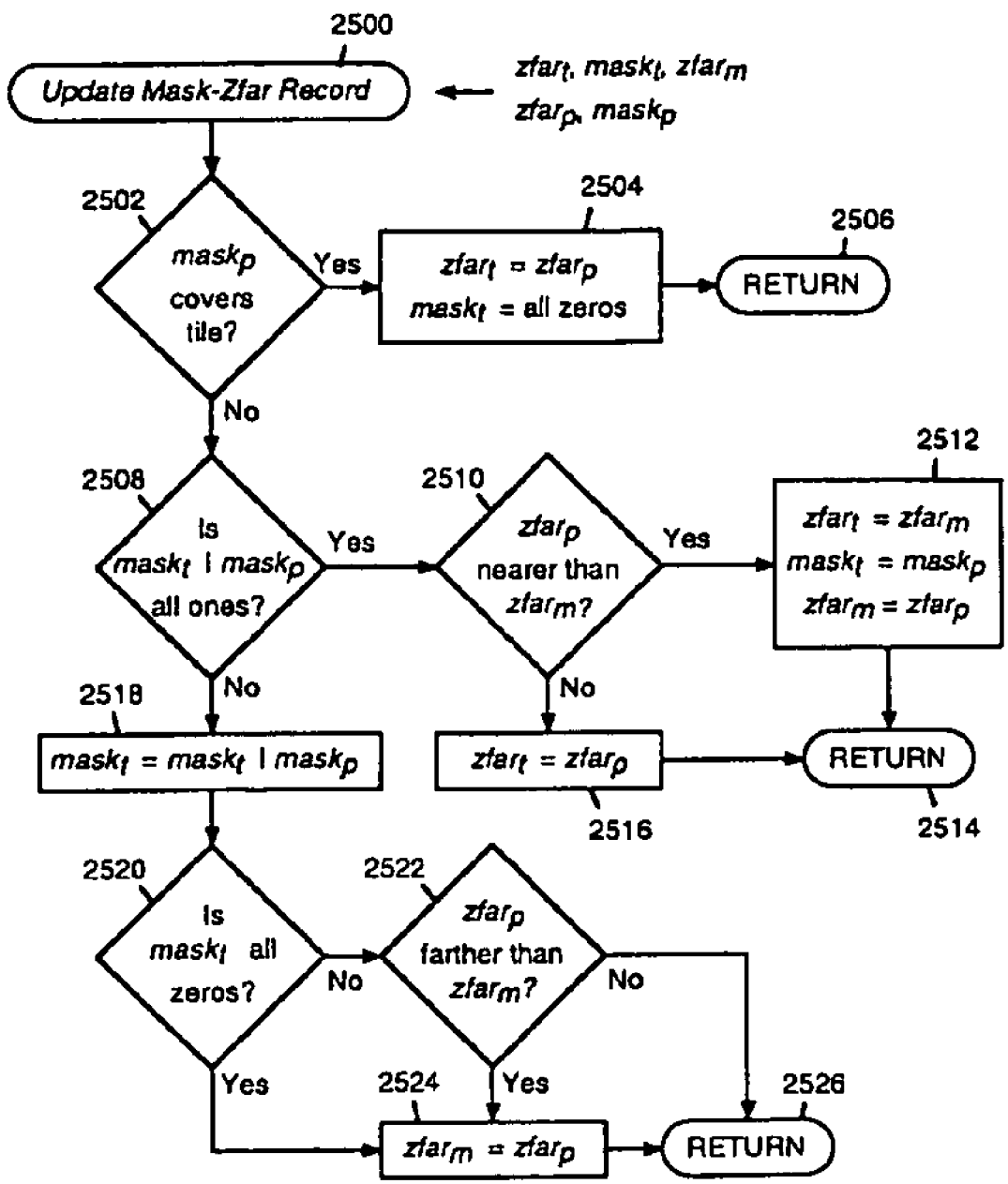
FIG. 25 is a flowchart of the method for updating a mask-zfar tile record.

Update Mask-Zfar Record 2500 (FIG. 25) receives as input the values in the old mask-zfar record (i.e., zfart, zfarm, and maskt), the mask for samples where the polygon is visible within the tile (call this maskp), and the zfar value of these samples (call this zfarp), maskp and zfarp can be computed efficiently within Process N×N Tile 1300 as it loops over the samples in a tile.

At step 2502, if maskp covers the whole tile (i.e., it is all ones, which means that the polygon is visible at all samples, as for case P3 in FIG. 24), at step 2504 zfart is set to zfarp and maskt is cleared to all zeros, and the procedure terminates at step 2506. Otherwise, control proceeds to step 2508 where if maskt| maskp is all ones (where "|" is the logical "or" operation), the polygon and maskt collectively cover the tile, and in this case, control proceeds to step 2510.

At step 2510, if zfarp is nearer than zfarm (e.g. P4 in FIG. 24), a nearer zfar value has been established and step 2512 sets zfart to zfarm, maskt to maskp, and zfarm to zfarp, followed by termination at step 2514. If zfarp is not nearer than zfarm at step 2510 (e.g. P1 in FIG. 24), step 2516 sets zfart to zfarp, followed by termination at step 2514.

If masktlmaskp is not all ones at step 2508, the polygon and maskt do not collectively cover the tile, and the occlusion information for the polygon and maskt are combined as follows. Step 2518 sets maskt to masktlmaskp (where "|" is the logical "or" operation). Next, at step 2520, if maskt is all zeros, control proceeds to step 2524, which sets zfarm to zfarp, followed by termination of the procedure at step 2526.

If maskt is not all zeros at step 2520, control proceeds to step 2522, where, if zfarp is farther than zfarm, control proceeds to step 2524. For example, with P2 in FIG. 24, zfarp is farther than zfarm, so step 2524 would be executed.

If zfarp is not farther than zfarm at step 2522 (as is the case with P5 in FIG. 24), the procedure terminates at step 2526.

Some of the operations performed by Update Mask-Zfar Record 2500 can be done in parallel.

In summary, the advantage of using mask-zfar pairs to store occlusion information in a z-pyramid used for conservative culling is that it requires very little storage (for example, 2.5 bits per image sample). The disadvantage of this approach is that maintaining occlusion information is more complicated and culling efficiency may not be as high.

To illustrate the savings in storage that can be achieved, when the finest level of a z-pyramid having 4×4 decimation is stored as mask-zfar tile records, each record including two 12-bit z-values and one 16-bit coverage mask, and the other levels of the z-pyramid are stored as arrays of 12-bit z-values, the z-pyramid requires approximately 3.30 bits of storage per sample in the finest level. In this case, the total bits of storage in a 32-bit z-buffer having the same resolution is approximately ten times greater than the total bits of storage in the z-pyramid.

Even though the finest level of the z-pyramid is not a conventional z-buffer when mask-zfar records are employed, herein the terms "z-pyramid" and "hierarchical depth buffer" will still be applied to this data structure.

The prior art includes the A-buffer visible-surface algorithm that maintains pixel records that include coverage masks and z-values. At individual pixels, the A-buffer algorithm maintains a linked list of visible polygon fragments, the record for each fragment including a coverage mask indicating the image samples covered by the fragment, color and opacity values, and znear and zfar values, each stored in floating-point format. This record format is designed to resolve color and visibility at each image sample, enabling high-quality antialiasing of pixel values.

Although the A-buffer record format could be employed at finest-level tiles in the z-pyramid, its variable-length, linked-list format greatly complicates processing and requires dynamic memory allocation. By comparison, the novel method of performing conservative occlusion culling using a single coverage mask at a tile is much simpler and much easier to implement in hardware.

Culling with a Low-Resolution Z-Pyramid.

As previously mentioned, a separate culling stage 130 in the graphics system 100 enables conservative culling with a low-precision z-pyramid, that is, a z-pyramid having the same resolution as the z-buffer, but in which z-values are stored at low precision, for example, as 8-bit or 12-bit values. Alternatively, the culling stage 130 can employ a low-resolution z-pyramid, that is, a z-pyramid having lower resolution than the z-buffer. As previously mentioned, the resolution of a z-pyramid is the resolution of its finest level.

For example, a single zfar value could be maintained in the finest level of the z-pyramid for each 4×4 tile of image samples in the output image 150. As applied to the 64×64 image raster of FIG. 2 (only partially shown), level 230 would be the finest level of the low-resolution z-pyramid, and each cell within this level would represent a conservative zfar value for the corresponding 4×4 tile of image samples in the image raster. For instance, cell 218 would contain a conservative zfar value for the image samples in 4×4 tile 220.

Definitive visibility tests cannot be performed using a low-resolution z-pyramid, but conservative culling can be performed. The disadvantage of a low-resolution z-pyramid is that it has lower culling efficiency than a standard z-pyramid, and this increases the workload on the z-buffer renderer 140.

However, a low-resolution z-pyramid has the advantage of requiring only a fraction of the storage, and storage requirements can be further reduced by storing zfar values at low-precision (e.g., 12 bits per value). In cases where the reduction in storage requirements enables the z-pyramid to be stored entirely on-chip, the resulting acceleration of memory access can improve performance substantially. In short, using a low-resolution z-pyramid impairs culling efficiency but reduces storage requirements and can increase culling speed in some cases.

To illustrate the savings in storage that can be achieved with a low-resolution z-pyramid, consider a graphics system with a 1024 by 1024 z-buffer in the rendering stage and a 256 by 256 z-pyramid in the culling stage. Assuming 32-bit z-values in the z-buffer, 12-bit z-values in the z-pyramid, and 4×4 decimation from level to level of the z-pyramid, the total bits of storage in the z-buffer would be approximately 40 times greater than the total bits of storage in the z-pyramid.

Using a low-resolution z-pyramid requires only minor changes to the rendering algorithm that has already been described for the graphics system 100 of FIG. 1. In fact, it is only necessary to change procedure Process N×N Tile 1300.

At step 1324, control proceeds to step 1334, which determines whether the polygon completely "covers" the cell. This occurs only if the cell is completely inside all of the polygon's edges. Whether a cell lies completely inside an edge can be determined with the edge-cell test described in connection with step 1310, except that instead of substituting the cell's corner that is farthest in the "inside direction" into the edge equation, the opposite corner is substituted.

If the polygon does not completely cover the cell, control returns to step 1304. Otherwise, step 1336 computes the zfar value of the plane of the polygon within the cell, which is done as previously described for computing the plane's znear value at step 1308, but instead of substituting the "nearest corner" of the cell into the plane equation, the opposite corner is substituted, since this is where the plane is farthest within the cell.

In FIG. 14, for example, the corner 1408 is the "nearest corner" of cell 1402, meaning that the plane of polygon 1400 is nearest to the observer at that corner. Therefore, the plane of polygon 1400 is farthest from the observer at the opposite corner 1410, so to establish the zfar value for the plane of polygon 1400 within cell 1402, the x and y coordinates of this corner 1410 are substituted into the plane equation, which has the form $z=Ax+By+C$.

If at step 1336 the plane's zfar value is nearer than the corresponding value for the current cell in z-array[F] (where F is the index of the finest level), control proceeds to step 1326, which sets changed to TRUE. Then step 1328 updates zfar_finest, overwriting zfar_finest with the plane's zfar value, if the plane's zfar value is farther than the current value of zfar_finest. Next, step 1330 overwrites the value for the current cell in z-array[F] with the plane's zfar value, and control returns to step 1304.

The optional shading step 1332 is not compatible with using a low-resolution z-pyramid. At step 1336, if the plane's zfar value is not nearer than the corresponding value in z-array[F], control returns directly to step 1304.

FIG. 26 shows a side view of a cell in the z-pyramid, which in three dimensions is a rectangular solid 2600 having a square cross-section. Given the indicated direction of view 2602, the right-hand end 2604 of the solid 2600 is the near clipping plane and the left-hand end 2606 of the solid 2600 is the far clipping plane. The bold vertical line indicates the current z-value 2608 stored in the z-pyramid cell.

The three inclined lines, 2610, 2620, and 2630, indicate the positions of three polygons, each covering the cell and each oriented perpendicular to the page to simplify illustration. For each polygon, its znear and zfar values within the cell are shown by dashed lines.

Now, the procedure Process N×N Tile 1300 processes these polygons within this cell, assuming a low-resolution z-pyramid.

Polygon 2610 would be determined to be occluded within the cell at step 1308, because its znear value 2612 is farther than the z-pyramid value 2608.

Polygon 2620 would be determined to be visible because its znear value 2622 is nearer than the current z-pyramid value 2608, but the z-pyramid would not be overwritten with the polygon's zfar value 2624 because the polygon's zfar value 2624 is farther than the current z-pyramid value 2608.

Polygon 2630 would be determined to be visible because its znear value 2632 is nearer than the current z-pyramid value 2608, and the z-pyramid would be overwritten with the polygon's zfar value 2634 because the polygon's zfar value 2634 is nearer than the current z-pyramid value 2608.

Now an alternative way of updating a low-resolution z-pyramid in the culling stage 130 is described. When the z-buffer renderer 140 encounters visible depth samples on a polygon, they are copied to the culling stage 130 and propagated through the z-pyramid 170.

This method requires a connection 185 for copying z-values from the z-buffer renderer 140 to the culling stage 130, which is drawn in a dashed arrow in FIG. 1 to indicate that this is just an option. If z-values in the z-pyramid 170 are stored at lower precision than z-values in the z-buffer 180, z-values may be converted to low-precision values before they are copied. When the culling stage 130 receives new depth samples on connection 185, they are propagated through the z-pyramid using the traditional propagation algorithm.

When this method is employed, it is not necessary to update the z-pyramid during tiling of polygons by the culling stage, which simplifies the tiling algorithm considerably. In fact, in procedures Tile Convex Polygon 1100 and Process N×N Tile 1300, only the steps performed in v-query mode are necessary, except for outputting rendering records when visible polygons are encountered.

Varying Z Precision Within a Z-Pyramid.

In the description of procedure Process N×N Tile 1300, for the preferred embodiment of the invention, the culling and rendering stages are separate and have their own depth buffers, but it is possible to combine the two stages in a single "hierarchical renderer" having a single z-pyramid used for both culling and rendering.

In this case, the finest level of the z-pyramid is a z-buffer in which z-values are stored at full precision (e.g., in 32 bits per z-value) so that visibility can be established definitively at each image sample. At other pyramid levels, however, it is not necessary to store z-values at full precision, since culling at those levels is conservative.

Thus, at all but the finest pyramid level, it makes sense to store z-values at low precision (e.g., in 12 bits) in order to conserve storage and memory bandwidth and improve caching efficiency. Frequently, only z-values at coarse levels of the pyramid need to accessed to determine that a bounding box or primitive is occluded, so caching the coarsest levels of the pyramid can accelerate culling significantly. Using low-precision z-values enables more values to be stored in a cache of a given size, thereby accelerating culling.

When low-precision z-values are employed in a pyramid as described above, the average precision of z-values in the z-buffer is higher than the average precision of z-values in the entire z-pyramid. For example, for a z-pyramid having 4×4 decimation from level to level and a 1024 by 1024 z-buffer in which z-values are stored at 32 bits of precision, and in which z-values in the other pyramid levels are stored at 12 bits of precision, then the average z-precision in the z-buffer is 32 bits per z-value and average z-precision in the entire z-pyramid is approximately 30.9 bits per z-value.

Exploiting Frame Coherence.

As described supra, the efficiency of hierarchical z-buffering with box culling is highly sensitive to the order in which boxes are traversed, with traversal in near-to-far occlusion order achieving maximal efficiency. Render Frames with Box Culling 500 achieves favorable traversal order by explicitly sorting boxes into "layers" every frame.

Another method for achieving efficient traversal order, which is described next, is based on the principle that bounding boxes that were visible in the last frame are likely to be visible in the current frame and should, therefore, be processed first.

Figure 27:
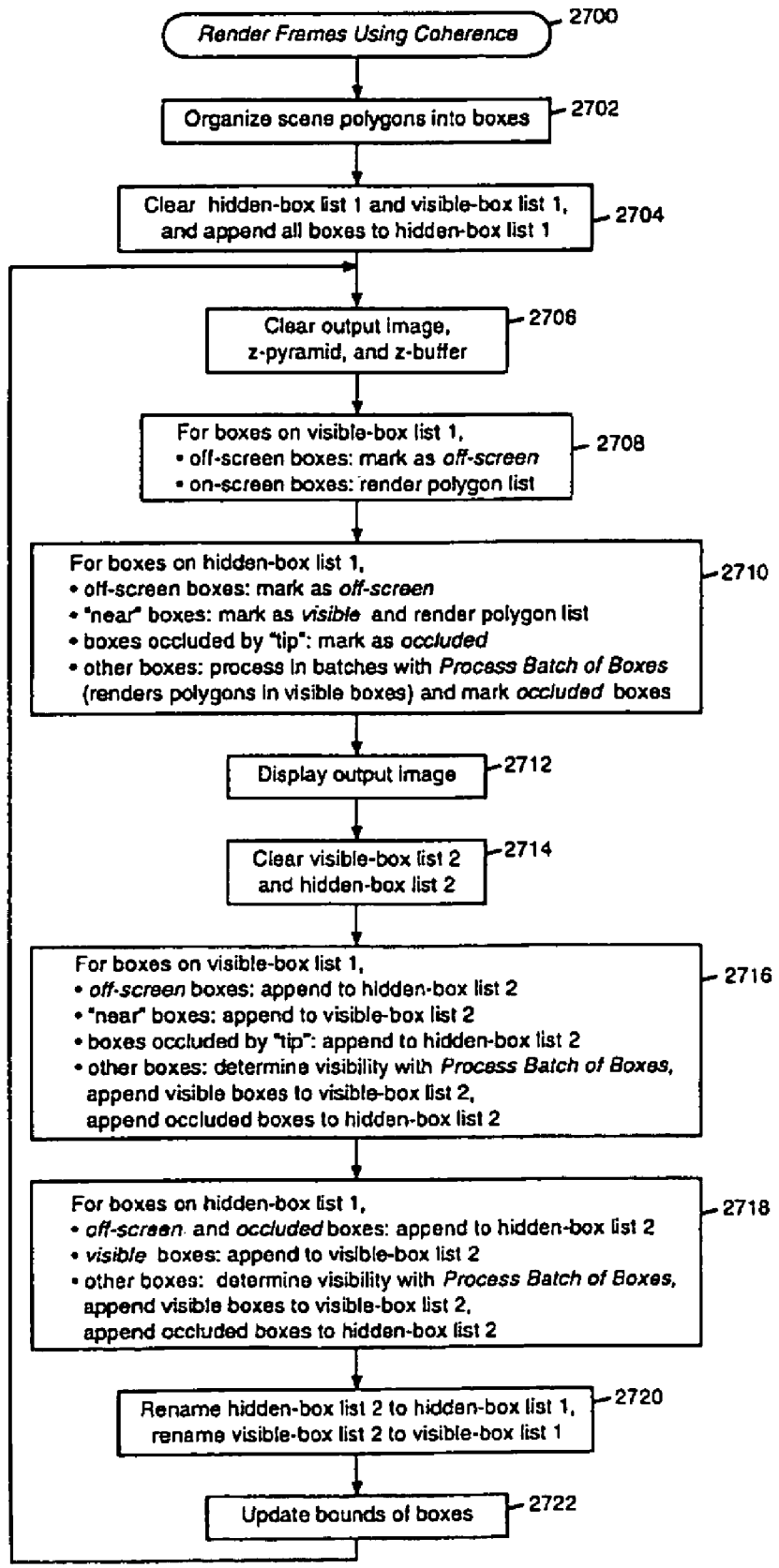
FIG. 27 is an outline of the procedure for rendering frames using frame coherence.

This principle underlies the procedure, Render Frames Using Coherence 2700 (FIG. 27), which works as follows. The scene manager 110 maintains four lists of box records:
1. boxes that were visible last frame (visible-box list 1);
2. boxes that were not visible last frame (hidden-box list 1);
3. boxes that are visible in the current frame (visible-box list 2); and
4. boxes that are not visible in the current frame (hidden-box list 2).

"Hidden" boxes include both occluded and off-screen boxes. In step 2702, the scene manager 110 organizes all scene polygons into polyhedral bounding boxes, each containing some manageable number of polygons (e.g., between 50 and 100). In step 2704, the scene manager 110 clears visible-box list 1 and hidden-box list 1, and appends all boxes in the scene to hidden-box list 1.

Now the system has been initialized and is ready to render sequential frames. First, step 2706 initializes the output image 150, z-pyramid 170, and z-buffer 180 (z-values are initialized to the depth of the far clipping plane).

Next, step 2708 reads boxes in first-to-last order from visible-box list 1 and processes each box, as follows. First, it tests the box to see if it is outside the view frustum, and if the box is outside, its record in the list is marked off-screen.

If the box is not outside, the polygons on its polygon list are rendered with procedure Render Polygon List 300. When the first frame is rendered, visible-box list 1 is null, so step 2708 is a null operation.

Next, step 2710 reads boxes in first-to-last order from hidden-box list 1 and processes each box as follows. First, it tests the box to see if it is outside the view frustum, using the method described at step 608 of procedure 600, and if the box is outside, its record in the list is marked off-screen.

If the box is not outside and it intersects the "near face" of the view frustum, its record in the list is marked visible and its polygons are rendered with Render Polygon List 300. If the box is not outside and it does not intersect the near face, it is tested for occlusion with respect to the tip of the z-pyramid with Is Box Occluded by Tip 1900, and if it is occluded, its record in the list is marked occluded.

Otherwise, the box is batched together with other boxes (neighbors on hidden-box list 1) and processed with Process Batch of Boxes 700 operating in render mode. If the box is visible, this procedure 700 renders the box's polygon list. Otherwise, the box's record in the list is marked occluded.

Now all polygons in visible boxes have been rendered into the output image 150, which is displayed at step 2712. The remaining task before moving on to the next frame is to establish which boxes are visible with respect to the z-pyramid.

First, step 2714 clears visible-box list 2 and hidden-box list 2. Next, step 2716 reads boxes in first-to-last order from visible-box list 1 and processes each box as follows. If the box was marked off-screen at step 2708, it is appended to hidden-box list 2. If the box was not marked off-screen and it intersects the "near face" of the view frustum, the box is appended to visible-box list 2.

If the box was not marked off-screen and it does not intersect the near face, it is tested for occlusion with respect to the tip of the z-pyramid with Is Box Occluded by Tip 1900, and if it is occluded, the box is appended to hidden-box list 2. Otherwise, the box is batched together with other boxes (neighbors on visible-box list 1) and processed with Process Batch of Boxes 700 operating in v-query mode in order to determine its visibility. If the box is visible, it is appended to visible-box list 2, and if it is occluded, it is appended to hidden-box list 2.

Next, step 2718 reads boxes in first-to-last order from hidden-box list 1 and processes each box as follows. If the box was marked off-screen or occluded at step 2710, it is appended to hidden-box list 2. If the box was marked visible at step 2710, it is appended to visible-box list 2.

Otherwise, the box is batched together with other boxes (neighbors on hidden-box list 1) and processed with Process Batch of Boxes 700 operating in v-query mode in order to determine its visibility. If the box is visible, it is appended to visible-box list 2, and if it is occluded, it is appended to hidden-box list 2.

Next, step 2720 renames hidden-box list 2 to hidden-box list 1 and renames visible-box list 2 to visible-box list 1. Then, step 2722 updates the bounds of boxes containing moving polygons (if any), and control returns to step 2706 to begin the next frame.

When there is a high degree of frame coherence, as is usually the case with animation, after rendering the first frame, the algorithm just described approaches the efficiency of near-to-far traversal while avoiding the trouble and expense of performing explicit depth sorting or maintaining the scene model in a spatial hierarchy. Efficient traversal order results from processing boxes first that were visible in the preceding frame (i.e., the boxes on visible-box list 1).

In addition, the order of boxes on the lists is the order in which their visibility was established, which is often correlated with occlusion order, particularly if the viewpoint is moving forward. Consequently, first-to-last traversal of lists improves the culling efficiency of procedure Render Frames Using Coherence 2700.

A similar strategy for exploiting frame coherence has been employed to accelerate z-buffering of models organized in an octree when the z-pyramid is maintained in software and cannot be accessed quickly by the polygon-tiling hardware.

Tiling Look-Ahead Frames to Reduce Latency

When rendering complex scenes in real time, the amount of storage needed for a scene model may exceed the capacity of memory that is directly accessible from the scene manager 110, called scene-manager memory. In this case, it may be necessary during the rendering of a frame to read part of the scene model from another storage device (e.g., a disk), which causes delay. Such copying of scene-model data into scene-manager memory from another storage device will be referred to as paging the scene model.

Paging the scene model can be controlled with standard virtual-memory techniques, "swapping out" data that has not been recently accessed, when necessary, and "swapping in" data that is needed.

When rendering scene models that are too large to fit in scene-manager memory, preferably, frames are rendered with procedure Render Frames with Box Culling 500 and records for bounding boxes are stored separately from the list of primitives that they contain. The record for a bounding box includes records for its faces and a pointer to the list of primitives that the box contains. Box records are retained in scene-manager memory and the lists of polygons associated with bounding boxes are swapped into and out of scene-manager memory as necessary.

The advantage of organizing the scene model in this way is that the only time that paging of the scene model is required when rendering a frame is when a bounding box is visible and its polygon list is currently swapped out. This occurs, for example, at step 720 of procedure Process Batch of Boxes 700, if the polygon list associated with a visible bounding box is not already present in scene-manager memory, in which case the polygon list must be copied into scene-manager memory before the scene manager 110 can initiate rendering of the polygon list.

Although the approach just described can reduce paging of the scene model, at some frames a large number of bounding boxes can come into view, and when this occurs, the time it takes to copy swapped-out lists of polygons into scene-manager memory can delay rendering of the frame.

The "look-ahead" method employed herein to reduce such delays is to anticipate which bounding boxes are likely to come into view and read their polygon lists into scene-manager memory, if necessary, so they will be available when needed. This approach enables delays caused by paging of the model to be distributed over a sequence of frames, resulting in smoother animation.

According to this method, first it is estimated where the view frustum will be after the next few frames have been rendered. This estimated frustum will be called the look-ahead frustum.

Then, as the next few frames are being rendered, a look-ahead frame corresponding to the look-ahead frustum is created using a procedure that is similar to rendering an ordinary frame, except that no output image is produced.

Rather, processing of primitives stops after they are tiled into a z-pyramid, which is separate from the z-pyramid used to render ordinary frames and which will be called the look-ahead z-pyramid.

When tiling of a look-ahead frame has been completed, all primitives which are visible in that frame have been paged into scene-manager memory and will be available if they are needed when rendering ordinary frames.

To support creation of look-ahead frames in the graphics system of FIG. 1, the culling stage 130 includes a look-ahead z-pyramid 195 (shown in dashed lines to indicate that this is just an option) and frame-generation procedures are modified so that a look-ahead frame can be generated gradually while one or more ordinary frames are being rendered.

Figure 29:
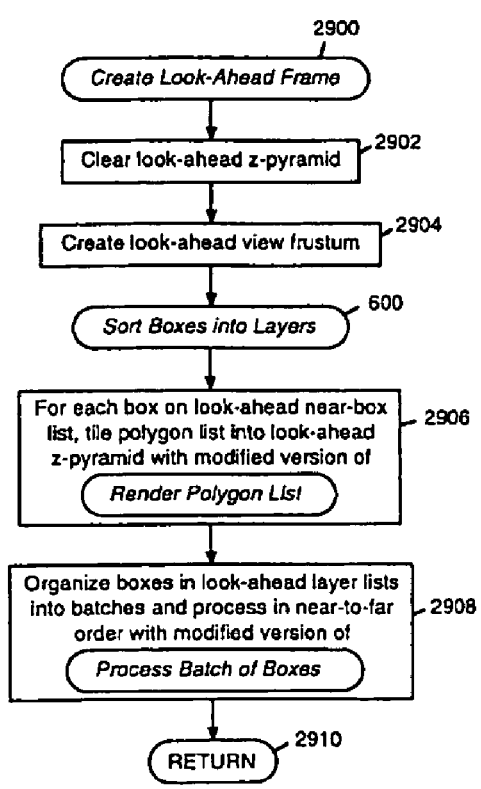
FIG. 29 shows look-ahead frames created with specially adapted procedure.

Look-ahead frames are created with procedure Create Look-Ahead Frame 2900, shown in FIG. 29. This procedure is similar to rendering an ordinary frame with box culling, except that primitives are not passed on to the z-buffer renderer 140 after they are tiled into the look-ahead z-pyramid 195. This procedure 2900 is executed a little at a time, as the graphics system renders ordinary frames.

Procedure Create Look-Ahead Frame 2900 begins with step 2902, which clears the look-ahead z-pyramid 195 to the far clipping plane.

Next, step 2904 estimates where the view frustum will be after some small amount of time, for example, where the view frustum will be after another twenty frames have been rendered. This look-ahead frustum is determined by extrapolating the position of the viewpoint based on the position of the viewpoint in preceding frames, extrapolating the direction of view based on the direction of view in preceding frames, and constructing a frustum from the extrapolated viewpoint and direction of view. Preferably, look-ahead frames are created with a wider view angle than ordinary frames so that more of the scene will be visible.

Next, procedure Sort Boxes into Layers 600, which has already been described, sorts the scene model's bounding boxes into layer lists to facilitate their traversal in approximately near-to-far order within the look-ahead frustum. This procedure also creates a near-box list containing the boxes that intersect the near face of the look-ahead frustum. To distinguish these lists from the lists used when rendering ordinary frames, they will be called the look-ahead layer lists and the look-ahead near-box list.

Next, step 2906 processes the polygon lists associated with the bounding boxes on the look-ahead near-box list. First, any of these polygon lists which are not already present in scene-manager memory are copied into scene-manager memory. Then, each polygon list is tiled into the look-ahead z-pyramid 195 using a modified version of procedure Render Polygon List 300 which operates as previously described, except that the procedure and its subprocedures access the look-ahead z-pyramid 195 (instead of the other z-pyramid 170), procedure Transform & Set Up Polygon 900 does not create or output rendering records, procedure Process NxN Tile 1300 does not output polygons to the z-buffer renderer 140, and step 306 of Render Polygon List 300 is omitted.

Next, step 2908 processes the look-ahead layer lists using a modified version of procedure Process Batch of Boxes 700. This procedure 700 operates as previously described, except that it and its subprocedures access the look-ahead z-pyramid 195 (instead of the other z-pyramid 170) and procedure Render Polygon List 300 (executed at step 720) is modified as described above.

To enable step 702 of procedure Process Batch of Boxes 700 to cull bounding boxes that are occluded by the look-ahead z-pyramid 195, the culling stage copies the tip of the look-ahead z-pyramid 195 to the scene manager 110 at step 716 of procedure Process Batch of Boxes 700. The scene manager 110 stores this occlusion data separately from the tip of the other z-pyramid 170.

At step 720 of procedure Process Batch of Boxes 700, if a polygon list is not already present in scene-manager memory, it must be copied into scene-manager memory prior to tiling with procedure Render Polygon List 300.

Following step 2908, procedure Create Look-Ahead Frame 2900 terminates at step 2910, and work begins on the next-look-ahead frame. When a look-head frame is completed, all polygons which are visible in that frame have been copied into scene-manager memory and will be available if they are needed when rendering an ordinary frame.

Execution of procedure Create Look-Ahead Frame 2900 is interleaved with execution of steps 504 through 510 of procedure Render Frames with Box Culling 500 (which renders ordinary frames), with the scene manager 110 controlling switching from one procedure to the other.

Preferably, work on look-ahead frames is done at times when the components that it requires are not being used by Render Frames with Box Culling 500. For example, when Process Batch of Boxes 700 is rendering an ordinary frame, after a batch of bounding boxes is processed by the geometric processor 120 and the culling stage 130, there is a delay before the associated polygon lists are sent through the system, since it takes time to report the visibility of boxes. During this delay, a batch of boxes for the look-ahead frame can be processed by the geometric processor 120 and the culling stage 130.

Also, if processing of an ordinary frame is completed in less than the allotted frame time (e.g., in less than one thirtieth of a second), work can be performed on a look-ahead frame.

Preferably, the resolution of the look-ahead z-pyramid 195 is lower than the resolution of ordinary frames in order to reduce storage requirements, computation, and memory traffic. For example, the look-ahead z-pyramid 195 could have a resolution of 256×256 samples.

Preferably, even when a low-resolution look-ahead z-pyramid 195 is employed, the "ordinary" tiling algorithm is employed within procedure Process NxN Tile 1300, where control passes from step 1316 to step 1326, rather than step 1334 (step 1322 is skipped when tiling a look-ahead frame). In other words, steps 1334 and 1336 are only executed when tiling an ordinary frame with a low-resolution z-pyramid, not when tiling a look-ahead frame with a low-resolution z-pyramid.

Preferably, the look-ahead z-pyramid 195 is low-precision in addition to being low-resolution, in order to reduce storage requirements and memory traffic. For example, each z-value can be stored as a 12-bit value. Storage requirements can be further reduced by storing finest-level NxN tiles in the look-ahead z-pyramid 195 as mask-zfar pairs.

Hierarchical Z-Buffering with Non-Conservative Culling

Even with the efficiency of hierarchical z-buffering, at some level of complexity it may not be possible to render a scene within the desired frame time. When this occurs, accuracy can be traded off for speed by culling objects that may be slightly visible, that is, by performing non-conservative occlusion culling. Although this can noticeably impair image quality, in some cases this is acceptable for faster frame generation.

The speed versus accuracy tradeoff is controlled as follows. The error limit is defined as the maximum number of tiling errors that are permitted within a finest-level tile of the z-pyramid when tiling a particular polygon. A tiling error consists of failing to overwrite an image sample where a polygon is visible.

Using an error limit E permits non-conservative culling to be performed with one modification to the basic algorithm for hierarchical tiling. When propagating depth values through the z-pyramid, at each finest-level tile, instead of propagating the farthest z-value to its parent tile, the z-value of rank E is propagated, where the farthest z-value has rank 0 and the nearest z-value has rank N2-1.

Thus, when E is 0 the farthest z is propagated, when E is 1 the next-to-the-farthest z is propagated, when E is 2 the next-to-the-next-to-the-farthest z is propagated, and so forth. When propagating at other levels of the pyramid (i.e., except when propagating from the finest level to the next-to-the-finest level), the farthest z value in the child tile is propagated, as in a traditional z-pyramid.

Using this propagation procedure, except at the finest level, each z-value in the z-pyramid is the farthest rank-E z-value for any finest-level tile in the corresponding region of the screen. It follows that the occlusion test performed at step 1308 of procedure Process N×N Tile 1300 will automatically cull a polygon in any region of the screen where it is potentially visible at E or fewer image samples within any finest-level tile.

This method avoids some of the subdivision required to definitively establish the visibility of polygons or portions of polygons that are potentially visible at only a small number of image samples, thereby reducing both memory traffic and computation. Moreover, this advantage is compounded when culling bounding boxes, since culling of a "slightly visible" box saves the work required to process all polygons inside it.

Each polygon which is potentially visible at more than E image samples within a finest-level tile is processed in the usual way, so all of its visible image samples within these tiles are written.

This method of non-conservative culling requires the following modifications to procedure Process N×N Tile 1300, assuming an error limit of E.

First, instead of maintaining the farthest of the existing z-values for a finest-level tile in variable zfarx[F] (where F is the index of the finest pyramid level), the z-value of rank E among the existing z-values for that tile is maintained. For example, if E is one, after looping over a finest-level tile in procedure Process N×N Tile 1300, variable zfarx[F] contains the next-to-the-farthest z-value of the z-values that were originally stored for that tile. This modification requires changing procedure Update zfarx 1600 when variable L is the index of the finest level.

Second, instead of maintaining the farthest z-value encountered so far for the tile being processed in variable zfar_finest, the z-value of rank E among those z-values is maintained in zfar_finest. For example, if E is one, after looping over a finest-level tile in procedure Process N×N Tile 1300, variable zfar_finest would contain the next-to-the-farthest z-value in z-array[F], where F is the index of the finest pyramid level.

Given these two modifications, procedure Propagate Z-Values 1700 propagates the correct z-values through the z-pyramid.

One way of thinking of this method for non-conservative occlusion culling is that the error limit provides a convenient, predictable "quality knob" that controls the speed versus quality tradeoff. When the error limit is zero, the method performs standard hierarchical z-buffering and it produces a standard image that is free of visibility errors. Otherwise, the higher the error limit, the faster the frame rate but the poorer the image quality.

When it is important to maintain a particular frame rate, the error limit can be adjusted accordingly, either by the user or by the rendering program, either at the beginning of a frame or during frame generation.

The method can be applied whether the image is point sampled or oversampled, so the speed versus quality spectrum ranges from relatively fast generation of point-sampled images with numerous visibility errors to relatively slow generation of accurately antialiased images that are free of visibility errors.

One shortcoming of this method of non-conservative culling is that it is possible that up to E image samples may never be tiled within a finest-level tile, even though they are covered by polygons that have been processed. This behavior can be avoided by adding an additional propagation rule: always propagate the farthest z-value until all image samples within a finest-level tile have been covered.

Other simple modifications to propagation rules may also improve image quality. For example, to make errors less noticeable propagation rules could be structured to avoid errors at adjacent image samples.

If multiple depth values are maintained corresponding to multiple error limits in the z-pyramid, different error limits can be selected depending on circumstances. For example, a higher error limit could be used when tiling bounding boxes than when tiling primitives, since culling a bounding box can save a lot of work. This approach does not require any changes to the finest level of the z-pyramid, but it requires propagating and storing multiple z-values for each cell at the coarser levels of the z-pyramid.

For example, if two z-values are maintained for each child tile at cells in levels of the z-pyramid that are coarser than the finest level, the farthest z-value and the next-to-the-farthest z-value within the corresponding region of the screen, then the farthest z-values could be applied to culling primitives and the next-to-the-farthest z-values could be applied to culling bounding boxes.

Summarizing the changes to the z-pyramid that are required when performing non-conservative culling for an error limit of E, the same information is stored at the finest level as with ordinary conservative culling, but at all coarser levels, instead of storing the farthest z-value within the corresponding region of the screen, the rank-E z-value for the corresponding region of the screen is stored. For example, if E is one, each z-value at levels that are coarser than the finest level is the next-to-the-farthest z-value for the corresponding region of the screen.

To support culling with K different error limits, it is necessary to store K z-values for each z-pyramid cell at levels of the pyramid that are coarser than the finest level, each of these K z-values corresponding to one of the error limits.

Implementation Issues.

Although each of the stages in the graphics system 100 of FIG. 1 can be implemented in either software or hardware, at the present time, it is more practical to implement the scene manager 110 in software and to implement the culling stage 130 and the z-buffer renderer 140 in hardware. Software implementation of the scene manager 110 is preferred because of the relative complexity of the operations it performs and the flexibility that software implementation provides.

Hardware implementation of the culling stage 130 and the z-buffer renderer 140 is preferred because, presently, it is not practical to attain real-time rendering of very complex scenes with software implementations. Although operations of the geometric processor 120 can be accelerated by hardware implementation, a software implementation running on the host processor (or another general-purpose processor) may provide adequate performance.

As processor performance improves over time, implementation of the entire system in software running on one or more general-purpose processors becomes increasingly practical.

Effectiveness of The Present Method of Occlusion Culling.

The graphics system 100 of FIG. 1 was simulated to compare its efficiency to traditional z-buffer systems when processing densely occluded scenes. The simulation employed a building model which was constructed by replicating a polygonal model of an office cubicle. By varying the amount of replication, scenes were created with depth complexities ranging from 3 to 53. These scene models are poorly suited to culling using the "rooms and portals" method because of their relatively open geometry.

A simulation program measured traffic on two classic bottlenecks in z-buffer systems: the traffic in polygons that need to be processed by the system, which will be referred to as geometry traffic, and depth-buffer memory traffic generated by depth comparisons, which will be called z-traffic and is measured in average number of bits of memory traffic per image sample. In the graphics system 100 of FIG. 1, geometry traffic is the traffic in polygons and cube faces on connections 115 and 125 and z-traffic is the combined traffic on connections 165 and 175.

Simulations compared z-buffering to hierarchical z-buffering, with and without box culling. The figures cited below assume that within the graphics system 100 the z-buffer 180 and output image 150 have resolution 1024 by 1024 and the z-pyramid 170 has resolution 1024 by 1024 and is organized in five levels of 4×4 tiles which are accessed on a tile-by-tile basis. This system is compared to a conventional z-buffer system with a 1024 by 1024 z-buffer having 32-bit z-values which are accessed in 4×4 tiles.

When processing versions of the scene having high depth complexity, the amount of geometry traffic was very high when box culling was not employed. For example, in a version of the scene with a depth complexity of 53, there were approximately 9.2 million polygons in the view frustum, and without box culling it was necessary to process all of these polygons every frame. With box culling and near-to-far traversal, it was only necessary to process approximately 45,000 polygons per frame, approximately a 200-fold reduction.

The advantage of hierarchical z-buffering over conventional z-buffering is that it reduces z-traffic dramatically, assuming favorable traversal order. For example, with box culling and near-to-far traversal of bounding boxes, for a version of the scene with a depth complexity of 16, z-buffering generated approximately 10 times as much z-traffic as hierarchical z-buffering using a z-pyramid with 8-bit z-values.

When scene depth complexity was increased to 53, z-buffering generated approximately 70 times as much z-traffic as hierarchical z-buffering using a z-pyramid with 8-bit z-values. For these scenes, performing box culling with conventional z-buffering was not effective at reducing z-traffic because boxes overlapped very deeply on the screen and the culling of occluded boxes generated a great deal of z-traffic.

The relative advantage of hierarchical z-buffering was less when traversal order was less favorable, but even when scene geometry was traversed in random order, hierarchical z-buffering generated substantially less z-traffic than traditional z-buffering.

Even without box culling, hierarchical z-buffering reduced z-traffic substantially. For example, when a version of the scene having a depth complexity of 16 was rendered without box culling, z-buffering generated approximately 7 times as much z-traffic as hierarchical z-buffering.

Next, culling performance was measured when finest-level tiles in the z-pyramid were stored as mask-zfar pairs with 12-bit zfar values. Tiles at coarser levels of the z-pyramid were stored as arrays of 12-bit z-values.

Compared to using a z-pyramid in which all tiles were stored in arrays of 8-bit z-values, this method improved culling efficiency, thereby reducing geometry traffic, and reduced z-traffic by a factor of three or four. Overall, a z-pyramid in which finest-level tiles are represented as mask-zfar pairs and tiles at coarser levels are represented as arrays of low-precision z-values appears to produce the best performance.

ALTERNATE EMBODIMENTS

Additional optional features will now be set forth. In particular, methods and apparatuses will be described for a "z-accept" feature, two-pass rendering with conservative culling, and conservative stencil culling/hierarchical stencil culling. It should be noted that the foregoing procedures may be executed independent from or in combination with the concepts set forth hereinabove. Further, the following principles may be used independent from or in combination with each other per the desires of the user.

Figure 30:
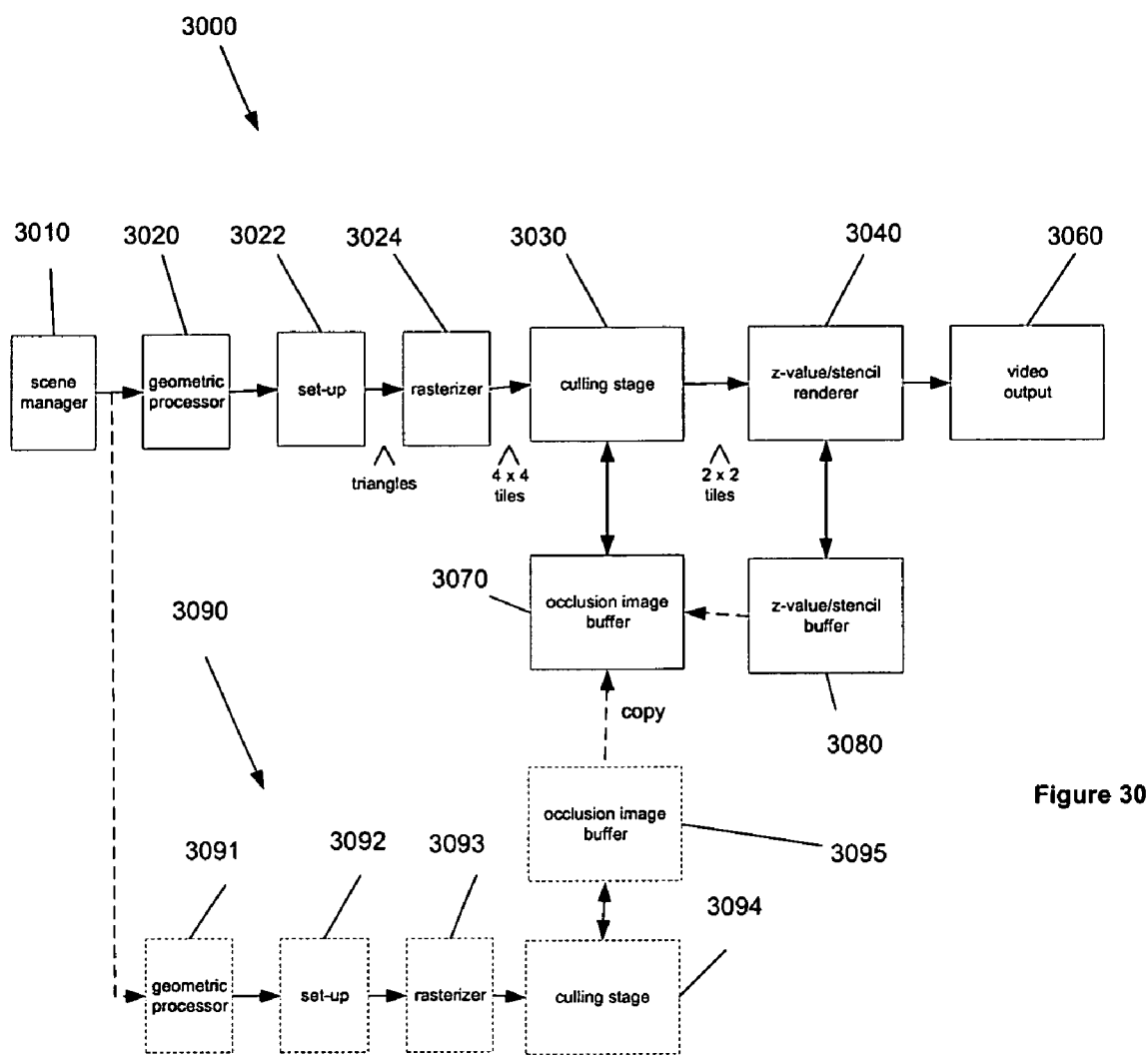
FIG. 30 is a schematic illustrating an architecture that may be employed in carrying out the techniques set forth in FIGS. 31 through 37.

FIG. 30 illustrates a preferred embodiment of the present invention in which the numeral 3000 identifies a graphics system for rendering geometric models. The graphics system 3000 includes a scene manager 3010 which sends objects, i.e. triangles, polygons, etc., to a geometric processor 3020. The geometric processor 3020, in turn, transforms the objects to perspective space and sends them on to a set-up module 3022.

The set-up module 3022 calculates various values such as the slopes of the incoming objects, a starting position, and a starting value. Such values are then used, for example, to generate coefficients for line equations of the edges of the objects to be sent to a rasterization module 3024. It should be noted that the output of the rasterization module 3024 may include 4×4 tiles, or any other desired size. While not shown, the rasterization module 3024 may include a coarse module for reasons that will become apparent hereinafter.

Coupled to the rasterization module 3024 is a culling stage 3030 which receives tile records and other information describing objects and culls occluded geometry, and passes "potentially visible" objects to a z-value/stencil rendering stage 3040. The culling stage 3030 passes records for 2×2 tiles and other information about potentially visible objects to the z-value/stencil rendering stage 3040. Finally, such output image is converted to video format in a video output stage 3060.

Both the culling stage 3030 and the z-value/stencil renderer 3040 have dedicated buffers, an occlusion image buffer 3070 in the case of the culling stage 3030 and a z-value/stencil buffer 3080 in the case of the z-value/stencil renderer

3040. Within the z-value/stencil buffer 3080, z-value and stencil information may be maintained in separate images, or stored in a single image.

It is important to note that computations within the culling stage 3030 are structured so that culling is conservative, meaning that some occluded geometry can fail to be culled but visible geometry is never culled. The occlusion image buffer 3070 maintained by the culling stage 3030 requires only a fraction of the storage of the z-value/stencil buffer 3080, and bandwidth requirements of occlusion tests performed by the culling stage 3030 are far less than that which would be generated by a z-value/stencil renderer 3040 using a z-value/stencil buffer 3080 in a system without a culling stage. In one embodiment, the occlusion image buffer 3070 is organized in 4×4 tiles, or tiles of any other desired size.

As an option, the occlusion image buffer 3070 may be positioned on a first integrated circuit on which the culling stage 3030 and/or the other components shown in FIG. 30 are positioned, and the z-value/stencil buffer 3080 may be positioned on a second integrated circuit separate from the first integrated circuit.

Further, another pipeline 3090 may optionally be provided including a second geometric processor 3091, a second set-up module 3092, a second rasterizer 3093, a second culling stage 3094, and another occlusion image buffer 3095 for operating in parallel with the components set forth hereinabove for reasons that will be set forth hereinafter. Note FIG. 30.

Figure 31:
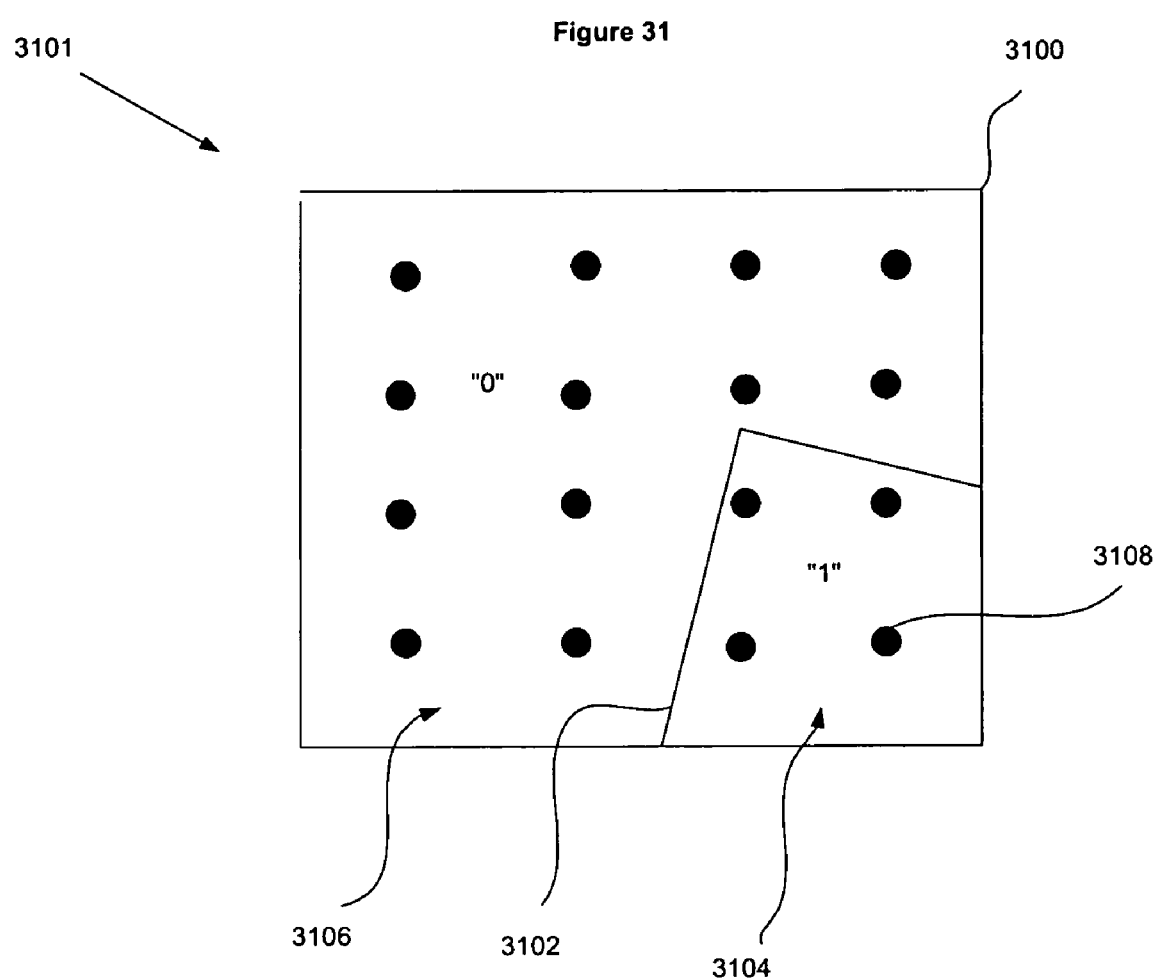
FIG. 31 illustrates a sample tile of an occlusion image that may be stored in an occlusion image buffer of the architecture of FIG. 30.

FIG. 31 illustrates a sample tile 3100 of an occlusion image 3101 that may be stored in the occlusion image buffer 3070. Within a tile, a coverage mask may partition the tile region into further sub-regions: a covered region "1" 3104 and an uncovered region "0" 3106. Further, each tile 3100 stores a plurality of values relating to various samples 3108 existent in the tile 3100. For example, each region of the tile 3100 has an associated zfar value, znear value, stencil valid flag, and stencil value. Ideally, each z-value that is stored is done so using 8 or 12 bits.

Figure 32:
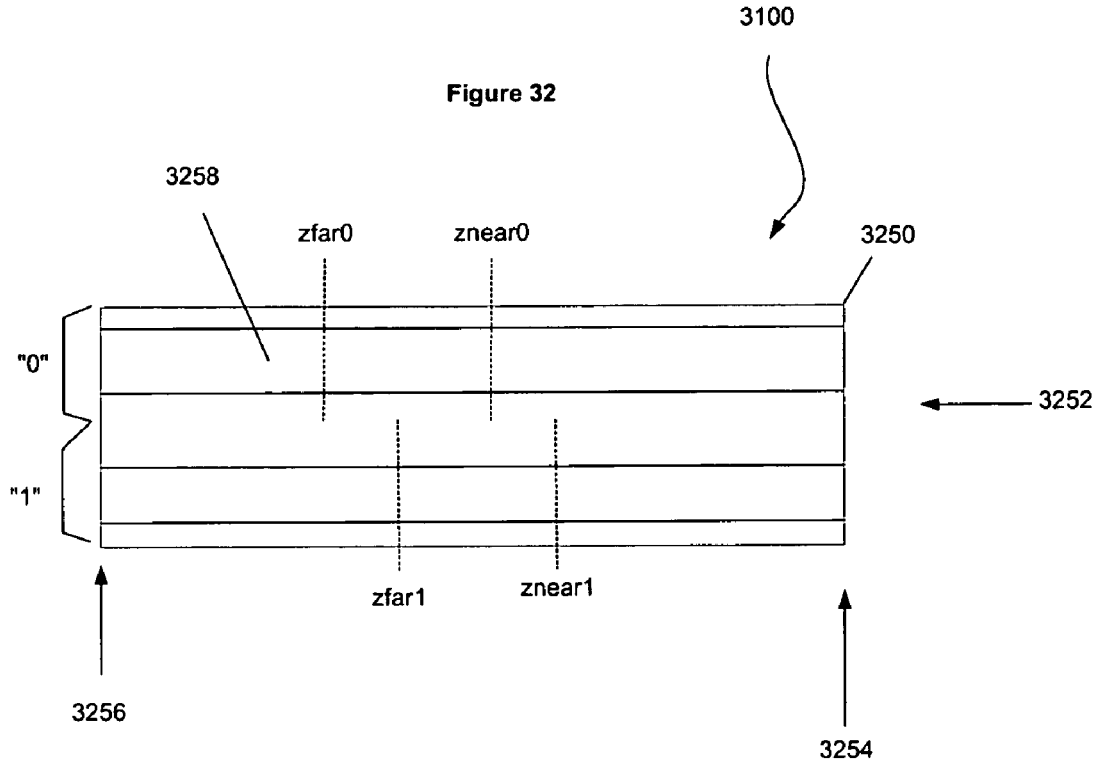
FIG. 32 illustrates the various values stored by the tile of FIG. 31, in accordance with one embodiment of the present invention.

FIG. 32 illustrates the various values stored for the tile 3100, in accordance with one embodiment of the present invention. In FIG. 32, a side view of a tile 3100 is shown, which in three dimensions is a rectangular solid 3250 having a rectangular cross-section. Given the indicated direction of view 3252, the right-hand end 3254 of the solid 3250 is the near clipping plane and the left-hand end 3156 of the solid 3250 is the far clipping plane.

The four thin horizontal lines 3258 indicate the positions of rows of the samples 3108 within the tile 3100. As shown, a zfar0 value is defined as a farthest visible point of any object processed thus far (or portion thereof) in the tile 3100 in region "0" that is not covered by the coverage mask 3102, a znear0 value is defined as a nearest point of any object processed thus far (or portion thereof) in the tile 3100 in region "0" that is not covered by the coverage mask 3102, and a zfar1 value is defined as a farthest visible point of any object processed thus far (or portion thereof) in the tile 3100 that is covered by the coverage mask 3102 in region "1", and a znear1 value is defined as a nearest point of any object processed thus far (or portion thereof) in the tile 3100 that is covered by the coverage mask 3102 in region "1". While not pictorially represented, also included is stencil information including a stencil valid flag and a stencil value for each of the regions which will be described hereinafter in greater detail.

While a single occlusion image is described herein, it should be understood that a pyramidal image similar to that of FIG. 2 may be utilized per the desires of the user. Further, FIGS. 31 and 32 may be elaborated upon by reference to FIGS. 22a through 24 discussed hereinabove.

In use, tile records are created using as input the stored tile record in the occlusion image, the coverage of the triangle within the 4×4 tile being processed, and the z-value range of the triangle being processed. Preferably, the z-range of the triangle within the tile is known, although the z-range may be known for only the entire triangle. The rules used to update the coverage mask and zfar value(s) in tile records will now be set forth. It should be noted that these rules may be similar to those set forth earlier during reference to FIG. 24.

FIGS. 32B–32H illustrate the manner in which the zfar value(s) and mask are updated in various cases. In each of the FIGS. 32B–32H, the line "P" indicates the "potentially visible" samples covered by a polygon and the depth of the farthest of these samples within the tile. FIG. 32A identifies the various markings used to identify the various z-values in FIGS. 32B–32H. As shown, polygons are "potentially visible" where the znear value of the polygon is in front of the zfar value of the tile.

Figure 32H:
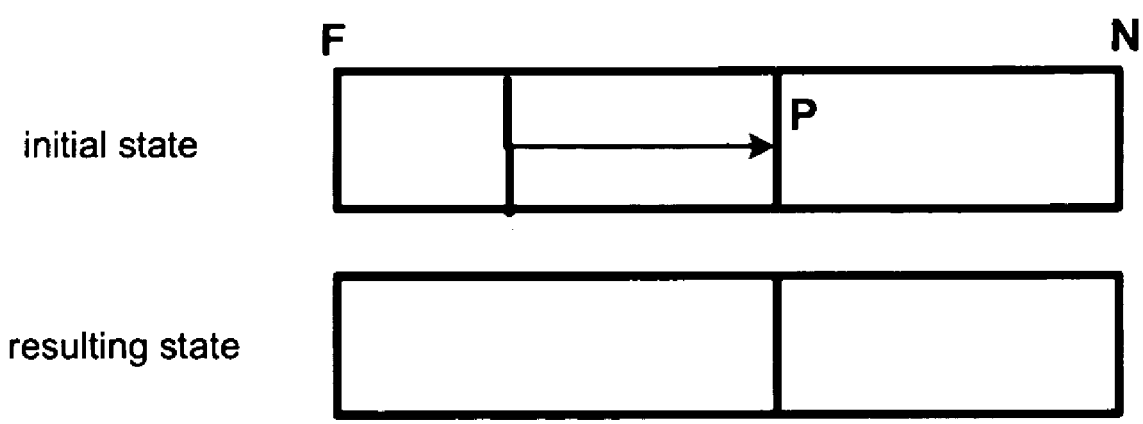

As shown, a first side view of an initial state of a tile is depicted with a particular positioning of the region "P" below which is a second side view of a resulting state of the tile showing the manner in which the zfar value(s) and mask are updated in the particular case. FIG. 32B illustrates a case where a mask is created, while FIG. 32E illustrates a case where a mask is omitted. FIG. 32H illustrates a case where there is no coverage mask in the initial or resulting state.

Table 1 illustrates exemplary rules for updating znear values within a region of a tile, which may be done after the zfar values and the coverage mask have been updated. If there were two regions, the procedure of Table I would be applied for both.

TABLE 1

```
Input:
region_mask →(Mask of region)
mask0_org →(Original mask for region 0)
mask1_org →(Original mask for region 1)
znear0_org →Original near z-value for region 0)
znear1_org →(Original near z-value for region 1)
znear_poly →(near z-value of polygon being processed)
pv_poly_samps_mask (mask of "potentially visible" samples on the
triangle being processed, i.e. , the samples not culled)
        if( (region_mask & mask0_org) && (region_mask &
        mask1_org)
    ){
            // region overlaps both original regions
            region_znear = nearer_of(znear0_org,znear1_org);
        }
        else if( region_mask & mask0_org ){
            // region overlaps original region 0 only
            region_znear = znear0_org;
        }
        else{
            // region overlaps original region 1 only
            region_znear = znear1_org;
        }
        if( pv_samps_mask & region_mask ){
            // mask_pv_samps overlaps the region
            region_znear = nearer_of(znear_poly,region_znear);
        }
```

As shown in Table 1, a mask and near z-value for the original "regions" of the tile are saved before the far z-value and mask are updated for the tile. Then, the far z-values and the coverage mask are updated. After updating the far z-values and the coverage mask, the "potentially visible" samples on the polygon being processed are known. These are represented by mask pv_poly_samps_mask. If this mask is null, all samples on the polygon are culled and it is not necessary to update the near z-value. Finally, the near z-value for regions 0 and 1 are updated using the procedure of Table 1.

With the foregoing framework defined, the manner in which the various features may be implemented will now be set forth in the context of the preferred embodiment 3000 of FIG. 30.

Avoiding Reading Z-values Utilizing a "Z-Accept" Feature

Figure 33:
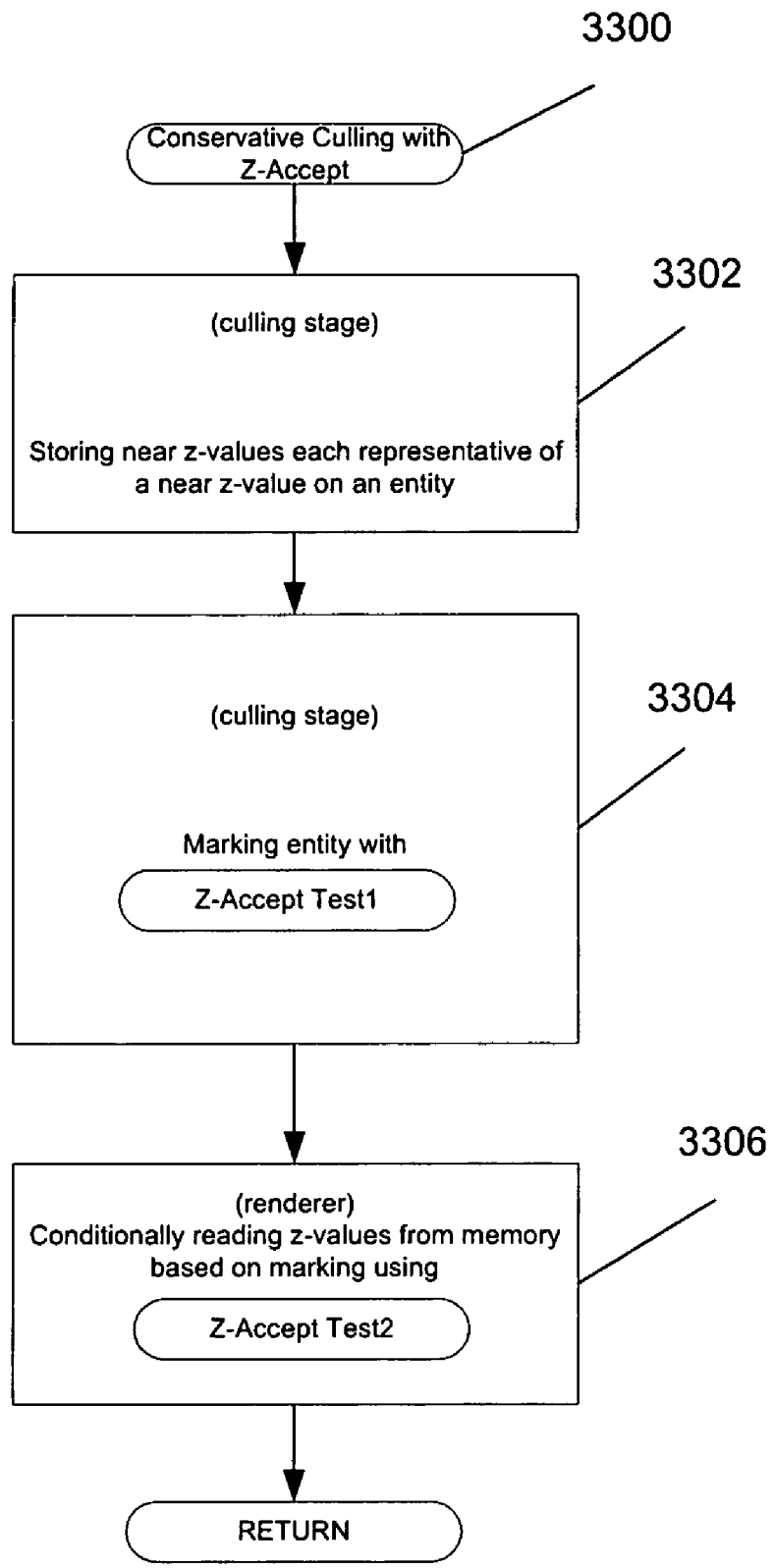
FIG. 33 illustrates a method of avoiding reading z-values utilizing a z-accept feature.

FIG. 33 illustrates an exemplary method 3300 of avoiding reading z-values. According to the method 3300, the culling stage 3030 determines and stores z-values, each representative of a near z-value, znear, of entities (i.e. objects, image samples, polygons, region, tile, etc.). Note operation 3302. As mentioned earlier, such region may be defined utilizing the tile 3100 and coverage mask 3102. The value, znear, is described hereinabove in FIG. 32A. It should be noted that the near z-values may be calculated in any desired manner. The culling stage 3030 is capable of using the near z-values to save bandwidth by avoiding z-value reads from the z-value/stencil buffer 3080 by the renderer 3040. To accomplish these bandwidth savings, a first Z-Accept Test is used to determine whether a particular entity (i.e. objects, image samples, polygons, region, tile, etc.) is known to be visible, in which case it is marked "accepted." Otherwise, the entity is marked "ambiguous." More information regarding such first Z-Accept Test will be set forth in greater detail during reference to FIG. 34.

For each polygon that is not completely culled, the culling stage 3030 sends status information on to the renderer 3040. Included with such information is an indication as to which of the entities or portions thereof are accepted and which are ambiguous. The renderer 3040 renders the entity into the output image 3060 using z-buffering (act 3306) modified in accordance with a second Z-Accept Test. Such second Z-Accept Test allows the renderer 3040 to skip the unnecessary reading of z-values. More information regarding such second Z-Accept Test will be set forth in greater detail during reference to FIG. 35.

Figure 34:
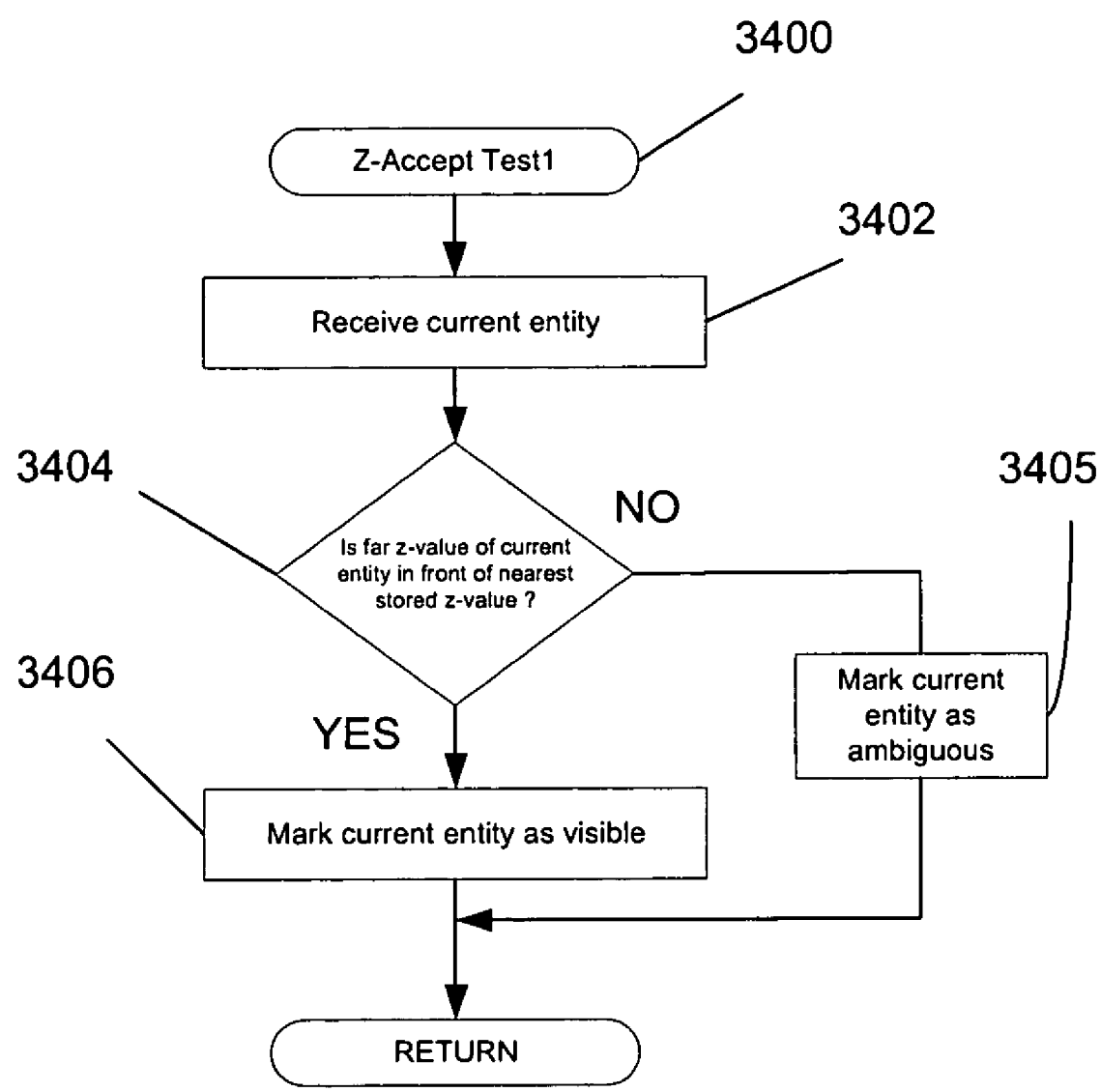
FIG. 34 illustrates the procedure associated with the first Z-Accept Test employed in the method of FIG. 33.

FIG. 34 illustrates the procedure 3400 associated with the first Z-Accept Test employed in method 3300 of FIG. 33. As mentioned earlier, near z-values are stored by the culling stage 3030. It should be understood that z-values include z-values covered and not covered by the coverage mask, znear1 and znear0, respectively. With this information, the culling stage 3030 is capable of detecting when samples are known to be visible.

As shown in FIG. 34, the entities are received in operation 3402 after which it is decided in decision 3404 whether a far z-value of the current entity is in front of the stored near z-value. A comparison operation may be used to make this determination. If the far z-value of the current entity is in front of the near stored z-value, the current entity is marked as "visible" for use by the renderer 3040 in skipping the reading of z-values. Note operation 3406. If the far z-value of the current entity is not in front of the near stored z-value, the current entity is marked as "ambiguous," meaning that it is not known whether or not it is visible, as indicated by operation 3405. In one embodiment, the culling stage 3030 informs the renderer 3040 which image samples are visible and which are ambiguous by encoding this information in coverage masks which are sent to the renderer 3040.

It should be noted that a similar comparison operation may be used to determine that a near z-value of the current entity is farther than a farthest z-value of a region, in which case the entity is occluded and may be culled.

Figure 35:
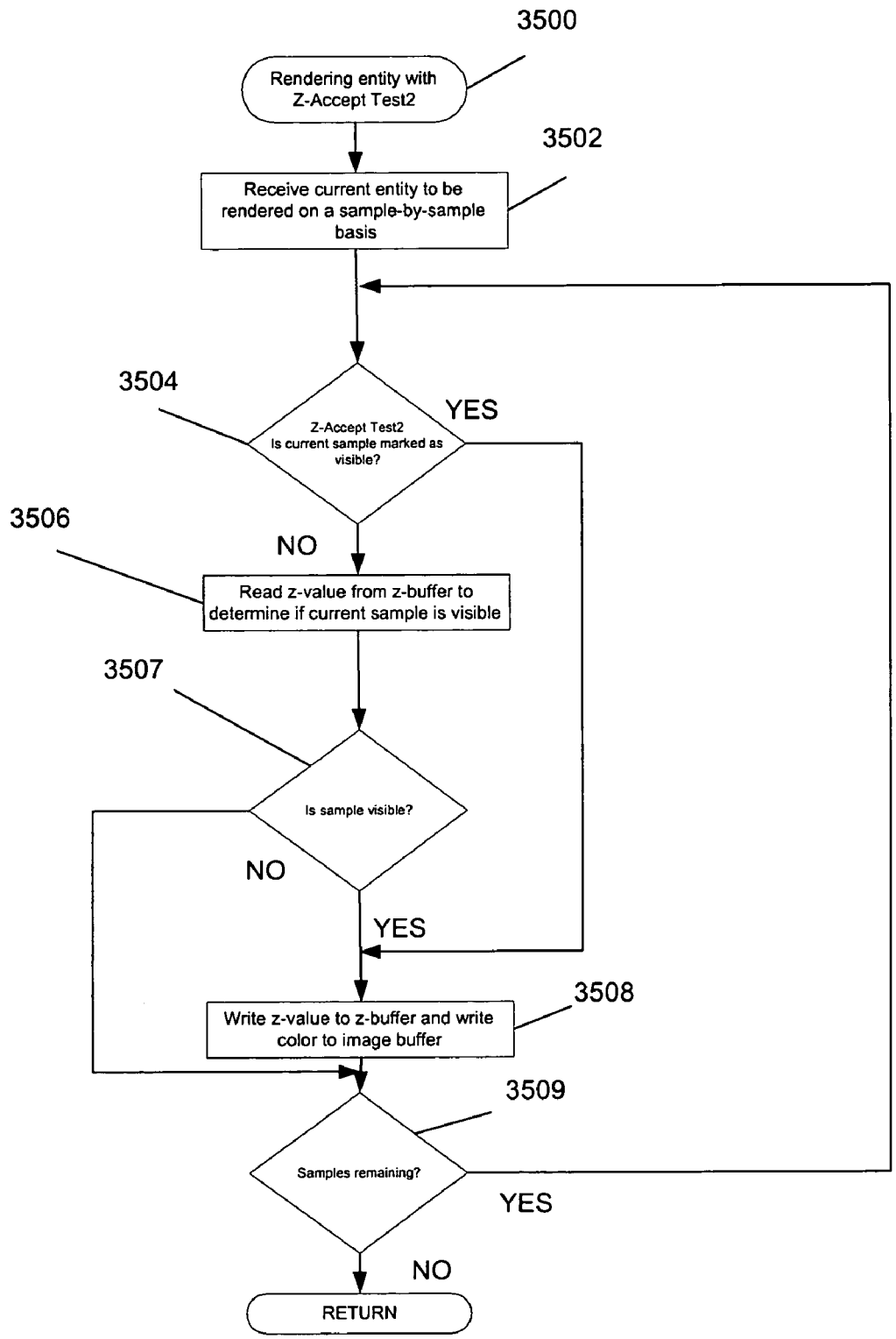
FIG. 35 illustrates the procedure associated with the second Z-Accept Test employed in the method of FIG. 33.

FIG. 35 illustrates the procedure 3500, Render with Z-Accept Test2, associated with the second Z-Accept Test employed in method 3300 of FIG. 33. As shown, entities are received from the culling stage 3030 in operation 3502 to be rendered on a sample-by-sample basis. Prior to going forward after operation 3502, the associated marking information stored during the procedure 3400 of FIG. 24 may be extracted. For example, records for a 2×2 array of image samples may be passed, each marked as "accepted" meaning that they are known to be visible or "ambiguous" meaning that visibility is unknown. It should be noted that, in the alternative, the records may correspond to a polygon, etc.

Thereafter, it is determined in Z-Accept Test2, decision 3504, as to whether the current entity is marked as visible. If not, a z-value must be read from the z-buffer to determine visibility at each image sample in operation 3506. Further, it may be determined in decision 3507 whether the sample is visible based on operation 3506. If not, the procedure 3500 continues to the next sample, if any. Note decision 3509.

If, however, it is determined in decision 3504 that the current entity is marked as visible by the culling stage 3030, operation 3506 and decision 3507 may be skipped, thus saving bandwidth and computation. If the sample is determined to be visible in decision 3507 or the current sample is marked as visible per decision 3504, the z-value is written to the z-buffer and the color is written to a standard image buffer. Note operation 3508. After all of the samples on the entity have been processed (as determined by decision 3509), rendering of the entity is complete.

It should be noted that the geometric processor 3020, culling stage 3030, and renderer 3040 may all be part of an integrated hardware pipeline. In such embodiment, the culling stage 3030 may send records for individual samples to the renderer 3040, each indicating whether a sample was "accepted," meaning known to be visible (so the renderer 3040 needn't read the sample's associated z-value), or "ambiguous," meaning it may or may not be visible, so it is necessary to read the associated z-value. When operating in this way, the culling stage 3030 performs "sample culling." In one embodiment, the records for individual samples sent to the renderer 3040 may only require one bit per sample to distinguish "accepted" from "ambiguous." Further, records sent from the culling stage 3030 to the renderer 3040 may be for 2×2 pixel areas ("quads"), which correspond to either 2×2 samples, 2×4 samples, or 4×4 samples, depending on the antialiasing mode. As an option, only one bit per quad may be sent, indicating whether all samples are accepted or not.

In another embodiment, the culling stage 3030 may be integrated with a host processor or a memory controller (not shown) which are separate from the rest of the graphics pipeline. In this case, the culling stage 3030 sends polygon records, each tagged as "accepted" or "ambiguous," to the renderer 3040 which may be on a separate graphics card. When operating in this manner, the culling stage 3030 performs "object culling."

Figure 35A:
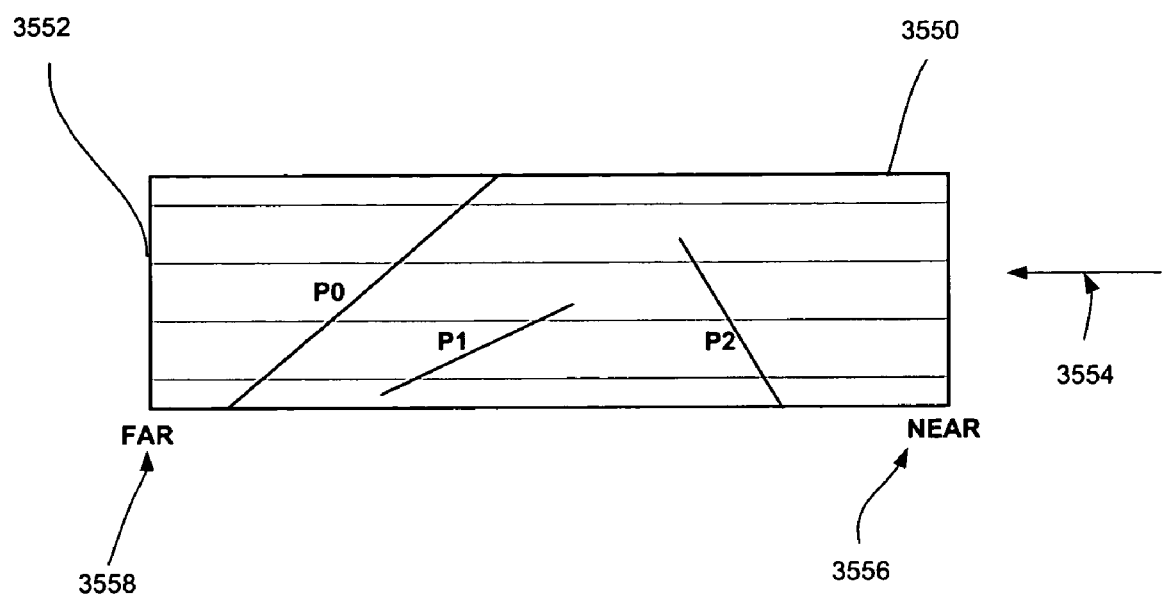
FIGS. 35A through 35E illustrate an example of operation of the method of FIG. 33.

FIGS. 35A through 35E illustrate an example of operation involving a tile in an occlusion image, in accordance with the method 3300 of FIG. 33. As shown in FIG. 35A, a side view of a tile 3550 is shown, which in three dimensions is a rectangular solid 3552 having a rectangular cross-section. Given the indicated direction of view 3554, the right-hand end 3556 of the solid 3550 is the near clipping plane and the left-hand end 3558 of the solid 3550 is the far clipping plane. The four thin horizontal lines indicate the positions of rows of samples.

The present example illustrates the use of near z-values to determine whether a sample is accepted or ambiguous. Also illustrated is the manner in which the near z-values may be used to maintain per-sample, per-tile, per-region, and a per-object "last accepted" status. As shown in FIG. 35A, a plurality of polygons are received in the context of the present example, P0, P1, P2, which are received in the order P0, P1, and then P2.

Figures 35B, 35C, 35D, 35E:
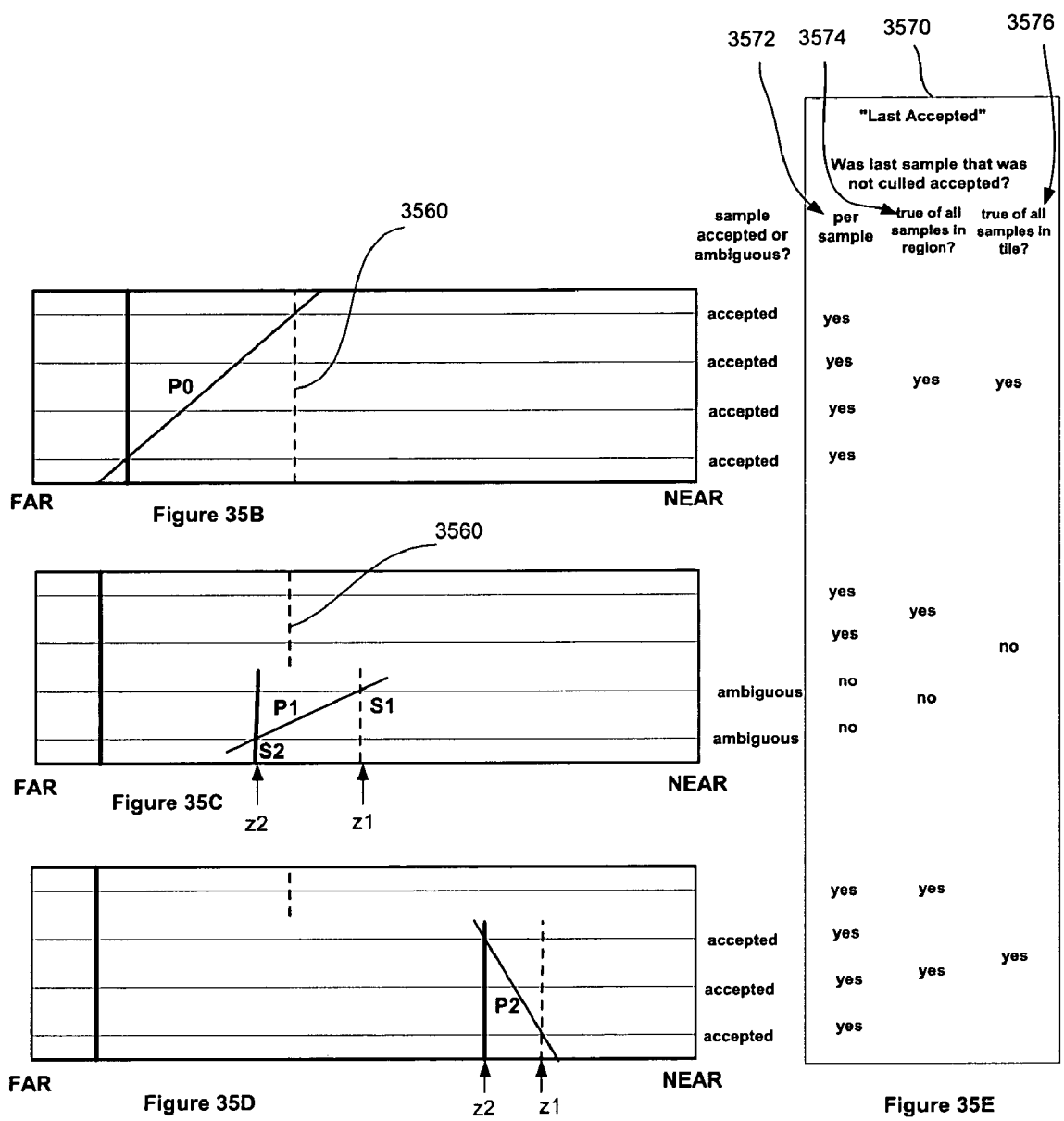

FIG. 35B illustrates the manner in which the first polygon P0 is received, in accordance with the present example. As shown in FIG. 35B, a first near z-value 3560 is stored associated with the first polygon P0. FIG. 35B thus illustrates a z-range of P0. Such values are stored for region 0 in tile record, while region 1 is null.

It should be noted that the tile of FIG. 35B is updated in a manner analogous to that set forth earlier during reference to FIG. 32H. In particular, the tile is initially vacant, and the first polygon P0 covers the whole tile, setting the z-range of region 0 to the znear and zfar value of the first polygon P0 within the tile.

FIG. 35C illustrates the manner in which the second polygon P1 is received. It should be noted that the tile of FIG. 35C is updated in a manner analogous to that set forth earlier during reference to FIG. 32B. In particular, the second polygon P1 covers part of the tile, and the zfar value thereof is nearer than the existing zfar value. As such, the mask of the second polygon P1 becomes the mask defining region 1. Further, the zfar value of region I is defined by the zfar value of the second polygon P1, and the znear value of region 1 is defined by the znear value of the second polygon P1 since it is nearer that the original znear value of the tile 3560.

As shown in FIG. 35C, a far z-value z2 at sample S2 on the second polygon P1 is compared to the first near z-value 3560 in accordance with operation 3404 of FIG. 34. Based on such comparison, it is determined whether the current z-value is accepted, and marked accordingly. See operation 3406 of FIG. 34.

In an embodiment where the states of the samples are tracked on a region-by-region basis, various z-values z1 and z2 at samples S1 and S2 of the second polygon P1, respectively, would both be marked as "ambiguous" since the far z-value z2 at sample S2 of the second polygon P1 is not in front of the first near z-value 3560. Further, the first z-value z1 at sample S1 of the second polygon P1 would be stored as a new near z-value for use during the receipt of further polygons since it is the nearest value.

In another embodiment where the acceptance is tracked on a sample-by-sample basis and z-values are known at each sample (not just the z-range of each polygon), the sample associated with the first z-value z1 at sample S1 could be accepted. In the present embodiment, a per-sample z-value was not calculated, so all that is known is the z-range of polygons. As such, the sample associated with the first z-value z1 at sample S1 is labeled "ambiguous."

FIG. 35D illustrates the manner in which the third polygon P2 is received. It should be noted that the tile of FIG. 35D is updated in a manner analogous to that set forth earlier during reference to FIG. 32D. In particular, the third polygon P2 "occludes" region 1, but not the whole tile. As such, the zfar value of the third polygon P2 becomes the zfar value of region 1. Further, the znear value of region I is defined by the znear value of the third polygon P2 since it is nearer than the old znear value associated with region 1.

As shown in FIG. 35D, a far z-value of the third polygon P2 is compared to the current near z-value z1 at sample S1 of the second polygon P1. Based on such comparison, each sample on the third polygon P2 would be marked as accepted.

FIG. 35E illustrates a table 3570 showing a first status 3572 associated with each of the samples, a second status 3574 associated with a summary of the samples of a region (defined by a coverage mask), and a third status 3576 associated with a summary of the samples of a tile. While not shown, another status may be included to indicate a status associated with a primitive.

In particular, a total of nine (9) samples are taken on the polygons P0, P1, and P2. As shown in FIG. 35E, seven (7) samples are accepted, and two (2) are ambiguous. Two (2) reads and nine (9) writes of z-values are thus required to the z-value/stencil buffer 3080. This may be compared with the nine (9) reads and nine (9) writes of z-values to the z-value/stencil buffer 3080 that would be required if the rendering stage 3040 did ordinary z-buffering. It should be noted that an initial clear of the z-value in the z-value/stencil buffer 3080 at each sample may also be saved.

It should be noted that tracking such statuses affords various advantages and disadvantages. For example, utilizing the first status 3572 affords a more definitive avoidance of z-value reads, but requires more storage space. Conversely, utilizing the third status 3576 requires a lesser amount of storage space, but affords a less definitive avoidance of z-value reads. Of course, utilizing the second status 3574 would provide a medium balance of such considerations.

It should be noted that it is not necessary to clear z-values in the z-value/stencil buffer 3080 at the beginning of a frame if a "virgin tile" flag is maintained with each 4×4 tile record in the culling stage's occlusion image. The virgin tile flag is cleared to "true" at the beginning of a frame. When the first polygon at a tile is processed by the culling stage 3030, the virgin status of the tile is included in the record that the culling stage 3030 passes to the renderer 3040. The renderer 3040 then knows that all samples on the polygon are known to be visible, so reading z-values from the z-value/stencil buffer 3080 is unnecessary. For samples within a virgin tile that are not covered by the polygon being processed, the renderer 3040 clears the associated z-values in the z-value/stencil buffer 3080 to the far clipping plane. After processing the first-encountered polygon at a 4×4 tile, the culling stage 3030 clears the tile's virgin tile flag to "false."

Two-Pass Rendering with Conservative Culling with Optional "Z-Accept" Feature

Figure 36:
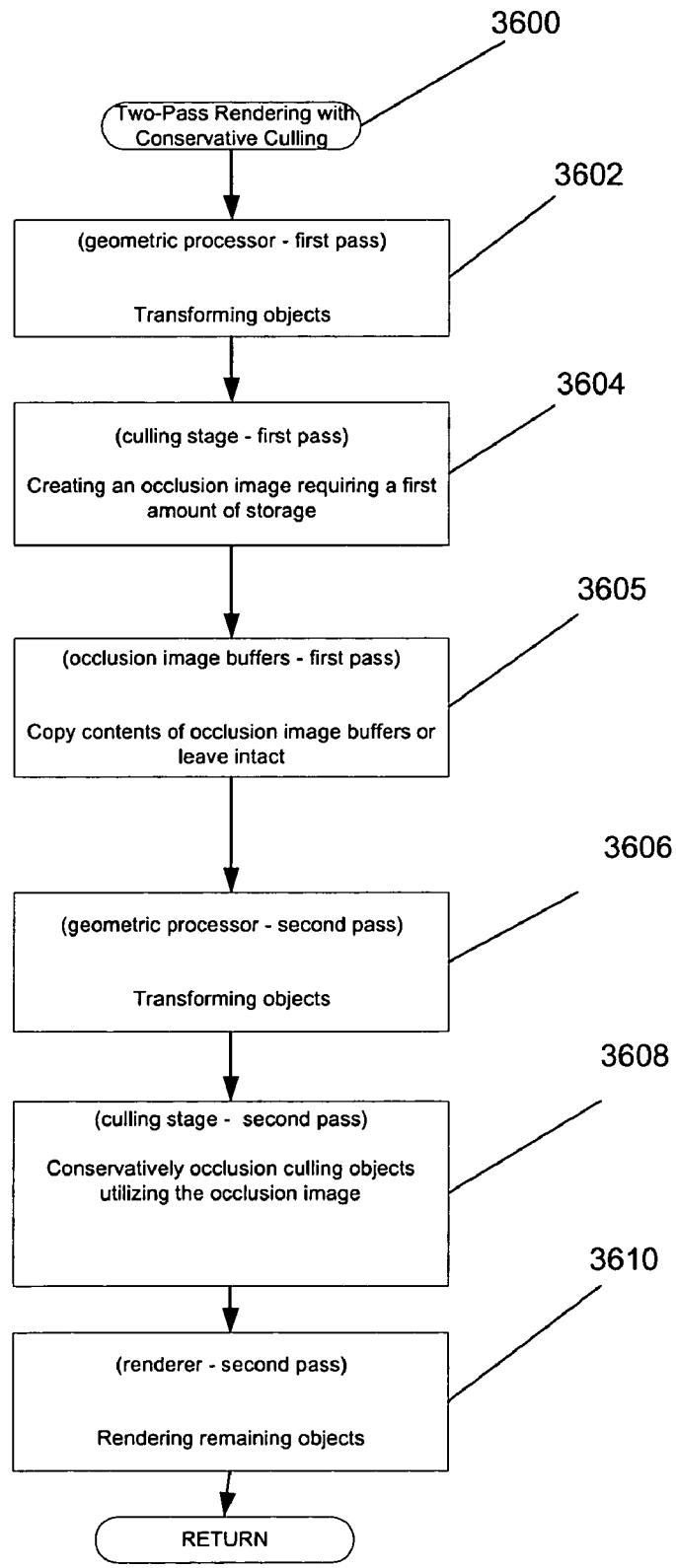
FIG. 36 illustrates a method for multiple-pass rendering using conservative occlusion culling.

FIG. 36 illustrates a method 3600 for multiple-pass rendering using conservative occlusion culling. One purpose of the method 3600 includes creating an occlusion image during a first pass which enables more efficient processing during a subsequent pass.

As shown in FIG. 36, during a first pass, objects are passed from an input stream to the geometric processor 3020 for being transformed. Note operation 3602. Also during the first pass, the transformed objects are sent to the culling stage 3030 for creating an occlusion image in the occlusion image buffer 3070 requiring a first amount of storage. See operation 3604.

As an option, status information may be maintained in a bit stream during the first pass. Such status information may indicate whether individual primitives were culled using backface culling, occlusion culling or stencil culling. If the primitives weren't culled, information may be maintained indicating their visibility status.

Some models may be stored as "vertex arrays," where the vertices of polygons are stored in a list, and triangle records include the indices of the vertices, rather than the vertexes themselves. During the first pass, the present invention may keep track of which vertices or indices are actually needed for a primitive that is potentially visible. This permits ignoring vertices or indices which are not needed during a second pass. For example, the vertices may not need to be transformed.

Next, in operation 3605, if a second culling pipeline is being employed (as will soon be set forth), the occlusion image created during the first pass is stored and then copied into an image buffer, for use during a second pass. In the simple case of a single pipeline, the occlusion image may be simply left intact in such operation.

During the second pass, the objects are again passed to the geometric processor for being transformed. Note operation 3606. Alternatively, transformed polygons may be stored during the first pass, so that transformation can be skipped on the second pass. Thereafter, in operation 3608, the objects are sent to the culling stage 3030 for conservatively culling objects, i.e. z-value and/or stencil culling, utilizing the occlusion image created during the first pass. Also during the second pass, the remaining objects are sent to the renderer 3040. Note operation 3610. As mentioned earlier, each z-value that is stored in the occlusion image buffer 3070 is done so using 8 or 12 bits. On the other hand, the renderer 3040 requires use of the z-value/stencil buffer 3080 which involves a second amount of storage greater than the first amount of storage, as mentioned earlier during reference to FIG. 30.

Since the z-values may be stored in the occlusion image utilizing various sizes, various embodiments are afforded. In one embodiment, the first amount of storage is less than or equal to ½ the second amount of storage. In another embodiment, the first amount of storage is less than or equal to ¼ the second amount of storage. In still another embodiment, the first amount of storage is less than or equal to ⅛ the second amount of storage. For example, utilizing 64 bits to store a 4×4 tile record within the culling stage's occlusion image requires ⅛ of the storage associated with storing a corresponding record in the z-value/stencil buffer 3080 consisting of 16 values with 32-bit precision (i.e. 24 bits for z-value information and 8 bits for stencil value information). As such, the storage of the occlusion image buffer 3070 is only a fraction of the storage of the z-value/stencil buffer 3080.

In one embodiment, a single pipeline graphics system 3000 may be utilized. As mentioned earlier, the graphics system 3000 of FIG. 30 may optionally include a second culling pipeline 3090 including the second geometric processor 3091, the second set-up module 3092, the second rasterizer 3093, the second culling stage 3094, and another occlusion image buffer 3095 in addition to the first full pipeline. In use, pipeline 3091 is used to perform the first pass during which the occlusion image buffer 3095 is created. The results of the first pass may be copied from the second occlusion image buffer 3095 to the first occlusion image buffer 3070 after the first pass for use during the second pass in accordance with the procedure 3600 of FIG. 36. While the first full pipeline is rendering a frame F, the graphics system 3000 may create an occlusion image for frame F+1 using the separate culling pipeline 3090.

Figure 36A:
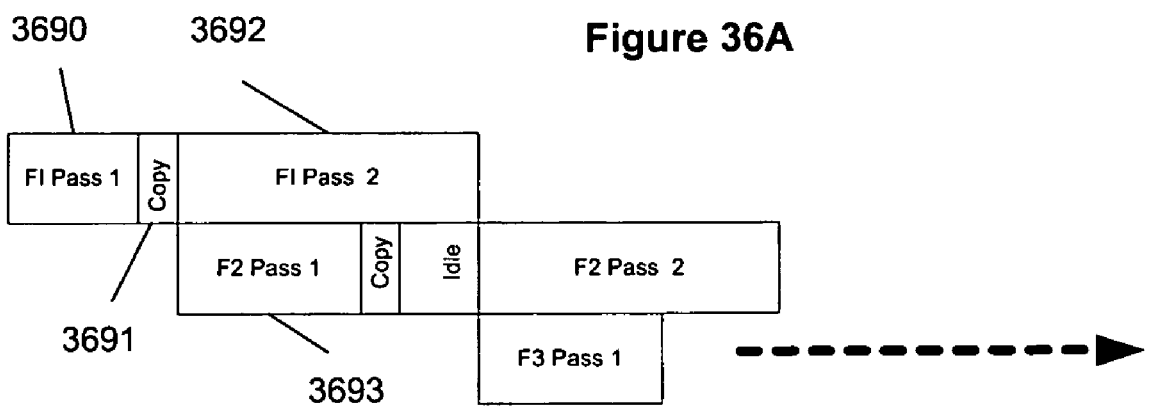
FIG. 36A illustrates a timeline showing the benefits of utilizing the parallel pipeline embodiment.

Thus, each frame is processed in two passes, the first pass processed by the separate culling pipeline 3090, and the second pass processed by the full rendering pipeline. FIG. 36A illustrates a timeline showing the benefits of utilizing the parallel pipeline embodiment. As shown, a first frame is processed with the separate culling pipeline 3090 during a first pass in act 3690 after which the occlusion image is copied in act 3691 and used during a second pass 3692 in the full pipeline. Simultaneous with the processing of the first frame during the second pass 3692, a second frame is processed by the separate culling pipeline 3090 during a first pass in act 3693, and so on. It should be noted that the first pass in the separate culling pipeline 3090 may take less time than the second pass in the full pipeline, thus affording some idle time in the separate culling pipeline 3090 as shown. By this design, the renderer 3040 is always kept busy rendering only visible and nearly visible primitives to maximize performance.

At the beginning of the second pass, the occlusion image created in the first pass is copied into the occlusion image buffer 3070. If stencil culling is enabled, the stencil information is restored to its state prior to the first pass. To render the scene, the bitstream is read which tells which primitives are potentially visible, and the stored scene model is read. It should be noted that primitives which are known not to be visible (i.e. backfacing, culled by stencil, occluded, etc.) may be skipped.

Some aspects of two-pass rendering are different than with one-pass rendering. For example, in the first pass of two-pass rendering, translucent polygons should not write z-values, because this would cull the polygons behind them (that they should get blended with) during the second pass.

As an option, the method 3300 of FIG. 33 for avoiding reading z-values may be incorporated into the present multi-pass rendering algorithm. In an optional extension of this method, it is possible to avoid writing z-values as well. In one embodiment of this extension, tile records in the culling stage's occlusion image may include a "last accepted" flag for each image sample indicating whether that sample was "accepted" the last time it was processed with a potentially visible primitive during the first pass. If so, it is known that that sample will be visible the last time it is processed during the second pass, so it is never necessary for the renderer 3040 to read the corresponding z-value from the z-value/stencil buffer 3080. Furthermore, since this is known to be the last time the sample is processed, it is never necessary to write the z-value to the z-value/stencil buffer 3080. It is only necessary to write the color to the output image, without reading or writing the z-value or making a z-value comparison. The z-value/stencil buffer is neither read nor written for samples where the last potentially visible primitive is "accepted." As a result, this technique saves considerable bandwidth and computation.

While the preceding description assumes that the culling stage 3030 maintains "last accepted" status on a per-sample basis, alternatively it can be maintained on a per-tile, per-tile-region, or per primitive basis, and used in an analogous manner to avoid z-value reads by the renderer 3040.

FIG. 35E summarizes per-sample, per-tile-region, and per-tile "last accepted" status for the example of FIGS. 35B–D. In this example, after polygons P0, P1, and P2 have been processed during the first pass, the last time each sample was processed it was accepted, so the "last accepted" status is true at each sample. It follows that during the second pass it would not be necessary for the renderer 3040 to perform any z-value reads at this tile.

Conservative Stencil Culling and Hierarchical Conservative Stencil Culling

As mentioned earlier during reference to FIG. 32, each tile record associated with the occlusion image may be equipped with stencil information including a stencil valid flag and a stencil value (i.e. 8-bit value) for each of the regions defined in the tile. Such information may be used to conservatively cull parts of a scene. For example, drawing into portions of a scene with a unique stencil value, i.e., the cockpit of a flight simulator, may be stencil culled. It should be noted that culling procedures that may fail to cull occluded geometry but never cull visible geometry are defined as conservative. Moreover, the rules for rejecting pixels using stenciling are commonly known.

Figure 37:
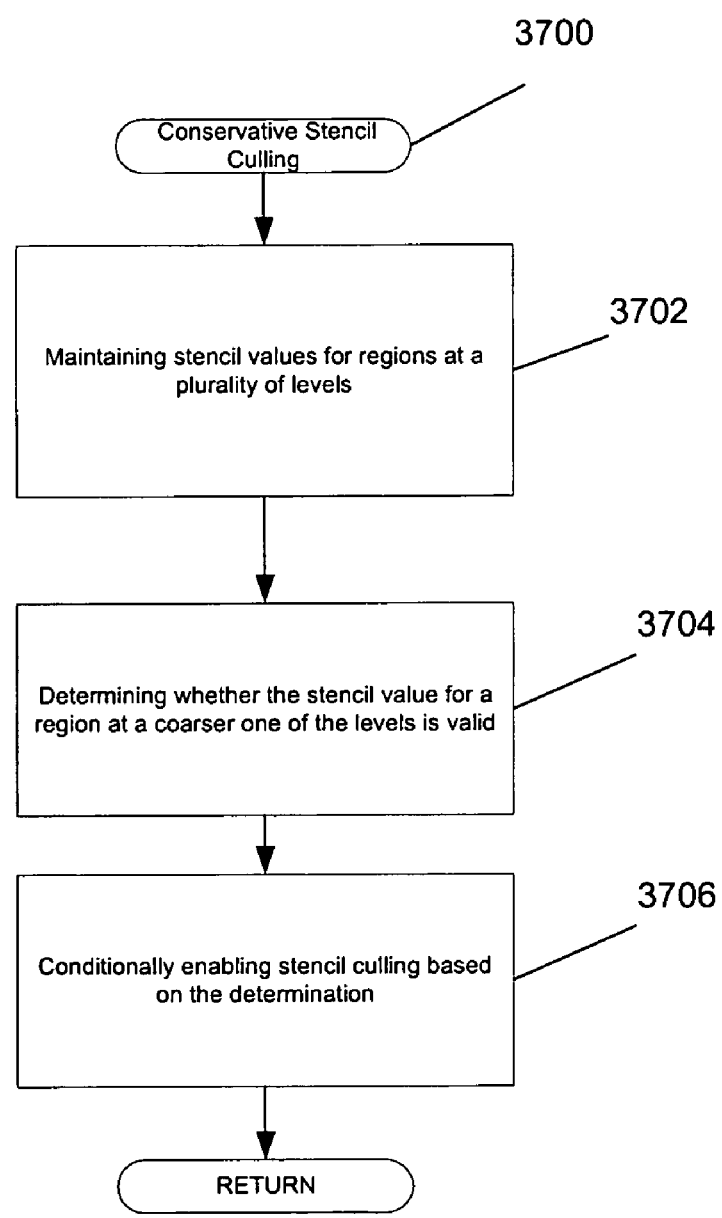
FIG. 37 illustrates a method for conservative stencil culling, in accordance with one embodiment of the present invention.

FIG. 37 illustrates a method 3700 for conservative stencil culling, in accordance with one embodiment of the present invention. As shown, stencil values are maintained for regions at a plurality of levels in operation 3702. It should be noted that the stencil values may be maintained in various ways within the occlusion image in the occlusion image buffer 3070 discussed hereinabove.

Figure 37B:
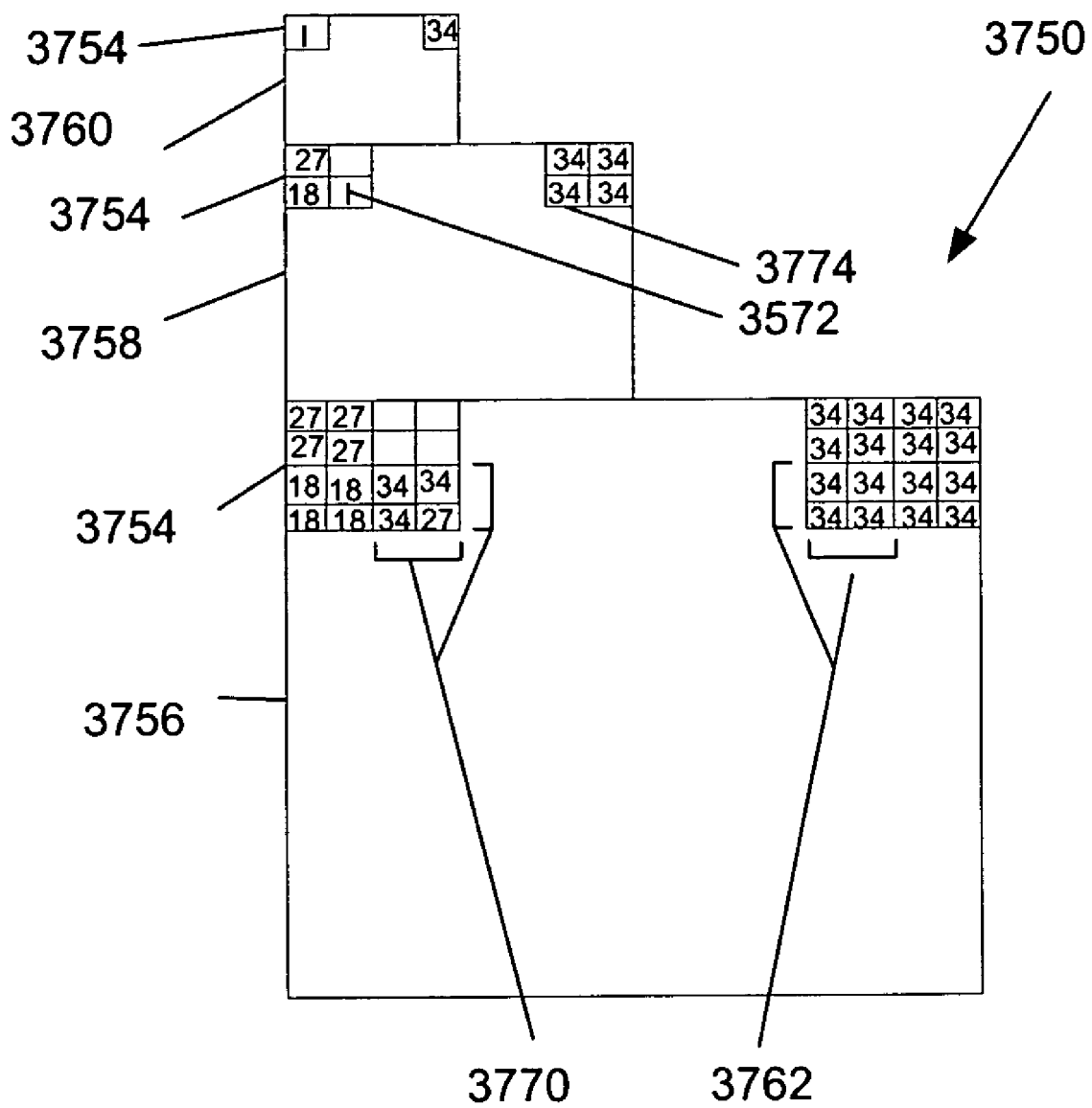
FIG. 37B illustrates a data structure for maintaining stencil values in accordance with one embodiment of the present invention.

FIG. 37B illustrates one exemplary data structure, or image pyramid, 3750 for maintaining stencil values 3752 in accordance with operation 3702. As shown, the stencil values 3752 may be maintained for a region 3754 at a first finest level 3756, a second coarser level 3758, and a third even coarser level 3760. Of course, additional or fewer levels may be employed per the desires of the user. It should be understood that the contents of the first finest level 3756 are found in the conventional stencil buffer 3080 while the contents of the second coarser level 3758 and the remaining levels may be found in the occlusion image buffer 3070.

Each cell at a first level corresponds to an N×N region of cells at a finer level, etc. While N=2 in the present example shown in FIG. 37B, it should be understood that any value of N may be utilized. If each cell in the N×N region has the same stencil value, the corresponding cell at the coarser level is assigned that stencil value. If the cells in the N×N region do not have the same stencil value, a valid indicator, i.e. valid flag, may be set to "false" in the cell at the coarser level.

A particular process to create such a data structure 3750 will now be described. Initially, the stencil values 3752 of a region at a finer one of the levels are compared. Based on such comparison, a valid indicator 3761 is stored indicating whether the stencil values 3752 of the regions at the finer level are the same. As shown, such valid indicator 3761 is stored at all but the finest level. If the stencil values 3752 at the finer level are different (as is the case of 2×2 region 3770), the valid indicator 3761 may indicate invalidity. On the other hand, if the stencil values 3752 at the finer level are the same (as is the case of region 3762), a stencil value 3774 (which is the same as the stencil values of the region at the finer level) may be stored at the coarser level. As an option, a valid indicator may also be used to indicate validity in the present case. In FIG. 37B, invalid regions are labeled "I" and valid regions are labeled with the corresponding valid stencil value.

It is important to note that the image pyramid 3750 may include any data structure capable of tracking information at a plurality of levels.

The foregoing description describes a first mode wherein information is propagated from the finest level stored in the stencil buffer 3080 to a coarser level stored in the occlusion image buffer 3070. In use, a change in the contents of the stencil buffer 3080 may trigger the foregoing updating process to determine if the coarser level should be updated. In a second mode of operation, the coarser levels may be generated directly from the geometry processed by the culling stage 3030 of the pipeline 3000.

To this end, the stencil value for the region at the coarser level may be representative of a plurality of portions of a corresponding region at a finer one of the levels. As an option, the valid indicator may take the form of a valid flag.

As such, a data structure 3750 is provided that may be stored in memory and be updated on a continuous or periodic basis. Such data structure 3750 thus includes a valid indicator object at a coarser level indicating whether stencil values of a region at a finer level are the same, and a stencil value object including a stencil value that is the same as the stencil values of the region at the finer level, if the stencil values of such region are equal.

Returning to FIG. 37, it is then determined whether a stencil value for a region at a coarser one of the levels is valid using the foregoing data structure 3750. Note operation 3704. If the stencil value at the coarser level is valid, conservative stencil culling within the culling stage 3030 is enabled on the region utilizing the stencil value at the coarser level. Note operation 3706. In the context of the data structure 3750 shown in FIG. 37B, conservative stencil culling may be enabled with stencil value 3774 representative of the region 3762, while conservative stencil culling would not be enabled given the valid indicator 3572.

As an option, a "stencil forwarding" feature may be employed when the culling stage 3030 maintains stencil values. When the culling stage 3030 processes a potentially visible image sample and the associated stencil information is valid, such stencil value may be forwarded to the renderer 3040. As such, the renderer 3040 may avoid reading the stencil value from the z-value/stencil buffer 3080. This in turn saves considerable memory bandwidth.

Figure 37C:
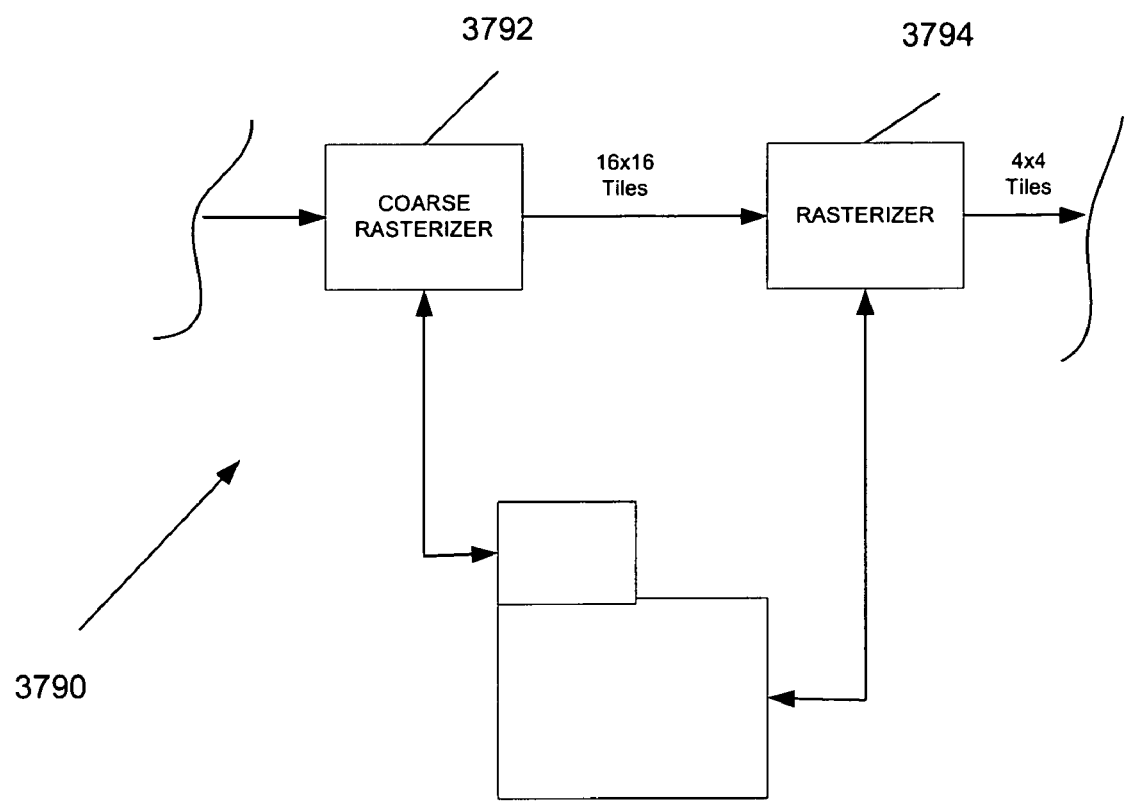
FIG. 37C illustrates yet another embodiment where a coarse rasterizer is used in conjunction with a normal rasterizer.

FIG. 37C illustrates yet another embodiment 3790, where rasterization is performed in multiple stages, including a "coarse rasterizer" 3792, which processes cells covering 16×16-pixel regions of the screen and a normal rasterizer 3794, which processes 4×4-pixel regions of the screen. The coarse rasterizer 3792 and the normal rasterizer 3794 each utilize a separate level of a data structure similar to that set forth hereinabove. In particular, the coarse rasterizer 3792 may utilize a coarser level than the normal rasterizer 3794. The various propagation techniques set forth hereinabove may be utilized per the desires of the user. Moreover, it should be noted that the remaining components of the present embodiment 3790 are configured similar to the graphics system 3000 of FIG. 30.

In use, the coarse rasterizer 3792 processes tiles at a first size (i.e. 16×16 pixel region). Such processing includes z-value culling and stencil culling in the manner set forth hereinabove. Thereafter, the coarse rasterizer 3792 sends an output of such processing to the normal rasterizer 3794 which processes tiles at a finer size (i.e. 4×4 pixel region). In particular, the normal rasterizer 3794 performs the z-value culling and stencil culling on the tiles at the finer level. By this design, tiles that are culled during processing with the coarse rasterizer 3792 may be skipped during processing with the normal rasterizer 3794, thus saving considerable bandwidth and computation.

Multi-Pass Rendering for Accelerating Graphics Processing

Figure 38:
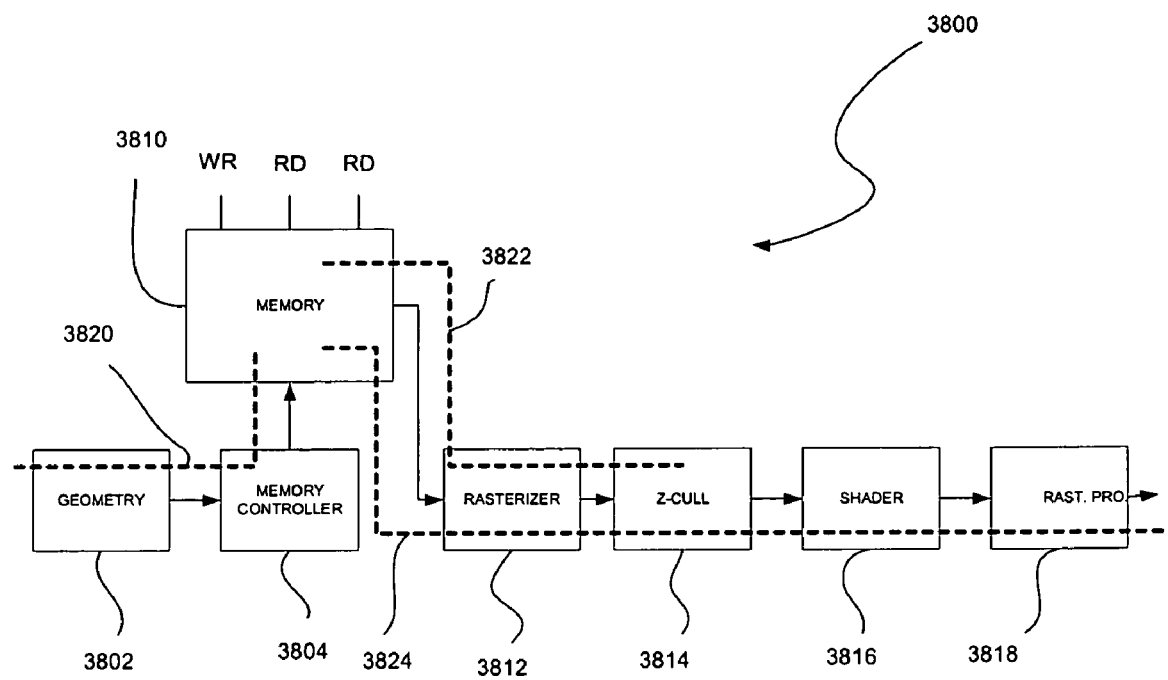
FIG. 38 illustrates a graphics architecture for accelerating graphics processing utilizing multiple-pass rendering, in accordance with one embodiment.

FIG. 38 illustrates a graphics architecture 3800 for accelerating graphics processing utilizing multiple-pass rendering, in accordance with one embodiment. It should be noted that the present architecture 3800 is set forth for illustrative purposes only, and should not be construed as limiting in any manner.

As shown, a geometry module 3802 is provided which transforms primitives received from a push buffer (not shown) into a screen-aligned coordinate system. Other computations may be performed by the geometry module 3802 such as lighting to determine the visual properties (e.g., color, surface normal, texture coordinates) of each vertex describing the primitives. Moreover, the geometry module 3802 may be capable of back-face culling and clipping for reducing the amount of graphics data (i.e. any data handled by the graphics architecture) outputted from the geometry module 3802.

Coupled to the geometry module 3802 is a memory controller 3804 which, in turn, controls a memory 3810 for accelerating graphics processing in the context of multiple-pass rendering. This is accomplished by storing graphics data from the geometry module 3802 in a particular data structure in the memory 3810 for being accessed during multiple-pass rendering. More information regarding such data structure and the method in which it is used will be set forth hereinafter in greater detail.

A rasterizer 3812 receives a stream of graphics data from the memory 3810, and computes a fragment for each pixel covered by each of the primitives. A coverage mask stored with the fragment may indicate which portions of the pixel the fragment covers.

Further provided is a z-value culling module 3814 coupled to the rasterizer 3812. This z-value culling module 3814 is capable of selectively discarding fragments based on an associated z-value for the purpose of reducing required processing.

Coupled to the z-value culling module 3814 is a shader 3816 that computes the final fragment, e.g. by applying texture maps or shader programs to the fragment. While not shown, a sample expansion stage may generate multiple samples for each fragment, as an option.

Thereafter, the individual samples are sent to a raster-processor 3818 as if they were regular fragments. The raster-processor 3818 performs various operations on the fragments, including z/stencil testing and color or alpha blending. This may require the raster-processor 3818 to read a frame buffer memory (not shown) in order to retrieve the destination z-values or the destination color values. To this end, the final pixel color and z-values are written back to the unillustrated frame buffer memory. When all primitives in the scene have been rendered in this manner, the contents of the frame buffer memory may be scanned out and sent to the display.

In use, a multiple-pass rendering algorithm is carried out utilizing the graphics architecture 3800 by accessing a data structure in the memory 3810 using the memory controller 3804.

Figure 39:
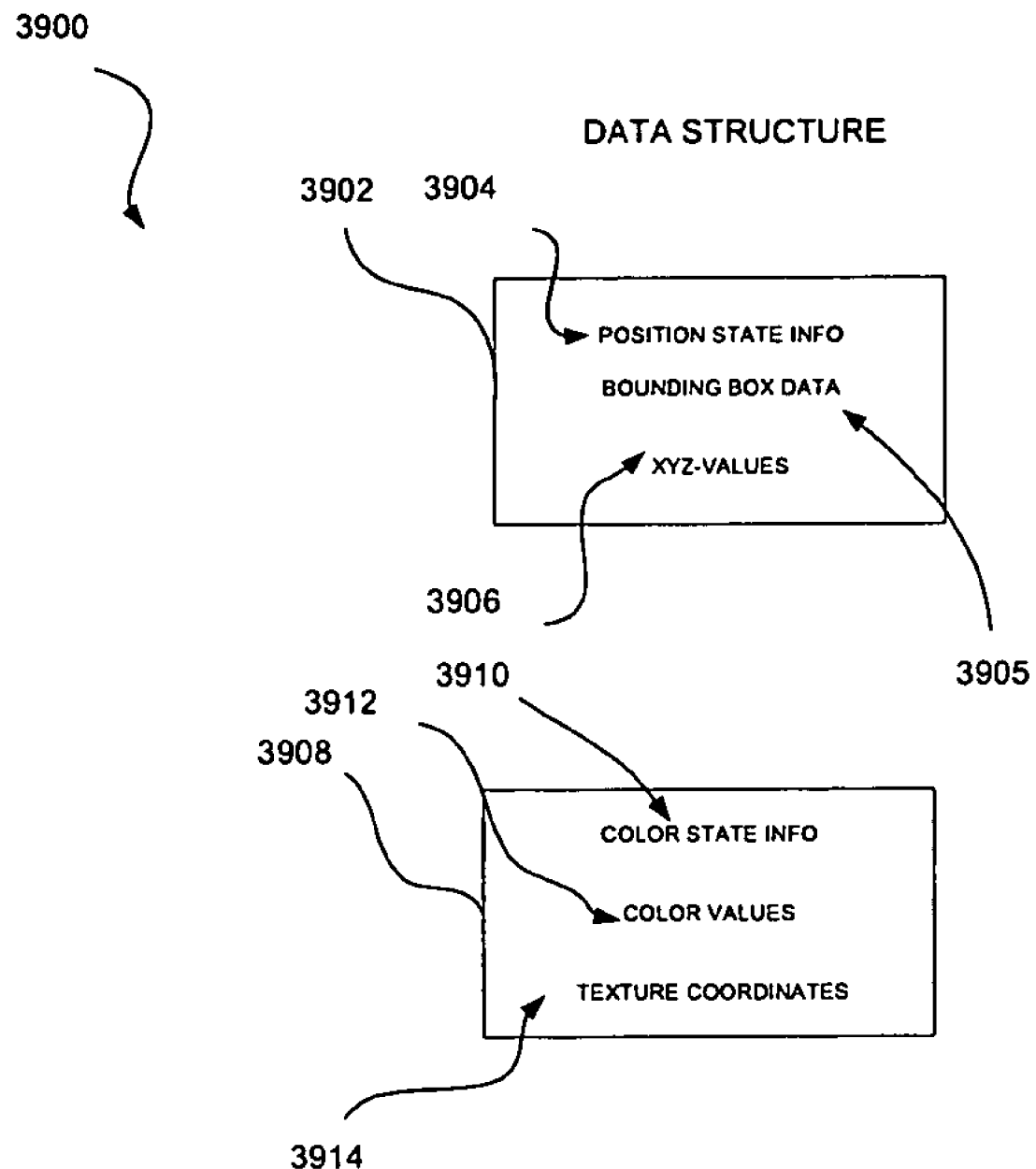
FIG. 39 illustrates an exemplary data structure that may be used in accordance with one embodiment

FIG. 39 illustrates an exemplary data structure 3900 that may be stored in the memory 3810 of FIG. 38 for using during multiple-pass rendering. As an option, the memory 3810 may include a first-in-twice-out buffer with two read pointers and one write pointer. Of course, however, any type of suitable memory may be employed per the desires of the user.

As shown in FIG. 39, the data structure 3900 includes a first portion 3902 and a second portion 3908. In one embodiment, the first portion 3902 of the data structure 3900 of graphics data includes position information 3906, position-related state information 3904, and/or optional bounding box information 3905. Such bounding box information 3905 may be supplied by a graphics application program.

With respect to the second portion 3908, the data structure 3900 may include color information 3912, texture coordinates 3914, and/or color-related state information 3910. Either portion of the data structure 3900 of graphics data may be compressed in a loss-less or lossy manner.

In a manner that will now be set forth, such first portion 3902 of the data structure 3900 of graphics data is read from the memory 3810 during a first rendering pass, and both the first portion 3902 and the second portion 3908 of the graphics data is read from the memory 3810 during a second rendering pass. As an option, the second portion 3908 of the graphics data may be conditionally read from the memory 3810 during the first and/or second rendering pass.

With reference again to FIG. 38, processing begins by performing geometry operations on graphics data utilizing the geometry module 3802. See operation 3820. Graphics data from the geometry module 3802 is then stored in the memory 3810 using the memory controller 3804. First and second rendering passes are then performed. Such passes differ in the manner in which data is accessed from the memory 3810 and used in the remaining components of the graphics architecture 3800.

In particular, during a first rendering pass 3822, any desired part of the first portion 3902 of the data structure 3900 (i.e. position information 3906, position-related state information 3904, bounding box information 3905, etc.) in the memory 3810 is accessed utilizing the memory controller 3804.

Further, the first portion 3902 of the graphics data is used by the rasterizer 3812 for rasterization purposes. Next, first z-culling operations involving the first portion 3904 of the graphics data are performed utilizing the z-value culling module 3814. At this point, the first rendering pass 3822 is terminated. It should be noted that a first occlusion image is accumulated by the z-value culling module 3814 in the first rendering pass 3822 for use during a second rendering pass 3824, in a manner similar to that set forth hereinabove in the description of the previous embodiments.

During a second rendering pass 3824, any desired part of the first portion 3902 or the second portion 3908 of the data structure 3900 (i.e. position information 3906, position-related state information 3904, bounding box information 3905, color information 3912, texture coordinates 3914, color-related state information 3910, etc.) in the memory 3810 is accessed utilizing the memory controller 3804.

Next, the first portion 3902 and the second portion 3908 of the graphics data are used by the rasterizer 3812 for rasterization purposes. Next, similar to the first rendering pass 3822, second z-culling operations are performed utilizing the first portion 3902 and the second portion 3908 of the graphics data, as well as the aforementioned first occlusion image, during the second rendering pass 3824. For example, various graphics data (i.e. primitives, etc.) may be discarded if determined to be occluded based on the first occlusion image. Of course, this may also be accomplished during the first rendering pass 3822.

Unlike the first rendering pass 3822, the second rendering pass 3824 next performs shader operations involving the first portion 3902 and the second portion 3908 of the graphics data using the shader 3816. Further, raster-processor operations involving the first portion 3902 and the second portion 3908 of the graphics data are performed utilizing the raster-processor 3818.

Furthermore, additional more-definitive visibility operations may be performed utilizing the graphics data and a second occlusion image requiring more storage than the first occlusion image. In one embodiment, the second occlusion image may require a z-buffer that maintains one depth sample for each point in the image raster, while the first occlusion image is more compact.

It should be noted that first and second occlusion images may both be part of a single image-pyramid data structure, in one optional embodiment. Note description of such a pyramid set forth hereinabove. Moreover, such visibility operations may include any of those set forth hereinabove in the previous descriptions, or any other visibility operation capable of determining the visibility of the graphics data.

Thus, the first z-culling operations are low-bandwidth z-culling operations by virtue of the fact that the first occlusion image requires less storage than the second occlusion image.

As an option, the z-write avoidance optimization mentioned hereinabove in previous embodiments may be incorporated in the present context to save memory bandwidth.

In an alternate 1½ pass embodiment, the second portion 3908 of the graphics data may also be read during the first rendering pass 3822, and used during the course of the foregoing operations. Such embodiment may be used to opportunistically do post-z-cull work for some of the graphics data in the first rendering pass 3822, as opposed to the second rendering pass 3824.

At least a portion of processing in the first rendering pass 3822 is capable of being avoided based on the position-related state information 3904, the bounding box information 3905, or the color-related state information 3910 (in the case of the aforementioned 1½ pass embodiment). In a similar manner, at least a portion of processing in the second rendering pass 3824 is capable of being avoided based on the position-related state information 3904, the bounding box information 3905, or the color-related state information 3910. Just by way of example, various parts of the graphics data in the data structure 3900 may be conditionally read from the memory 3810 and processed, only if the position-related state information 3904 indicates that such parts are required.

Still yet, at least a portion of processing in either the first or second rendering pass is capable of being avoided by using bounding box information 3905. Such bounding box information may be obtained from the application and transformed by the geometry stage 3802, or may be generated early in the graphics pipeline itself using a clustering algorithm. Such clustering may accumulate primitives that are close to previous primitives, recording their maximum extent, until a new primitive lies or extends disadvantageously outside that extent. The previous primitives are denoted to be a group, and their extent recorded as the group's bounding box. The new primitive begins a new group. Once obtained, bounding boxes can be tested (during pass one or pass two) against the occlusion information accumulated during pass one; if the bounding box is sufficiently occluded, then the rendering of the group's primitives can be skipped. This skipping may be accomplished by discarding a determined amount of graphics data, or by jumping to a specific location in the command stream, etc.

Figure 40:
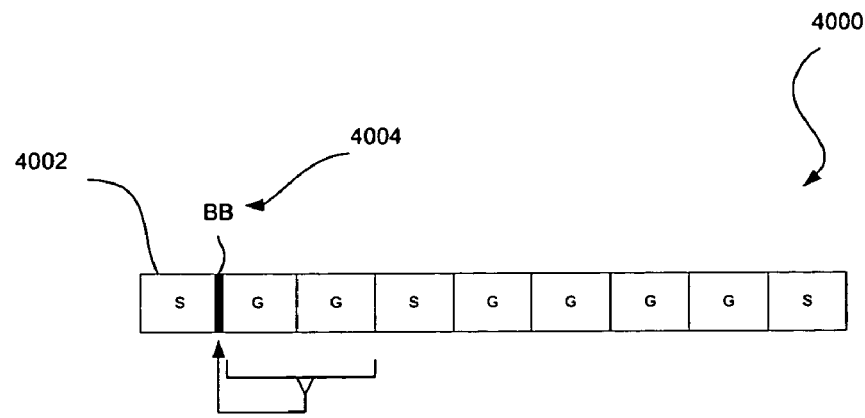
FIG. 40 illustrates the manner in which bounding box information may be situated in a data stream.

FIG. 40 illustrates the manner in which bounding box information 4004 may be situated in a data stream 4000 of the graphics data 4002. As mentioned earlier, such bounding box information 4004 may be stored in the memory 3810, as part of the first portion 3902 of the data structure 3900 of graphics data. Such bounding box information 4004 may include branching information identifying which graphics data (i.e. primitives, etc.) may be skipped based on calculations or testing involving a bounding box also identified by the bounding box information 4004. This skipping may be accomplished by discarding a determined amount of graphics data, simply jumping to a particular address, etc.

Figure 41:
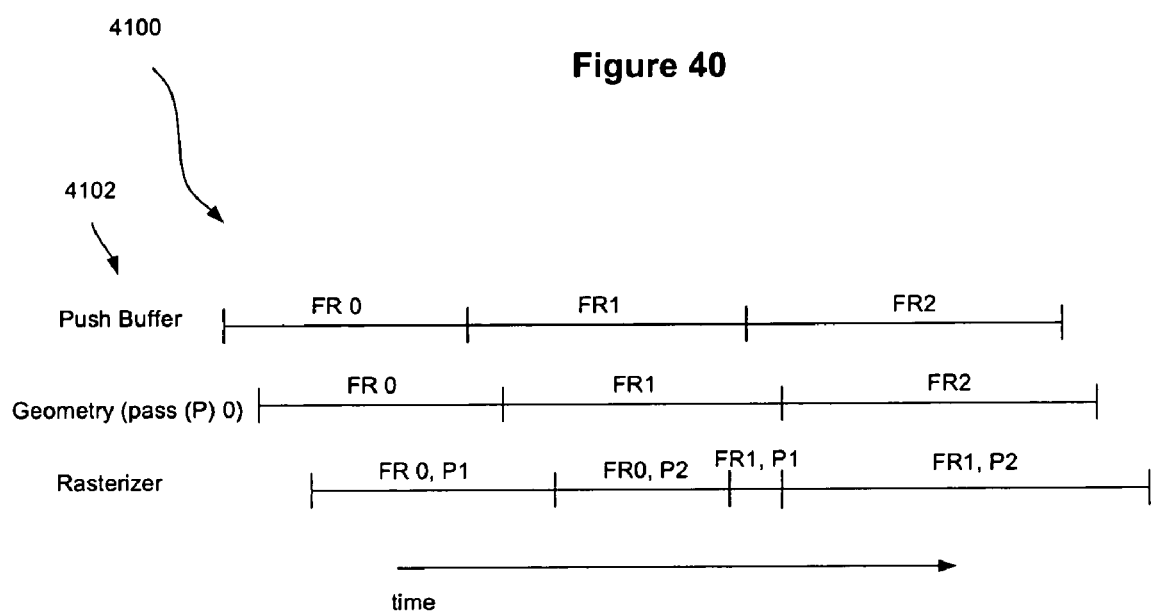
FIG. 41 illustrates the manner in which a plurality of frames is processed by the push buffer, geometry module, and rasterizer; in accordance with the multiple-pass algorithm of one embodiment.

FIG. 41 illustrates the manner 4100 in which a plurality of frames are processed by the push buffer, geometry module 3802, and rasterizer 3812; in accordance with the multiple-pass algorithm of one embodiment. As shown, a plurality of frames F0, F1, and F2 are received by the push buffer and passed onto the geometry module 3802 during initial processing. FIG. 41 further shows the respective timeframes in which the rasterizer 3812 operates on the various frames with respect to the processing thereof by the geometry module 3802.

Optionally, a performance of the z-culling operations may be monitored utilizing counters. Thus, the first rendering pass 3822 may be conditionally avoided based on the monitored performance of the z-culling operations involving the z-culling module 3814. Table 1 illustrates exemplary questions that may be answered through use of the counters.

TABLE 2

| | |
|---|---|
| 1$^{st}$ Pass - | How many pixels failed/passed a z-test? |
| | How many pixels exist? |
| 2$^{nd}$ Pass - | How many pixels used z-write avoidance? |
| | How many pixels were culled in pass 1/2? |

As yet another option, the graphics data may be conditionally stored in the memory 3810 and processed based on a state vector (i.e. OpenGL® state). In particular, such state vector may be used to discard state changes that have no ramifications on the graphics processing.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for accelerating graphics processing utilizing multiple-pass rendering, comprising:
   performing geometry operations on graphics data;
   storing the graphics data in memory;
   during a first pass,
      reading the graphics data from the memory during the first pass,
      rasterizing the graphics data during the first pass, and
      performing first z-culling operations utilizing the graphics data during the first pass, wherein the first z-culling operations maintain a first occlusion image;
   during a second pass,
      reading the graphics data from memory during the second pass,
      rasterizing the graphics data during the second pass,
      performing second z-culling operations utilizing the graphics data and the first occlusion image during the second pass,
      performing visibility operations utilizing the graphics data and a second occlusion image during the second pass, and
      performing raster-processor operations utilizing the graphics data during the second pass; and
   monitoring a performance of the first z-culling operations utilizing counters.

2. The method as set forth in claim 1, wherein the graphics data includes a first portion and a second portion.

3. The method as set forth in claim 2, wherein the first portion of the graphics data is read from the memory during the first pass, and the first portion and the second portion of the graphics data are read from the memory during the second pass.

4. The method as set forth in claim 3, wherein the first portion of the graphics data includes position information.

5. The method as set forth in claim 4, wherein the first portion of the graphics data further includes bounding box information.

6. The method as set forth in claim 5, wherein the bounding box information is supplied by a graphics application program.

7. The method as set forth in claim 4, wherein the first portion of the graphics data further includes position-related state information.

8. The method as set forth in claim 7, wherein the second portion of the graphics data includes color information.

9. The method as set forth in claim 8, wherein the second portion of the graphics data further includes texture coordinates.

10. The method as set forth in claim 8, wherein the second portion of the graphics data further includes color-related state information.

11. The method as set forth in claim 10, wherein at least a portion of processing in the first pass is capable of being avoided based on the position-related state information.

12. The method as set forth in claim 10, wherein at least a portion of processing in the first pass is capable of being avoided based on the bounding box information.

13. The method as set forth in claim 10, wherein at least a portion of processing in the second pass is capable of being avoided based on the position-related state information.

14. The method as set forth in claim 10, wherein at least a portion of processing in the second pass is capable of being avoided based on the color-related state information.

15. The method as set forth in claim 2, wherein the first portion of the graphics data is read from the memory during the first pass, the first portion and the second portion of the graphics data are read from the memory during the second pass, and the second portion of the graphics data is conditionally read from the memory during the first pass.

16. The method as set forth in claim 2, wherein, during the first pass, the first portion of the graphics data is read, and during the second pass, the first portion of the graphics data is read, the first portion of the graphics data is rasterized, the first portion of the graphics data is tested for visibility, and the second portion of the graphics data is conditionally read based on the visibility.

17. The method as set forth in claim 1, wherein at least a portion of processing in at least one of the first pass and the second pass is capable of being avoided based on state information of the graphics data.

18. The method as set forth in claim 1, wherein at least a portion of processing in at least one of the first pass and the second pass is capable of being avoided based on bounding box information.

19. The method as set forth in claim 1, wherein at least a portion of processing in at least one of the first pass and the second pass is capable of being avoided based on automatic clustering of the graphics data.

20. The method as set forth in claim 1, wherein at least a portion of processing in at least one of the first pass and the second pass is capable of being avoided by branching among addresses in an associated graphics application program.

21. The method as set forth in claim 1, wherein at least a portion of processing in at least one of the first pass and the second pass is capable of being avoided by discarding a portion of the graphics data.

22. The method as set forth in claim 1, wherein the memory includes a first-in-twice-out buffer.

23. The method as set forth in claim 1, wherein the memory is controlled by a memory controller.

24. The method as set forth in claim 1, wherein the first pass is conditionally avoided based on the monitored performance of the first z-culling operations.

25. The method as set forth in claim 1, wherein the graphics data is conditionally stored in the memory based on a state vector.

26. The method as set forth in claim 1, wherein the first pass is terminated after the first z-culling operations.

27. The method as set forth in claim 1, wherein the geometry operations include at least one of back-face culling, clipping and lighting.

28. The method as set forth in claim 1, wherein the second z-culling operations are more definitive than the first z-culling operations.

29. The method as set forth in claim 1, wherein the first pass takes more time than the second pass.

30. A method for accelerating graphics processing utilizing multiple-pass rendering, comprising:
performing geometry operations on graphics data:
storing the graphics data in memo
during a first pass,
reading the graphics data from the memory during the first pass,
rasterizing the graphics data during the first pass, and
performing first z-culling operations utilizing the graphics data during the first pass, wherein the first z-culling operations maintain a first occlusion image: and
during a second pass,
reading the graphics data from memory during the second pass,
rasterizing the graphics data during the second pass,
performing second z-culling operations utilizing the graphics data and the first occlusion image during the second passe
performing visibility operations utilizing the graphics data and a second occlusion image during the second pass, and
performing raster-processor operations utilizing the graphics data during the second pass:
wherein the visibility operations are done on a finer spatial resolution than the first z-culling operations.

31. A method for accelerating graphics processing utilizing multiple-pass rendering, comprising:
performing geometry operations on graphics data;
storing the graphics data in memory;
during a first pass,
reading the graphics data from the memory during the first pass,
rasterizing the graphics data during the first pass, and
performing first z-culling operations utilizing the graphics data during the first pass, wherein the first z-culling operations maintain a first occlusion image; and
during a second pass,
reading the graphics data from memory during the second pass,
rasterizing the graphics data during the second pass,
performing second z-culling operations utilizing the graphics data and the first occlusion image during the second pass, performing visibility operations utilizing the graphics data and a second occlusion image during the second pass, and
performing raster-processor operations utilizing the graphics data during the second pass;
wherein the visibility operations are done on a finer spatial resolution than the second z-culling operations.

32. A system for accelerating graphics processing utilizing multiple-pass rendering, comprising:
a geometry module for performing geometry operations on the graphics data;
a memory controller coupled to the geometry module for storing the graphics data in memory;
logic for controlling the memory controller, a rasterizer, a z-culling module, and a raster-processor module coupled in a graphics pipeline configuration for executing processing including:
during a first pass,
reading the graphics data from the memory utilizing the memory controller during the first pass,
rasterizing the graphics data utilizing the rasterizer during the first pass, and
performing first z-culling operations utilizing the graphics data with the z-culling module during the first pass, wherein the first z-culling operations maintain a first occlusion image; and
during a second pass,
reading the graphics data from memory utilizing the memory controller during the second pass,
rasterizing the graphics data utilizing the rasterizer during the second pass,
performing second z-culling operations with the z-culling module utilizing the graphics data and the first occlusion image during the second pass,
performing visibility operations utilizing the graphics data and a second occlusion image during the second pass, and
performing raster-processor operations utilizing the graphics data with the raster-processor module during the second pass;
wherein a performance of the first z-culling operations is monitored utilizing counters.

33. A system for accelerating graphics processing utilizing multiple-pass rendering, comprising:
means for performing geometry operations on graphics data;
means for storing the graphics data in memory;
means for, during a first pass,
reading the graphics data from the memory during the first pass,
rasterizing the graphics data during the first pass, and
performing first z-culling operations utilizing the graphics data during the first pass, wherein the first z-culling operations maintain a first occlusion image;
means for, during a second pass,
reading the graphics data from memory during the second pass,
rasterizing the graphics data during the second pass,
performing second z-calling operations utilizing the graphics data and the first occlusion image during the second pass,
performing visibility operations utilizing the graphics data and a second occlusion image during the second pass, and
performing raster-processor operations utilizing the graphics data during the second pass; and
means for monitoring a Performance of the first z-culling operations utilizing counters.

34. A method for accelerating graphics processing utilizing multiple-pass rendering, comprising:
performing geometry operations on graphics data;
storing the graphics data in memory;
during a first pass,
reading the graphics data from the memory during the first pass,
terminating the first pass by performing first z-culling operations utilizing the graphics data during the first pass, wherein the first z-culling operations maintain a first occlusion image; during a second pass,
reading the graphics data from memory during the second pass,
performing second z-culling operations utilizing the graphics data and the first occlusion image during the second pass,
performing visibility operations utilizing the graphics data and a second occlusion image during the second pass, and
performing raster-processor operations utilizing the graphics data during the second pass; and
monitoring a performance of the first z-culling operations utilizing a counter.

35. A method for accelerating graphics processing utilizing multiple-pass rendering, comprising:
receiving graphics data;
performing geometry operations on graphics data, the geometry operations including back-face culling, clipping and lighting;
conditionally storing the graphics data in memory in a first-in-twice-out buffer based on a state vector utilizing a memory controller;
during a first pass,
reading a first portion of the graphics data from the memory,
rasterizing the first portion of the graphics data, and
performing first z-culling operations utilizing the first portion of the graphics data, wherein the first z-culling operations maintain a first occlusion image;
during a second pass,
reading the first portion of the graphics data and a second portion of the graphics data from the memory, the first portion of the graphics data including position-related state, information, bounding box information, and position information, the second portion of the graphics data including color-related state information, color information, and texture coordinates,
rasterizing the first portion of the graphics data and the second portion of the graphics data,
performing second z-culling operations utilizing the first portion of the graphics data, the second portion of the graphics data, and the first occlusion image,
performing visibility operations utilizing the graphics data and a second occlusion image,
performing shader operations utilizing the first portion of the graphics data and the second portion of the graphics data, and
performing raster-processor operations utilizing the first portion of the graphics data and the second portion of the graphics data; and monitoring a performance of the first z-culling operations utilizing counters, and modifying processing in at least one of the first pass and the second pass based on the performance;

wherein a portion of processing in at least one of the first pass and the second pass is capable of being avoided based on at least one of the position-related state information, the color-related state information, the bounding box information, and automatic clustering of the graphics data;

wherein the processing in at least one of the first pass and the second pass is capable of being avoided by branching among addresses in an associated graphics application program and discarding a portion of the graphics data.

36. A system for accelerating graphics processing utilizing multiple-pass rendering, comprising:

a geometry module for performing geometry operations on graphics data;

a memory controller coupled to the geometry module for storing the graphics data in memory; and a post-geometry graphics pipeline configuration including a rasterizer, a z-culling module, and a raster-processor module coupled to the memory for receiving the graphics data therefrom for use during multiple-pass rendering including:

a first pass including:
performing first z-culling operations utilizing the graphics data during the first pass, wherein the first z-culling operations maintain a first occlusion image, and a second pass including:
performing second z-culling operations utilizing the graphics data and the first occlusion image during the second pass, and performing visibility operations utilizing the graphics data and a second occlusion image during the second pass;

wherein the visibility operations are done on a finer spatial resolution than the first z-culling operations.

* * * * *

UNITED STATES PATENT AND TRADEMARK OFFICE
CERTIFICATE OF CORRECTION

PATENT NO. : 7,023,437 B1
APPLICATION NO. : 10/230124
DATED : April 4, 2006
INVENTOR(S) : Voorhies et al.

It is certified that error appears in the above-identified patent and that said Letters Patent is hereby corrected as shown below:

In the claims:
    Col. 60, line 23, please replace "data:" with --data;--;
    Col. 60, line 24, please replace "memo" with --memory;--;
    Col. 60, line 31, please replace "image:" with --image;--;
    Col. 60, line 39, please replace "passe" with --pass,--;
    Col. 60, line 44, please replace "pass:" with --pass;--;
    Col. 61, line 61, please replace "z-calling" with --z-culling--;
    Col. 62, line 3, please replace "Performance" with --performance--;
    Col. 62, line 49, please replace "state," with --state--.

Signed and Sealed this
Twenty-sixth Day of February, 2013

Teresa Stanek Rea
*Acting Director of the United States Patent and Trademark Office*